INVENTORS
ROBERT J. MURPHY
KORE K. SPELLNES
WILLIAM C. MILLER
ERNEST J. BONANNO
EDWARD J. GLENNER
FRANK B. SIKORSKI
BY
ATTY

COMMUNICATION SWITCHING SYSTEM

Filed April 23, 1965 26 Sheets-Sheet 2

June 27, 1967 R. J. MURPHY ETAL 3,328,534

COMMUNICATION SWITCHING SYSTEM

Filed April 23, 1965

26 Sheets-Sheet 4

June 27, 1967 R. J. MURPHY ETAL 3,328,534

COMMUNICATION SWITCHING SYSTEM

Filed April 23, 1965 26 Sheets-Sheet 9

June 27, 1967 R. J. MURPHY ETAL 3,328,534

COMMUNICATION SWITCHING SYSTEM

Filed April 23, 1965

26 Sheets-Sheet 17

June 27, 1967 R. J. MURPHY ETAL 3,328,534

COMMUNICATION SWITCHING SYSTEM

Filed April 23, 1965

26 Sheets-Sheet 18

June 27, 1967 R. J. MURPHY ETAL 3,328,534

COMMUNICATION SWITCHING SYSTEM

Filed April 23, 1965

26 Sheets-Sheet 19

IDENTIFIER 526

COMMUNICATION SWITCHING SYSTEM

Filed April 23, 1965

ROUTE & TRUNK SELECTOR MEMORY LAYOUT

TRANSLATOR MEMORY LAYOUT

SIMPLIFIED MEMORY LAYOUT FOR A TYPICAL REGISTER-SENDER MEMORY LAYOUT (CALL STORE)

3,328,534
COMMUNICATION SWITCHING SYSTEM

Robert J. Murphy, Broadview, Kore K. Spellnes and William C. Miller, Glen Ellyn, Ernest J. Bonanno, Roselle, Edward J. Glenner, Skokie, and Frank B. Sikorski, Des Plaines, Ill., assignors to Automatic Electric Laboratories, Inc., Northlake, Ill., a corporation of Delaware Filed Apr. 23, 1965, Ser. No. 450,275
15 Claims. (Cl. 179—18)

This is a continuation-in-part of our U.S. application Ser. No. 367,797, filed May 15, 1964, now abandoned.

This invention relates to a communication switching system, and more particularly to a system of the type using common control equipment comprising registers, translators and senders; and marker-controlled coordinate matrix switching networks.

The general object of the invention is to provide an improved general purpose direct dialing communication system for voice transmission as well as other types of information transfer such as teletypewriter or data. Its goal is to provide a system capable of automatic completion of regular connections between any two points in the world with push-button speed, and between two prearranged points anywhere in the world in approximately two seconds. It is also an object to provide the system with many features generally required for example in military systems, such as priority calling, and various conference features.

According to the invention a communication switching system having a marker-controlled switching network has terminals serving lines and trunks and also terminals for registers and senders; and in which a calling line is identified by the marker and connected through the network to a register, the called line directory number is received by the register over this connection, the directory number is supplied from the register to a translator which converts it into an equipment location information, part of this information being the identity of a trunk line, which is supplied to the marker along with the identity of the sender associated with the register to cause the marker to establish a connection between the sender and the trunk line so that the equipment location information can be transmitted from the sender via the connection through the network to the trunk line and thence out over the trunk line; and after the completion of the sending operation the identity of the calling line and the trunk line are supplied from the register to the marker, permitting the connections to the register and to the sender to be released, and causing a new direct connection to be established through the network between the calling line and the trunk line.

In a preferred embodiment of the invention the network has two sides designated a calling side and a called side and each line has a connection to both a calling side termination and a called side termination, and the marker is arranged for example to establish a connection from the calling side termination of a first line to the called side termination of a second line, and incident to unavailability of such a path the marker then establishes a connection through the network between the called side termination of the first line and the calling side termination of the second line.

The network is preferably of the non-blocking type having a primary line stage, a tertiary line stage, and intermediate switches interconnecting the primary and tertiary stages, each line having one termination at the primary line stage and another termination at the tertiary line stage.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 30 wherein.

Figure 13:
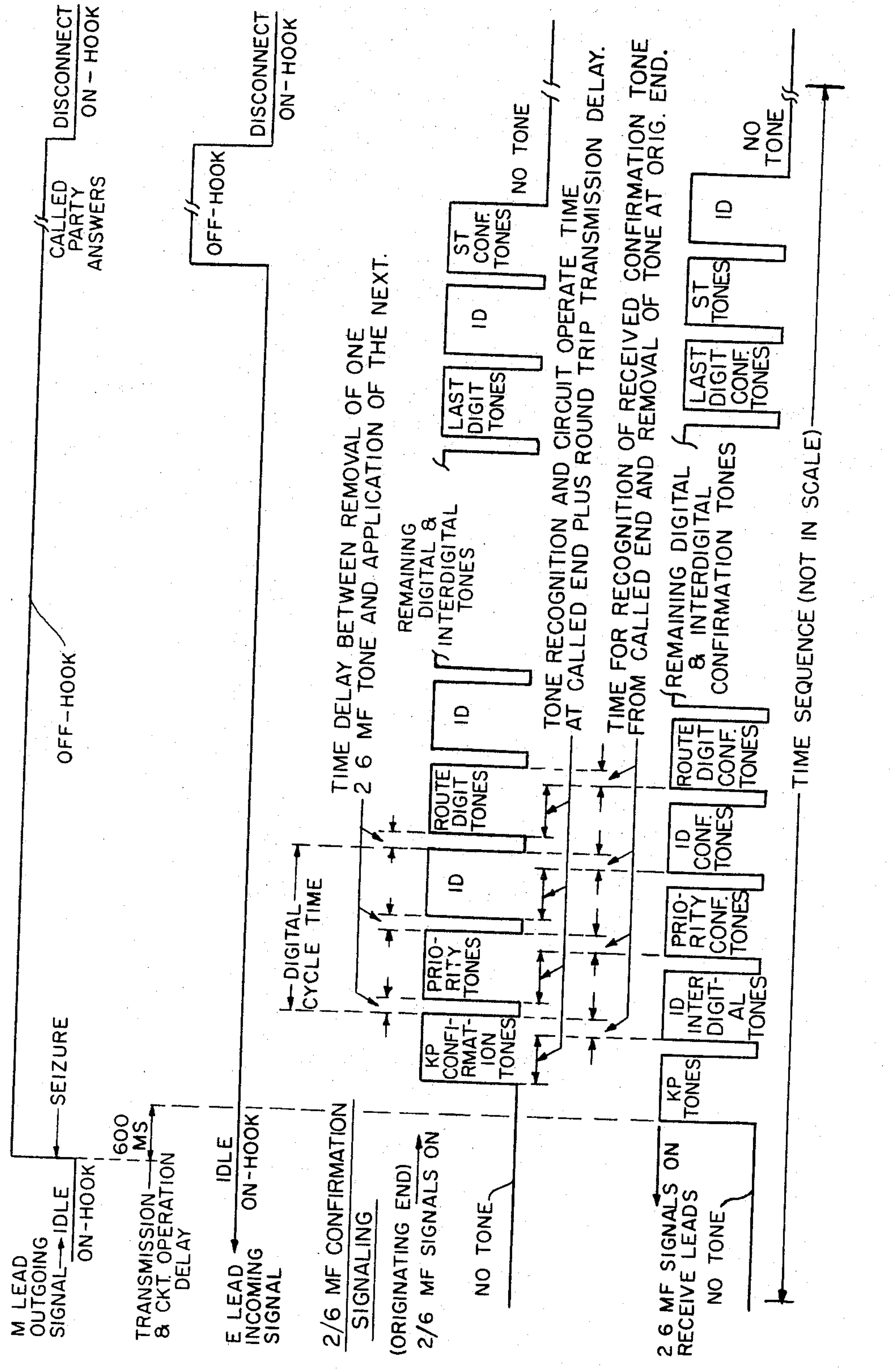
Figure 14:
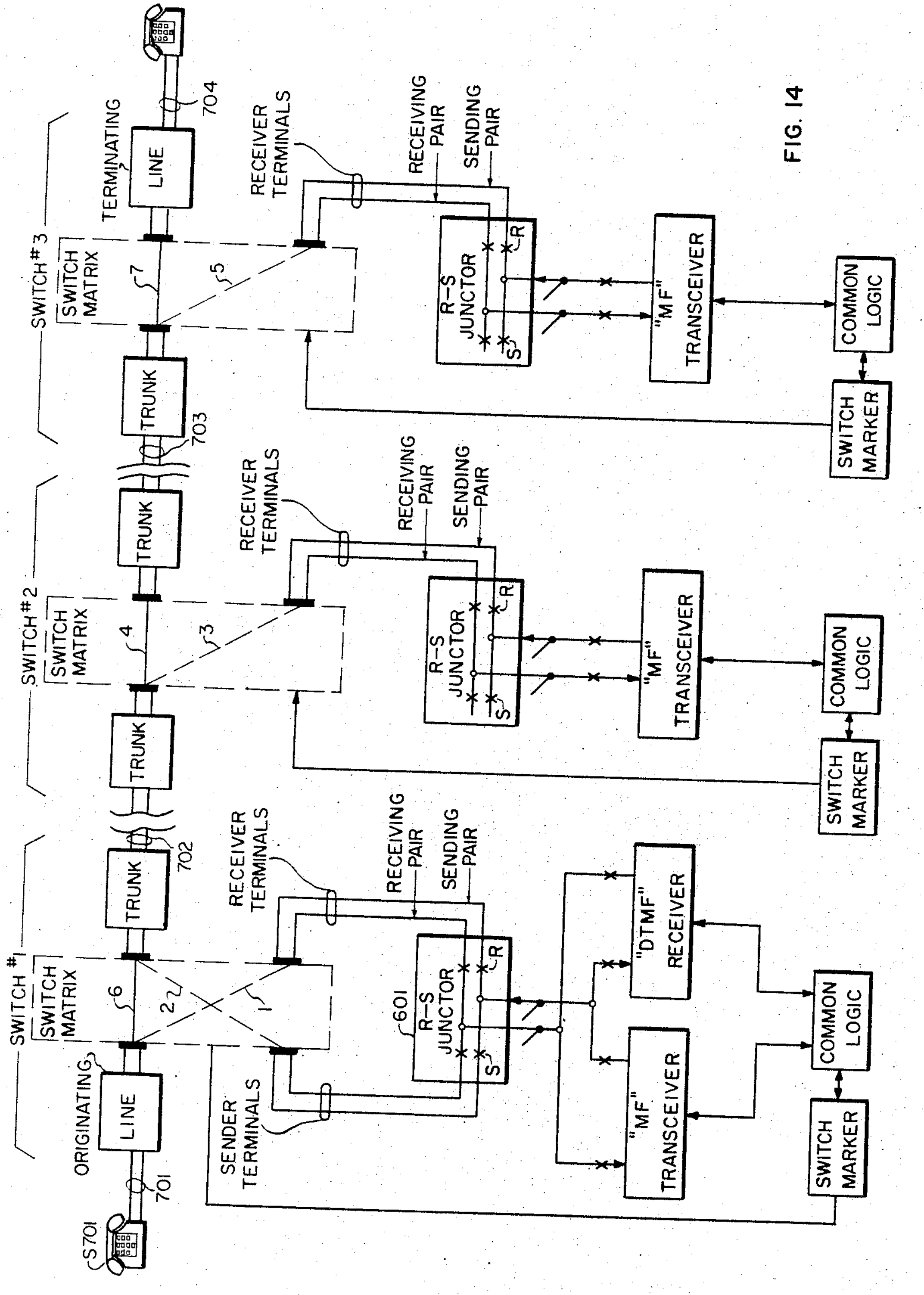
Figure 15:
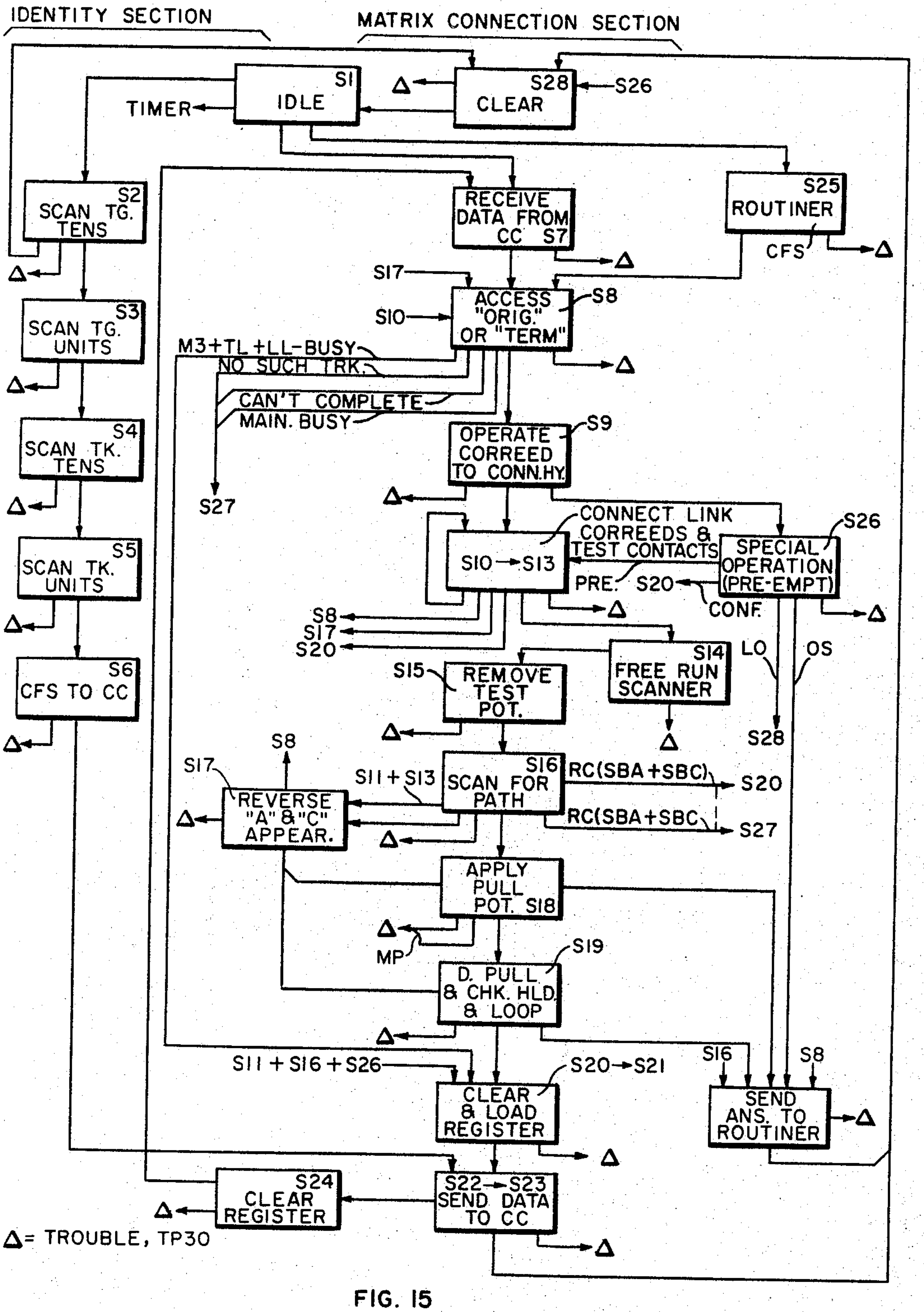
Figure 23:
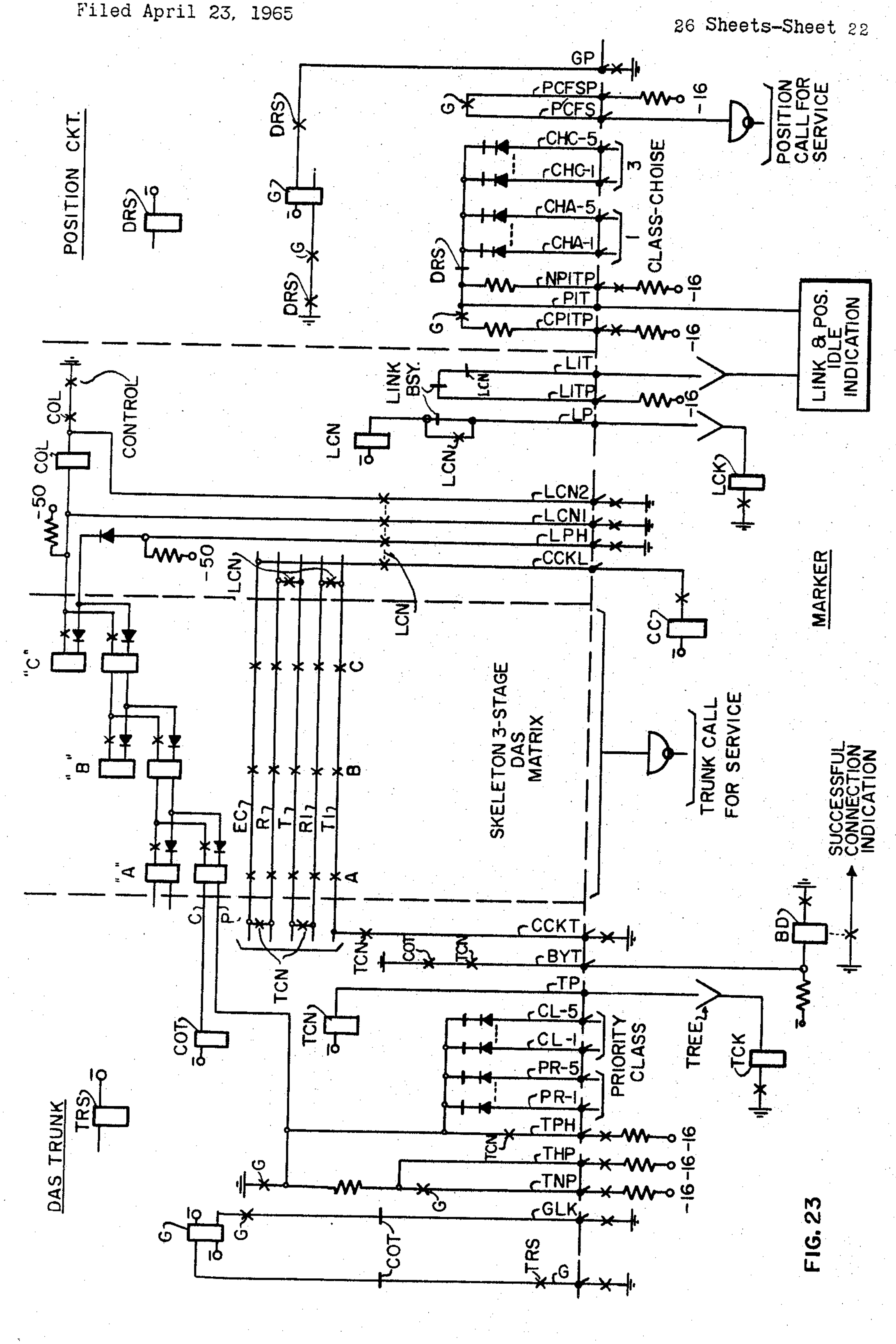
Figure 24:
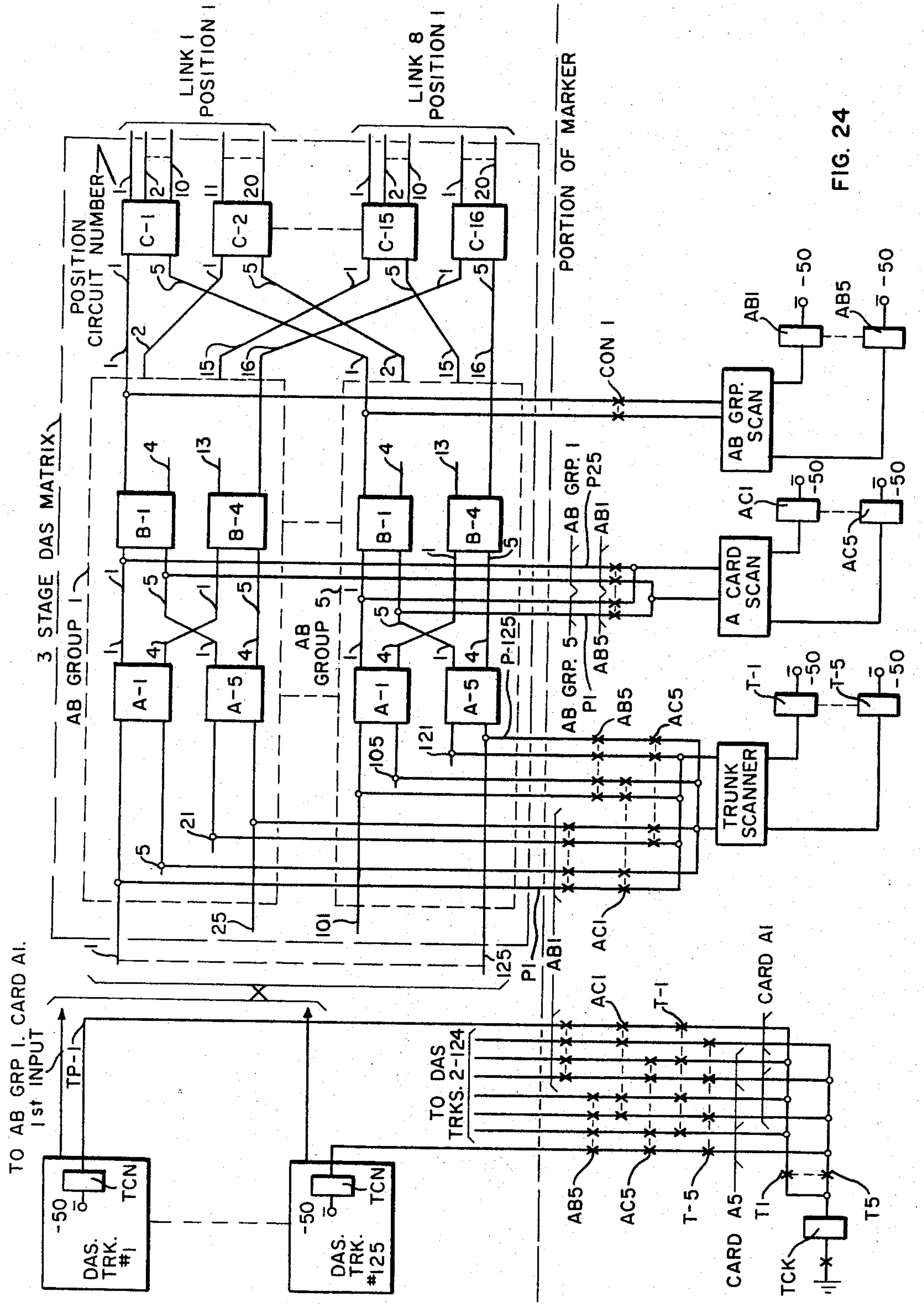
Figure 25:
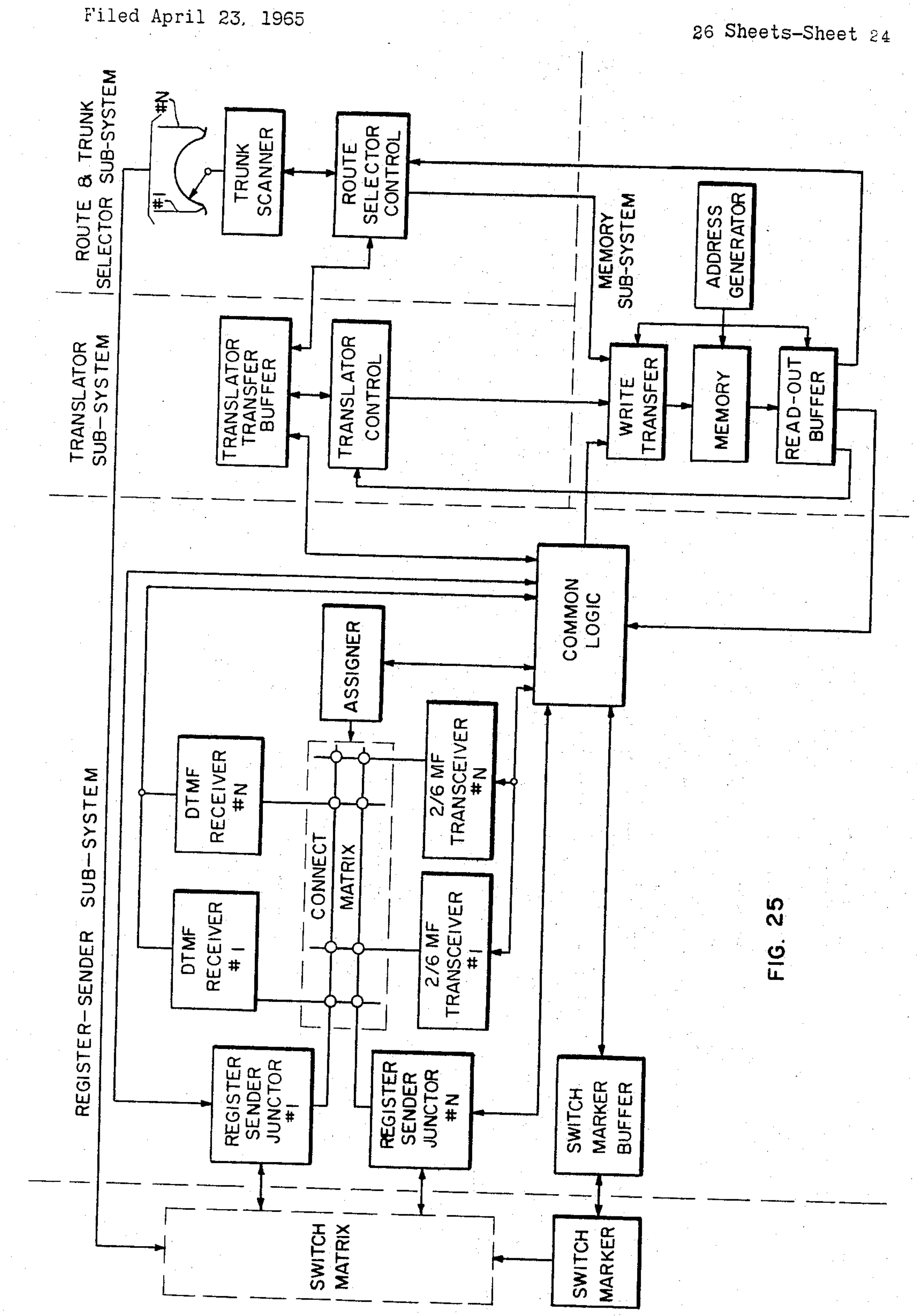
Figure 28:
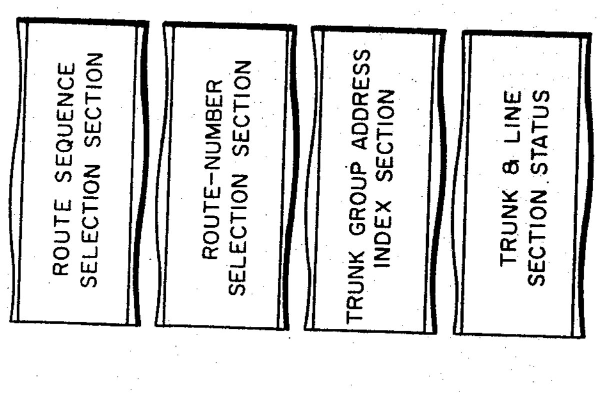
Figure 27:
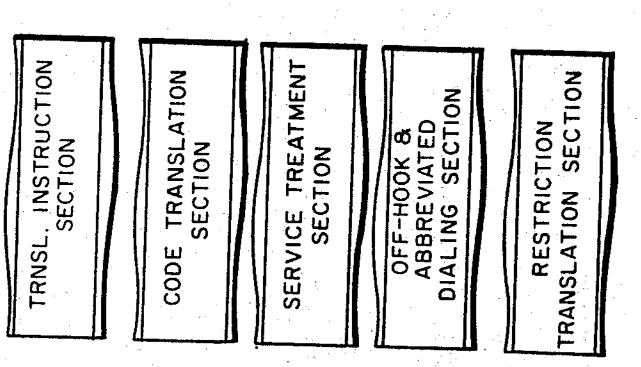
Figure 26:
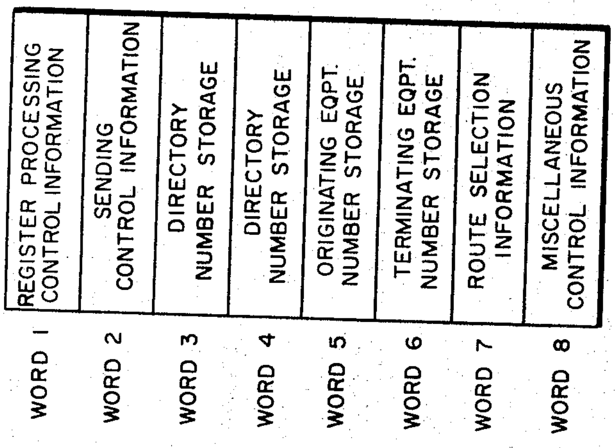
Figure 29:
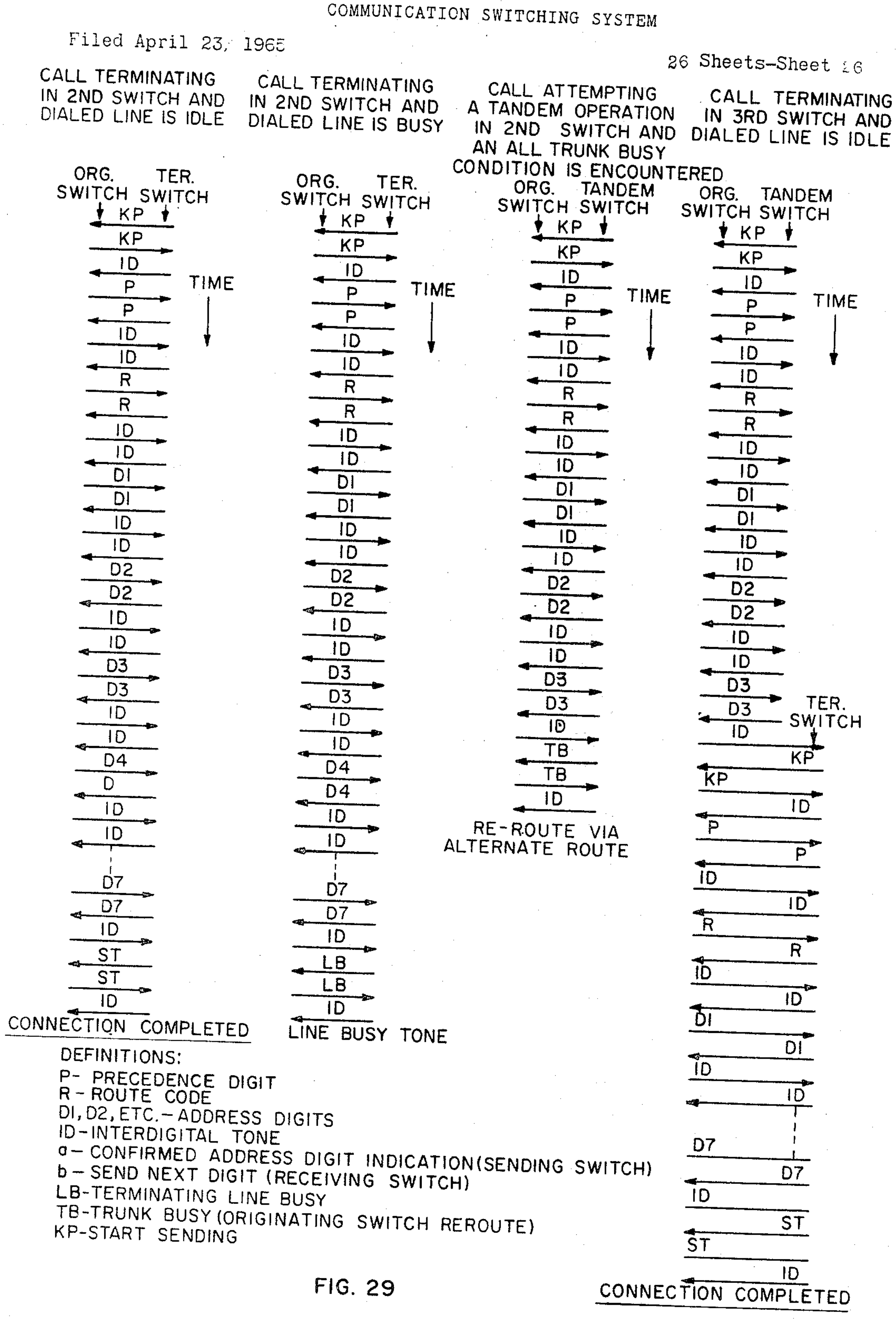

FIG. 13 graphically shows the system signaling patterns;

FIG. 14 shows the establishment of a tandem call via three switches;

FIG. 15 is a sequence chart for the switch marker;

FIGS. 16–22 comprise a diagram of the switch matrix, its terminal units, and its marker;

FIGS. 23 and 24 are diagrams of the DAS matrix and marker;

FIG. 25 is a diagram of the common control;

FIGS. 26, 27 and 28 are layout arrangement charts of the register-sender memory, the translator memory, and the route and trunk selection memory, respectively;

FIG. 29 shows the switch control signaling; and

Figures 16, 30:
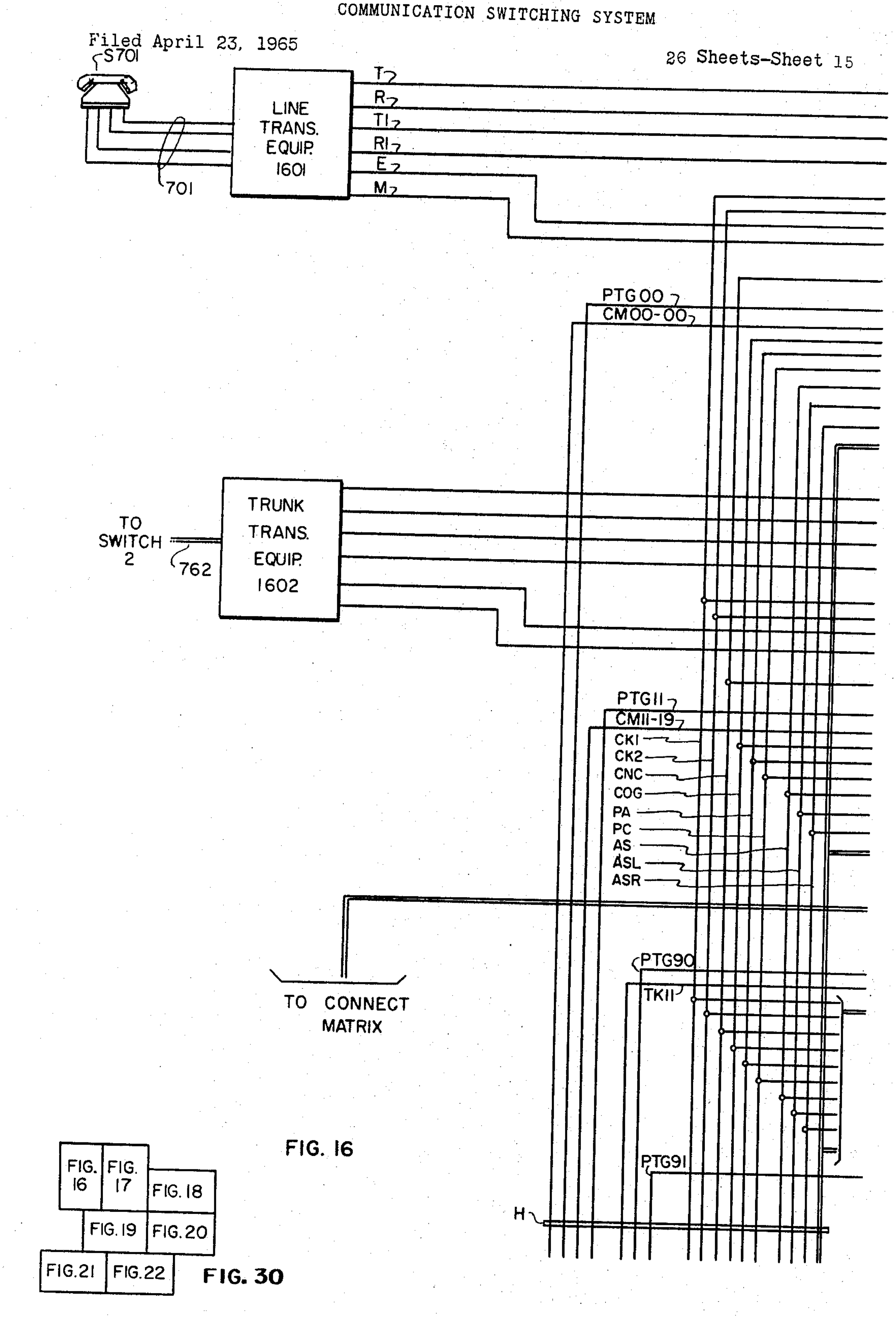

FIG. 30 shows how FIGS. 16–22 are to be arranged.

(1) INTRODUCTION

The system comprises a number of exchange installations. Each installation will be referred to hereinafter as a Switch.

To provide a frequency capability up to 50 kilocycles, the switching system is basically four-wire, and employs reed relay matrices with electronic controls. The system is similar to two previous systems, one of which is an Electronic Automatic Exchange, for telephone service, the other is a Broad Band Switching System, for telegraph service. The Electronic Automatic Exchange is covered by several copending United States patent applications including Ser. No. 230,887, filed Oct. 16, 1962, for A Communication Switching System by Kore K. Spellnes, now Patent No. 3,170,041; and other copending applications listed in columns 33 and 34 of Patent No. 3,170,041. The Broad Band Switching System is covered by U.S. patent application Ser. No. 244,058, filed Dec. 12, 1962, now Patent No. 3,226,488, for a Data Switching System by F. B. Sikorski et al.; and Ser. No. 318,646, filed Oct. 24, 1963, now Patent No. 3,299,438, for A Switching System Common Control by I. V. Coleman et al.

The system makes use of a nonblocking switching network arrangement. Such nonblocking arrangements are set forth in an article by C. Clos, "A Study of Non-Blocking Switching Networks," Bell System Technical Journal, March 1953, pages 406–424, which is also referred to in the article "Analysis of Switching Networks" by C. Y. Lee, same publication, November 1955, pages 1285–1315. United States patents of interest with respect to this type of switching network include J. C. Gibson et al. Patent 2,945,211, issued July 12, 1960; A. Zarouni Patent 3,041,409, issued June 26, 1962, for a Switching System; and M. C. Paull Patent 3,129, 407, issued April 14, 1964, for "Switching Network Control System."

The present system is primarily a tandem-switching network; each Switch will serve a large number of trunks to and from Switches. It also serves the PBX's within its area, usually on a two-wire basis. Each Switch also serves local lines, which are connected directly to it on a four-wire basis. The intra-matrix trunking is 100% nonblocking which means that there is no internal link blockage in the Switch and that every call attempted through a Switch will be completed, provided the desired line or trunk is idle. On the inter-switch trunks, multi-frequency pulsing only is used; pulsing to and from PBX's is primarily conventional dial pulsing.

Local lines served directly from the Switch are equipped with touch calling telephones, with four push-buttons for "priority" service.

This service is one of the many unusual features of the system. In addition to the usual "class of service" identification there are four classes of priority. A priority is assigned to each individual station and recorded. The party calling from that station may then, on any call, exercise this priority by depressing the pushbutton that represents the desired class of priority. The Switch will then, if necessary, pre-empt for him an inter-office trunk being used by a station of lower priority, in order to complete the desired connection without delay. Or, if the called line is busy on a call originated by a party of lower priority, the Switch will release the existing connection and complete the higher priority call. In either case the "pre-empted" party may receive a distinctive tone signal to tell him what has happened. The system also provides a number of conference facilities. Some of these facilities are available directly to the calling station, permitting the user to establish a conference involving a preselected group of up to 30 stations established by dialing a two- or three-digit number.

Other conference services are available with the assistance of an operator at a console associated with the Switch. Upon request of an authorized caller, the operator may establish a "progressive" conference of from 3 to 26 stations; in the latter case, parties may enter the conference by simply dialing the conference number and being satisfactorily identified by the operator. In all cases, conference calls, like priority calls, will pre-empt all stations of lower priority called. Any station involved in an existing conversation will instantly be disconnected, and connected into the conference.

The console, of course, provides all the usual facilities for originating, answering, and completing calls, and for providing intercepting, information, and similar service.

Because of the tremendous importance of the system, all practical means are employed to assure uninterrupted service. The electronic controls, and all common equipment are provided in duplicate. Automatic monitoring equipment constantly supervises the operation of each Switch. Automatic trunk testing facilities check the transmission quality available on each communication channel and record pertinent information. The system also provides complete facilities for recording the volume and distribution of traffic handled.

In a network such as this, it is most important to prevent failures that would affect service, and to keep the entire system in operation as close as possible to 100% of the time. The Switches are expected to achieve an operation reliability of 800 hours MTBF (mean time between failures), and then, in case of failure, the standby equipment will take over and within 30 minutes MDT (mean down time) the original piece of malfunctioning equipment will be restored to service. The equipment is designed to these values of inherent reliability.

*1.1 Features and Services.*—The features of the services performed by a Switch are as follows:

(a) Normal service. The system provides subscribers with the capability of dialing other subscribers on a world-wide basis. Two types of service are available for non-pre-emptive traffic. The first enables 2-wire subscribers of local PABX's to dial desired numbers and accomplish direct connection. Second, in many cases, dialing through a PABX may not be practical, therefore, calls are handled through an operator.

(b) Four-wire service. Selected subscribers are provided with special 4-wire terminal equipment having direct access to the system. Signaling from a 4-wire subscriber is on a touch-tone multi-frequency basis. Four-wire subscribers can be provided with up to four classes of priority. The highest four levels of priority will pre-empt any lower levels. A 4-wire subscriber may employ any class of priority he desires up to and including the highest level he is authorized. Assignment of priority classes to subsets is reprogrammable to the servicing switching centers.

(c) Hot-line service. Two types of hot-line service are available—a full period hot-line and a demand hot-line. With full period hot-line a transmission path is extended to both ends of the hot-line on a permanent basis and if the transmission is interrupted (due to some outside plant problems) service is restored on some alternate route. With a demand hot-line, a transmission path is established between the end point users only when the facility is required and one of the users goes off-hook to request service. In this case, if transmission is interrupted, one of the parties flashes the hook switch to re-establish the connection.

(d) Conferencing. Conferencing can be provided by the system on either a preset or a random basis.

The preset conference is initiated by an operator at a preset conference console. The operator keys in a preset code consisting of three digits. This three-digit code is translated into a predetermined number of outgoing codes and establishes a call to each distant Switch indicated. There are two modes of random conferences, the "meet-me" and the "progressive." If the "meet-me" conference method is used the operator will call each participant in the conference and instruct him to dial a predetermined code that automatically brings him into the conference. With the "progressive" mode the operator calls each participant and notifies him to stand by for a conference.

(e) Dedicated Networks. Several types of dedicated networks may be accommodated by the system. They may afford privacy of service to subscribers of the individual networks or may allow subscribers of the networks access to the entire system. Trunks employed in interconnection normally are general purpose trunks. These dedicated networks generally fall into three categories;

(1) Category 1. These networks allow subscribers to employ abbreviated dialing to certain other designated subscribers. Their instruments provide normal 4-wire service, but also can accommodate abbreviated dialing with authorized levels of pre-emption.

2. Category 2. These networks allow subscribers to dial one another through system general purpose facilities. Levels of pre-emption including flash can be provided to category 2 subscribers.

(3) Category 3. In many areas of the world existing PABX and other dial facilities must be integrated into the system network and employ the same general purpose trunking facilities as the system. These networks enjoy the same or better grade of service than they have enjoyed prior to the installation of this system.

(f) Speed of service. The normal connection through the system network will be effected in about 4 seconds. Difficult conditions or unusual routings may lengthen this time to a maximum of 10 seconds. Hot-line connections will normally be completed in less than 2 seconds.

(g) Wide band service. Switches can be employed for switching wide-band facilities up to 50 kilocycles in bandwidth where the requirement in transmission facilities exist.

(h) Dial assistance switchboard. This assistance is of the type normally provided by a telephone switchboard.

(i) Automatic testing. The switch facility has a built-in capability for automatically testing its own function and reporting equipment malfunction.

(2) BLOCK DIAGRAM ANALYSIS

Figure 1:
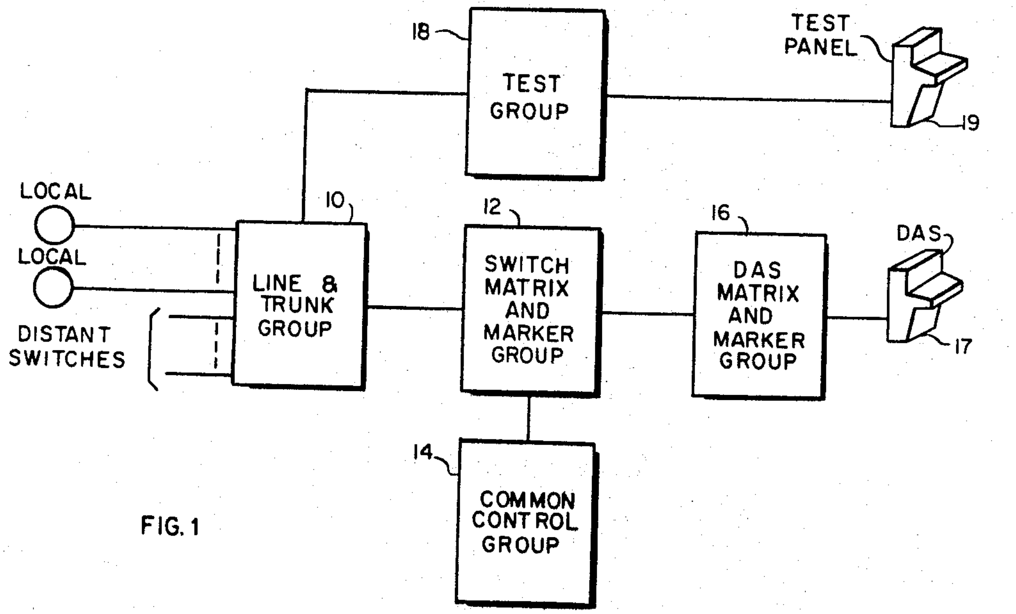
FIG. 1 is a block diagram of a single installation in the overall system network.

FIG. 1 shows the main equipment groups comprising a Switch. The groups mainly concerned with processing a call through the Switch are the line trunk group 10, the switch matrix and marker group 12, the common control group 14, and if operator assistance is required the DAS (dial assistance switchboard) matrix and marker group 16. The power group (not shown), as its name implies, provides the power to the equipment. The test group contains the equipment used to check the Switch circuits for proper functioning.

To gain a better understanding of the equipment groups, and their associated circuits comprising the Switch, we will process two different types of calls.

Figure 3:
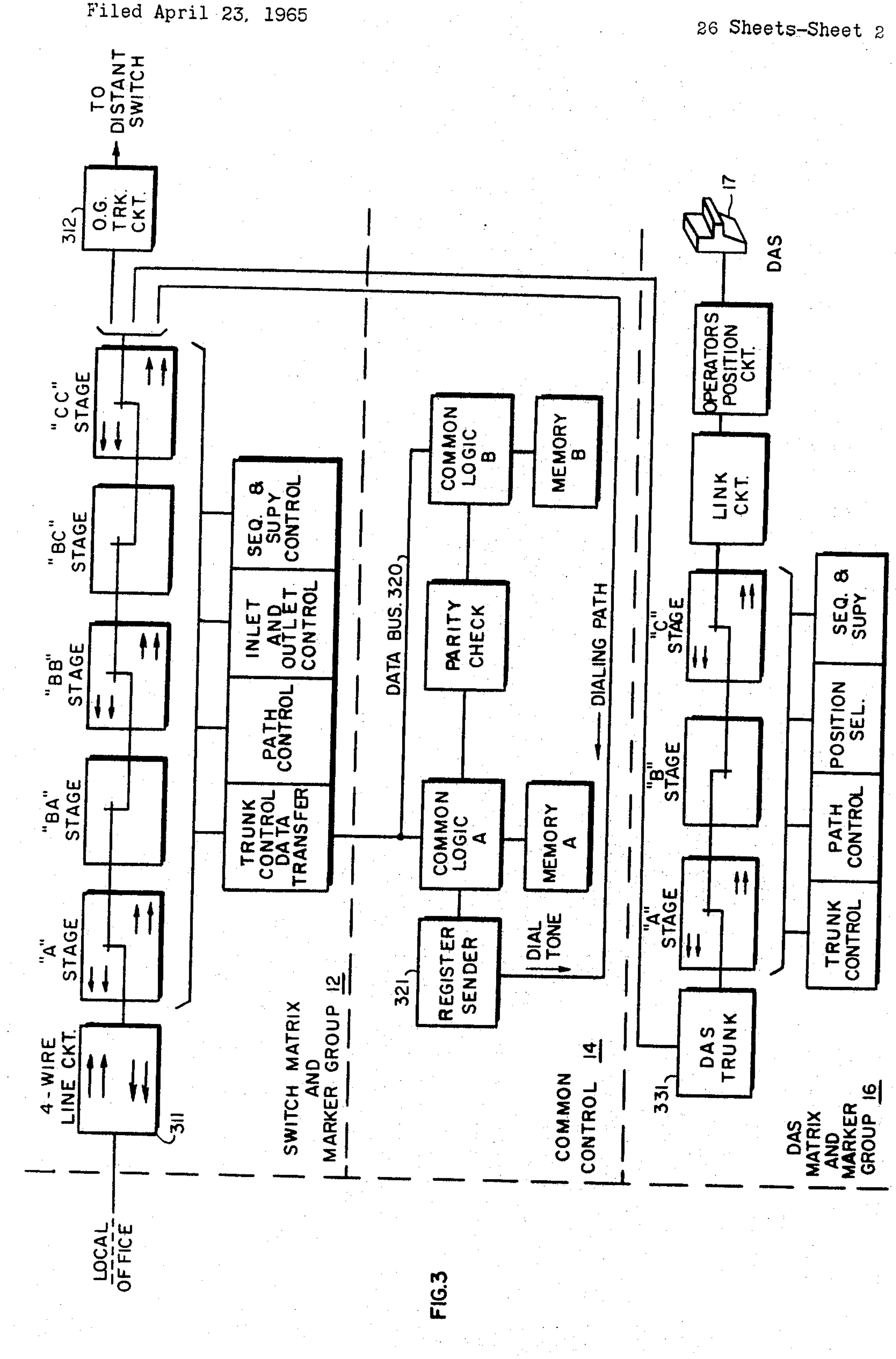
FIG. 3 is a block diagram showing the interconnections of the units of FIG. 1 for processing a call.

*2.1 Locally Initiated Call.*—As shown in FIG. 3, a locally initiated call from a local line having a line circuit 311 is extended via the switch matrix and marker group 12 to an outgoing trunk circuit 312. This outgoing trunk circuit, chosen by the common control group 14, terminates at the desired distant Switch.

The calling party initiates a call by lifting the telephone handset off-hook which causes seizure of the four wire line circuit 311 associated with the calling party. The line circuit extends the call for service to the switch matrix and marker group. The marker, continuously scanning the matrix control leads, recognizes this call for service and determines the location of the calling party. By determining the location of the calling party we mean the inlet to the switch matrix (A and C stage) the calling party's four wire line circuit is connected to. This is a permanent relationship and when the marker has determined the line number identification it is gated on to the data transmission path 320 and sent to the common control.

The common control scans the memory, and when it finds an idle register-sender 321, loads its equipment number location onto the data transmission path to be sent to the marker.

The marker now hunts for an idle path through the matrices from the line circuit at the A stage to the idle register-sender at the C stage. The line circuit 311 however appears at the A and C stage. This double appearance gives the marker two possible paths to interconnect the line circuit to the register-sender, which also appears at the A and C stage. If the marker is unable to find an idle path from the A stage to the C stage, the marker will proceed to hunt for a connection from the same calling party, but now from the C stage appearance of the line circuit to the same idle register-sender at its A stage appearance. This configuration assures a path will be found through the matrices as long as an idle register-sender is available. Zarouni U.S. Patent No. 3,041,409 relates to the principle of establishing a reverse direction connection, when a path for a forward connection is unavailable.

When an idle path is found one and only one path through the matrices is pulled by the marker to connect the calling party to the register-sender. The marker checks the connection for continuity, ability to hold, indicates to the register-sender the mode of dialing the calling party will be using and releases. For this example we will assume the mode of dialing is DTMF (dual tone multi-frequency). The register-sender 321 calls in a DTMF receiver to assist in processing the call. Dial tone is now returned to the calling party, and the calling party begins to key-in (dial) the number of the desired party. Upon receipt of the necessary digits, the register-sender 321 passes this information to the common control to determine the translation necessary for this call.

The register-sender calls the marker in a second time and the common control indicates the outgoing trunk needed for this call. The marker now establishes a new connection between the sender and the outgoing trunk 312 in the same manner it connected the calling party to the registers. The translated digits are spilled forward to the called office, and the priority and class of call are stored in the outgoing trunk via the common control. Once the register-sender has completed its functions, the marker is called a third time and instructed to drop the connection from the calling party to the register-sender, and from the register-sender to the outgoing trunk. The originating line and terminating trunk are held by the marker until the transmission path from the calling party to the outgoing trunk is established.

If this were a call to a subscriber served by the same Switch, the outgoing trunk would be replaced by a 4-wire line circuit. The general mode of handling the call would be the same.

*2.2 Call to Dial Assistance Switchboard (DAS).*—For purposes of example, we will assume the Switch being described is equipped with dial assistance switchboard (DAS), and to reach the operator a local station dials the digit 0, FIG. 3.

The call in its early stages is processed as presented in paragraph 2.1. The calling party initiates the call by lifting the handset off-hook, is then identified by the marker of the switch matrix and marker group and receives dial tone from the register-sender. The calling party dials the digit 0. After receiving the digit 0 the common control instructs the marker of the switch matrix and marker group to drop the connection from the calling party to the register-sender and establish a connection from the calling party to a DAS trunk 331.

A three stage, full availability, DAS matrix is provided for connecting a DAS trunk to a DAS position. The matrix is under control of the DAS marker. The marker is continuously scanning the control leads of the matrix for a call for service.

A call for service is extended to the matrix by a DAS trunk accessed via the matrix of the switch matrix and marker group. The DAS marker recognizes the call for service from a DAS trunk, and proceeds to process the call in much the same manner as the marker of the switch matrix and marker group. The DAS marker identifies the trunk calling for service and selects an idle position, and an idle link on the position to serve the call.

The operator can extend the connection for the calling party via a separate appearance of the DAS trunk on the matrix of the switch matrix and marker group. The operator extends the call by operating a key which, via the other appearance of the DAS trunk, will request a register sender through the matrix of the switch matrix and marker group. The call is then processed as previously described.

(3) EQUIPMENT GROUPS OF THE SWITCH

The equipment groups of the Switch use fully electronic controls for their speed and tremendous capacity. These controls are designed to be more than adequate for any future needs. Inter- and intra-Switch switching paths are completed by using relays and reed relays in the trunk and line circuits and reed relay assemblies in the matrices.

The reed relay assembly is essentially a cluster of reed capsules surrounded by coil windings. Each reed capsule contains two magnetic reeds. When the coil is energized the reeds are magnetized in such a way as to attract each other. The magnetic reeds have contact ends of diffused gold and since they operate in a sealed capsule, their life is measured in billions of operations. A typical reed relay assembly has two windings, an operate winding and a hold winding. Since the reed contacts are metal-to-metal contacts hermetically sealed they are immune to corrosion which might introduce noise.

The following paragraphs present in more detail the circuits of the various equipment groups.

Figure 2:
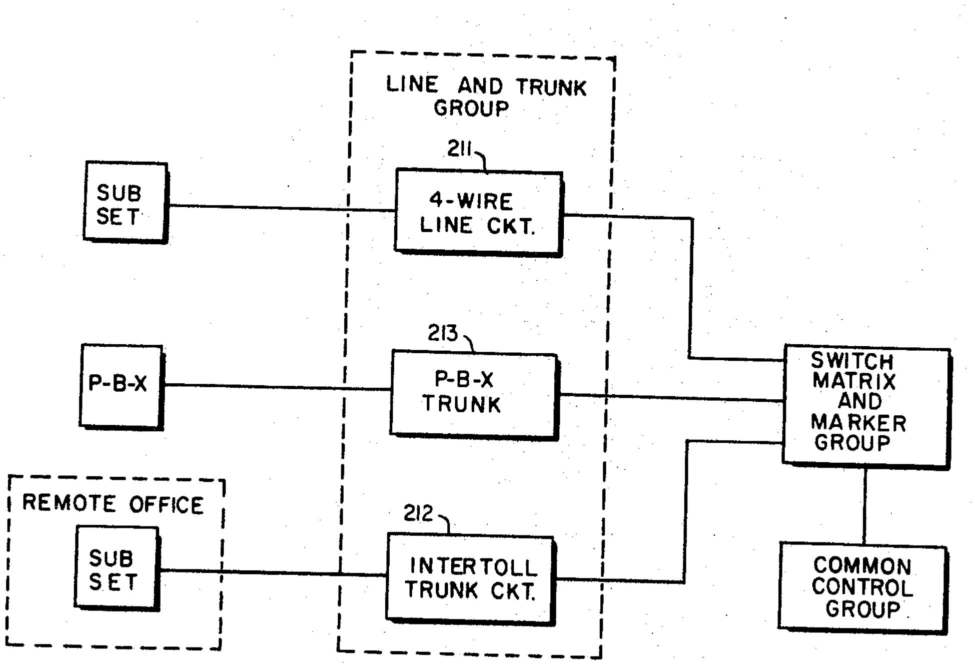
FIG. 2 is a block diagram showing the units in the line and trunk group which interconnect the outside lines to the switch matrix.

*3.1 Line and trunk group.*—The four-wire line circuits, incoming PBX trunks, and intertoll trunks, are the major circuits of the line and trunk group. These are electromechanical circuits consisting mostly of reed relays and relays. As shown in FIG. 2 these circuits terminate at the switch matrix and marker group.

*3.1.1 Four-wire (DTMF) line circuit.*—The four-wire line circuit 211 provides the connecting termination between the subscriber and the switching equipment.

The line circuit is arranged for E and M signaling. When the subscriber lifts the handset off-hook the line circuit is informed of a request for service and extends the call for service to the switch matrix and marker group. On a call to a station the line circuit will cause the called station to be signaled.

Each line circuit uses two main paths to connect to the equipment in the Switch. One path is via the matrix of the switch matrix and marker group to the register-sender, of the common control, other lines, trunks, etc. This is a six-wire circuit which includes the four-wire directional transmission path and two control leads. The other path is via a data transmission path which provides for exchange of information between the line circuit and the common control.

*3.1.2 PBX trunks.*—The PBX trunks 213 are arranged for four-wire directional transmission and E and M signaling for the PBX to the Switch. Two types of PBX trunks can be provided. The first type provides two-way service to a distant PBX attendant. The second type will provide two-way automatic-to-automatic service between the Switch and the attendant or stations of a distant PBX.

*3.1.3 Intertoll trunks.*—Intertoll trunks 212 provide through and terminating service for calls originating in the distant switching centers. Locally terminating lines and trunks are given access to distant switching centers through these trunks. All intertoll trunks are arranged for two-way operation with E and M signaling facilities. Transmission is on a four-wire basis.

*3.2 Switch matrix and marker group.*—The switch matrix and marker group consists of a three or five stage matrix depending on matrix size required by the Switch and an electronic marker provided in duplicate. The actual switching of calls through a Switch is accomplished via the matrix, under control of the marker.

The metallic path for talking and dialing is established through contacts of the reed relay matrix. The path through the matrix to be switched (completed), selection of an outlet corresponding to a line or trunk circuit, and intergroup communication (Switch matrix and marker group to common control etc.) is accomplished by the marker.

Figure 4:
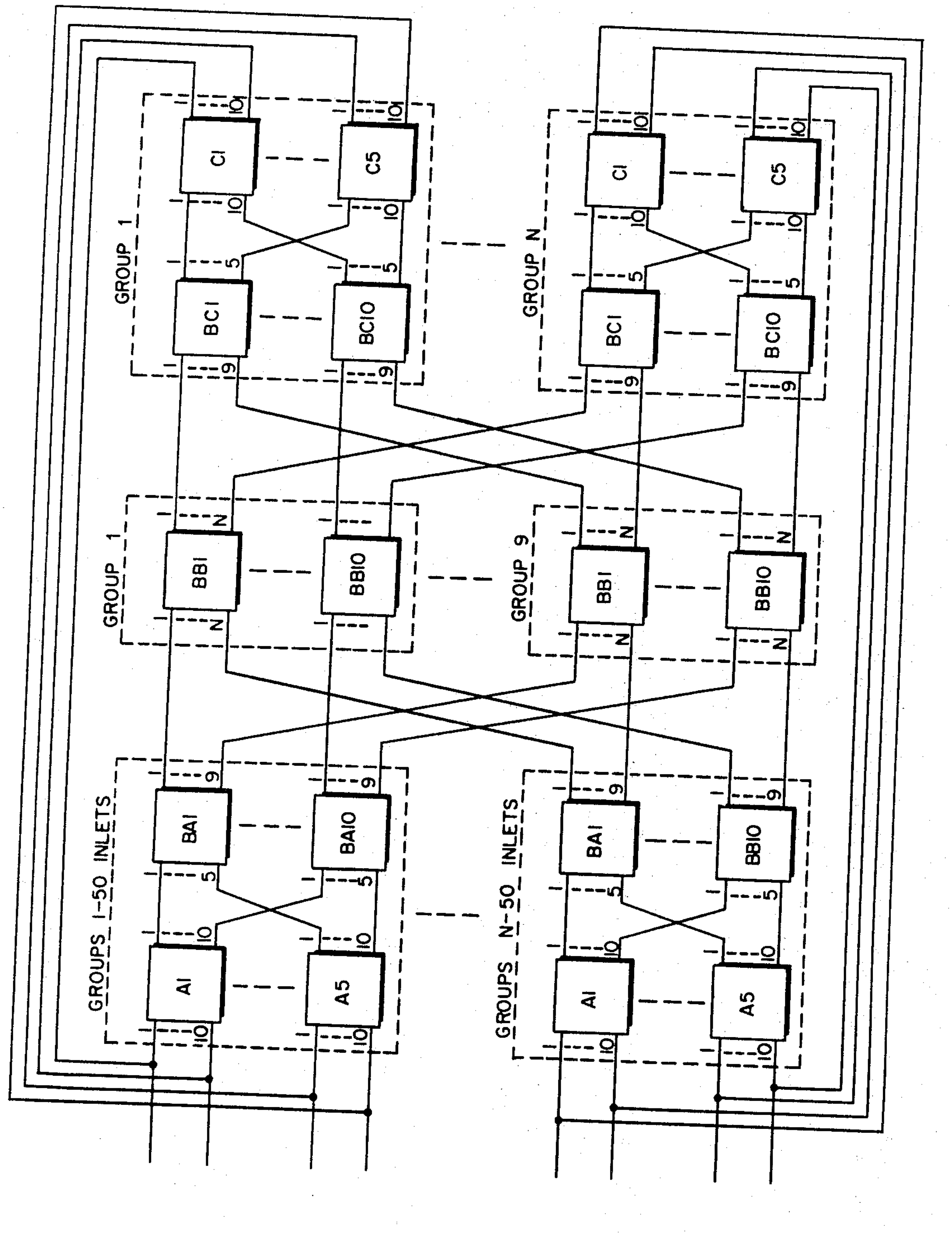
FIG. 4 is a block diagram of the switching network.

*3.2.1 Matrix.*—The matrix of the switch matrix and marker group as arranged in a Switch is nonblocking. This nonblocking feature assures that there is no internal link blockage in the Switch; once an outlet to the matrices is identified and the desired outlet is found idle, a path will be found through the matrices to interconnect the two. It therefore does away with any possibility of link congestion. This matrix can be expanded from 100 to 2000 lines. The matrix is built on a modular basis with A, BA, BC, C stage growth in 50 inlet groups. The basic building block is a fifty crosspoint reed relay matrix card assembly capable of interconnecting any one of five circuits to any one of ten circuits. The reed relay matrix card assembly is capable of switching frequencies of 50 kilocycles. The physical size of the matrix will vary from Switch to Switch. A five stage system is shown in FIG. 4. Since the matrix is nonblocking every line and trunk, either one-way or two-way will have an appearance on the input of the primary A stage and an appearance on the output of the final C stage.

There is a total of seven leads extended through the matrices. Six leads are switched, these are the four transmission leads, and the hold and supervisory leads. The seventh lead, the pull lead, is not switched.

As shown in FIG. 4, the inlets to the matrix are in groups of 50, five per card. An inlet can have connected to it one of the following: four-wire line circuit, PBX trunk circuit, intertoll trunk circuit, a register sender, or DAS trunk, conference trunks, test terminations etc.

*3.2.2 Marker.*—The basic function of the marker of the switch matrix and marker group is to provide the controls necessary to interconnect switching unit inlets and outlets via an available idle path through the matrices. This includes the following operations: identification of inlet, path selection, completion of connection and communication with the common control.

Figure 5:
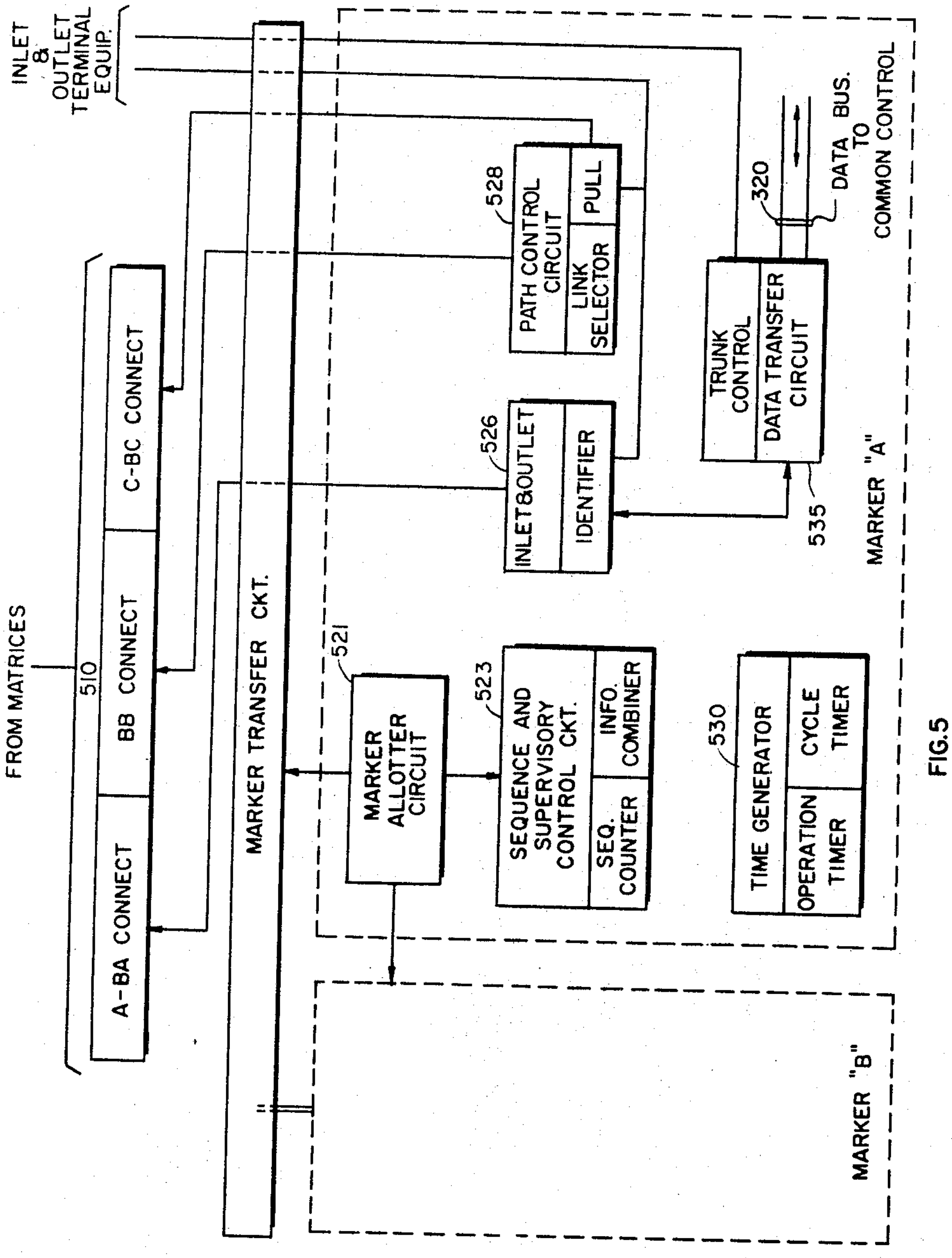
FIG. 5 is a block diagram of the marker.

The tasks performed by the marker in processing a call are controlled by the sequence and supervisory circuit 523, FIG. 5. This control can be compared to a programmed computer in that the marker follows a fixed plan of operation. Information signals from all circuits of the marker, indicating the progress of the operation, are combined by the common logic of the information combiner to generate the commands needed to perform the next operation. The supervisory control function includes the sequence counter, which advances the sequence state, a clock circuit to provide pulses to synchronize operations within the marker, and a timing circuit that provides the proper timing outputs to sequence electronic operations.

Calls are handled by the marker on a one-at-a-time basis, thus eliminating double connections within the matrix. The marker is continually scanning for service requests from inlets and the common control equipment. When an incoming call or an inlet requests service, it signals the identifier of the inlet-outlet control circuit 526 by means of a contact on a trunk circuit relay. The identifier functions to provide the inlet trunk location identity of this calling inlet, locking out all other inlets that may be requesting service at that time. The marker transfers the inlet trunk identity to the common control via the data transfer circuit 535 and the data transmission path 320 and requests the location of an idle register-sender. The register-sender location is received by the marker and gated into that portion of the identifier for access to the register-sender. The marker now has sufficient information to mark the end points of the inlet-to-register connection.

Matrix connect reed relays of the A–BA–BB–BC–C–stage connect circuit 510 are operated to connect the group of "C" leads which will be scanned by the path control circuit to determine an idle path.

The above statement, that the marker handles calls on a one-at-a-time basis, does not rule out the possibility that more than one line or trunk circuit could almost simultaneously generate calls for service to the matrix. The call serviced first, will be the call seen first by the identifier, in the marker, used to identify the calling line or trunk. When the marker completes its cycle of operation, it will service the next call seen by the identifier.

When an inlet is identified, its trunk connect reed relay is operated, which places negative battery on the associated pull lead of the A stage matrix. Under the control of the marker, the C leads for the outlets of the A–BA group where the identified inlet appears are connected via a common switch terminal control path to the link selector of the path control circuit 528. Similarly the C leads for the outlets of the B–BC group where the register-sender appears are connected via the common switch terminal control path to the link selector. The C leads are now scanned for the coincident idle condition of links which defines a unique idle path.

On finding an idle path, the path control circuit 528 places ground on the selected idle link pull lead. With the pull leads of the inlet and register-sender marked, and the BB to BC link pull-lead grounded, one crosspoint reed relay in each of the A, BA, BB, BC and C matrices is operated to complete the connection from the identified inlet to the assigned register-sender. At this time a conventional cut-off relay in the inlet circuit operates to signal busy and inform the marker that the connection is complete. The marker tests the tip and ring conductors while applying a "wetting current" through the transmission loops of the operated connection. The marker can now inform the common control the connection is complete, clear the marker circuits, and return to the idle state to scan for additional requests for service.

After the common control processes an incoming call, the marker is re-called by the common control to connect the sender associated with the active register to an idle trunk. When recognition is received, the common control transmits, via the data transmission path 320 and marker data transfer circuit, the trunk location identity of both the the sender and idle trunk. With this information the marker positions the identifier in the inlet and outlet control to access the two end points of the connection. As before, matrix connected reed relays are operated to close "C" leads into the path control for selection of an idle path. The marker proceeds to complete the connection by selecting an idle path and pulling the connection. At this point, the common control is signaled of the successful completion of the operation.

*3.3 Common control.*—The main function of the common control equipment 14 is to provide the Switch with registering, sending and translating capabilities. In addition it provides permanent and temporary storage facilities for each trunk and line in the office. It will constantly monitor these trunks and lines, select a proper path through the office, the proper outgoing route, and direct the marker of the switch matrix and marker group to switch the path, when required.

Figure 6:
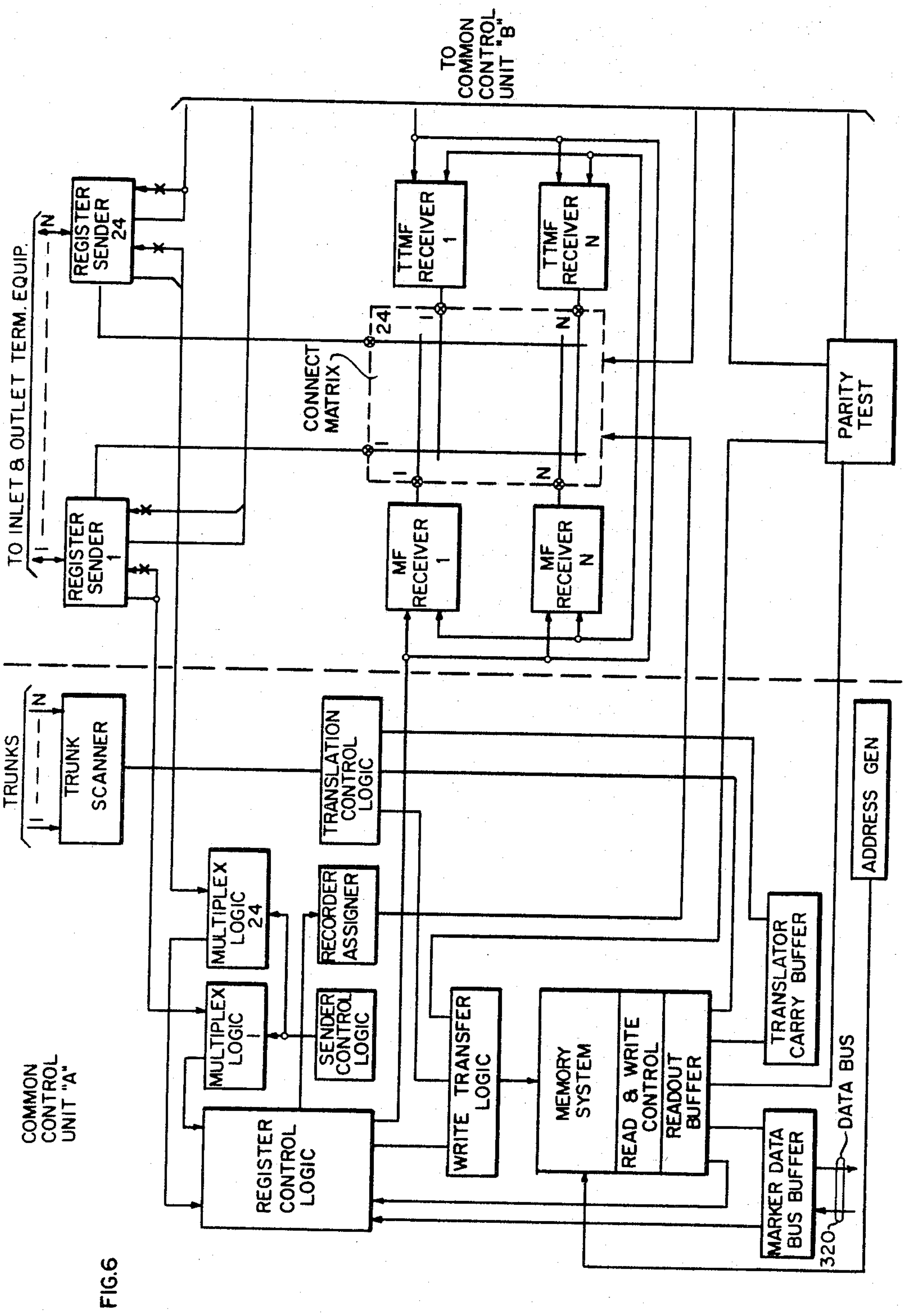
FIG. 6 is a block diagram of the common control unit.

The common control circuits with the exception of the register-senders, receivers (which are supplied according to traffic requirements), connect matrix and parity test circuit are provided in duplicate, FIG. 6. The units are synchronized, simultaneously processing the same information. A comparison is made between these two units. All outgoing information is simultaneously presented from both units. Only one unit is in control, but both are processing the calls. Any time a discrepancy is found between the information preselected by the two units, the one in control is temporarily removed from service. The unit not at fault is then connected to the conductors and any information that had been interrupted is re-sent. All calls in process may be successfuly completed even though one of the common control units is temporarily in trouble.

The common control is subdivided into several functional sections, each having its own independent logical control. All functional groups utilize the memory system although each is assigned an independent group of cores large enough to satisfy the memory requirements of the particular section.

*3.3.1 Register-sender.*—The register-sender group constitutes a functional section and is a time shared unit with the ability to register and process as many simultaneous calls as is required by a particular Switch.

The register-sender serves as the inlet and outlet device to the common control group needed so that registration and sending may be performed. A register-sender is accessed from the switch matrix, A or C stage. This circuit provides the real time supervision of lines and trunks for space-division switching of outside facilities. As such, the register-sender employs reed relays for all switching functions of the common control which require direct connection to the calling line or trunk. These functions include dial pulse repeating, dial tone control, battery feed to the calling line and outpulsing. Sending (outpulsing) can be either DP or 2/6 MF, the latter is used on most inter-office trunking.

*3.3.2 Receiver pool.*—The registers have available to them both DTMF and 2/6 MF receivers organized in a pool and assigned as required by the receiver assigner.

(a) Dual tone multifrequency receiver. This circuit provides the system with the capabilities for receiving information on the dual-tone multifrequency basis. It receives alternating-current signals in two-out-of-eight code and converts these into direct-current logic level signals and presents them for storage in the memory.

(b) Multifrequency receiver. This circuit provides the system with capabilities of receiving information on a multifrequency basis. It receives the alternating current audio-frequency signals in a two-out-of-six code and converts them into direct-current logic level signals and presents them to the common control for storage.

*3.3.3 Common logic circuits.*—(a) Multiplex logic circuit. This circuit provides a means for a two-way transfer of information between the register-sender and the electronic time divided common control components. One lead-multiplex circuit is provided per register-sender. This circuit is used to transfer information to the fast acting electronic equipment from the slower reed relay controlled register-sender, or vice versa.

(b) Receiver assigner. The receiver assigner provides the selection control to establish a connection from a register-sender to an idle multi-frequency or dual tone receiver. It couples any of the register-senders to any of the multifrequency receivers or dual-tone multifrequency receivers in the receiver pool.

(c) Marker data buffer. This circuit provides for communication between the Switch group marker and the common control equipment. It provides a means to transfer the originating equipment number from the marker to the common control for storage in the early stage of a call and later it is used to send the originating number, terminating equipment number, priority level of call in process, alternate route, special trunk terminating indication, and incomplete dialing indication from the common control memory to the marker.

(d) Register controller. This circuit provides timing logic, information transfer logic, decision control logic and carry control logic. This circuit arranges, in association with the memory system, the dialed digits to be written into the memory. As many as 14 dialed digits can be arranged for presentation to the memory.

(e) The translator controller. This circuit is used to control the system translation function. The functions performed can be divided into three categories; decision networks, timing networks, and arrangement networks. The decision and timing functions provide the necessary system control while the arrangement networks assure that information is in the correct location in the memory.

(f) Translator carry buffer. This circuit provides a two-way parallel data-communication link between the translator portion and the register-sender portion of the common control. Information is presented to the translator carry buffer from the read-out buffer of the memory system. This information is then used to locate in the translation storage area the information needed. The resulting translation is then entered into storage in the register-sender area that requested service.

(g) Sender controller. The sender controller provides the gating control needed for proper transfer to the sender of the dialed digits. It also controls the sending mode used to outpulse these digits.

*3.3.4 Memory system.*—The circuits that comprise the memory system are the memory read and write control circuit, the ferrite core memory and read-out buffer. The read and write control circuitry provides current pulses needed in transferring information to and from the cores of the ferrite core array.

The ferrite core memory array provides temporary storage for the register-sender control logic and both permanent and temporary storage for the trunk scanner and translation. The memory is sequentially accessed or randomly accessed. Sequential access occurs during the register-sender scan whereas random access occurs during translation. It is capable of providing only the required memory section for any function. Since the memory is a modulator unit, it can grow in fixed increments, each word consisting of 44 cores. Each register-sender is assigned 8 rows of ferrite cores, each row comprising 44 cores. Each register-sender is assigned a time slot. Each row is accessed by sub-time slots. Additional rows may be provided for storage of the maintenance programming functions. The total number of memory rows that are assigned for the register-sender memory is dependent on the number of register-senders required in a given Switch. The size of the ferrite core memory provided for the translator is dependent on the number of unique codes to be translated and the number of routes to be generated.

The readout buffer provides a buffer storage for memory readout. This circuit is also utilized to shift information during a particular subtime slot from one position to another.

*3.3.5 Write transfer circuit.*—This circuit allows information from either the register-sender control logic, the translator control logic, or the common control parity test logic to be transferred to the write control of the memory system.

*3.3.6 Address generator.*—This circuit provides memory access pulses and control pulses so that the memory can be scanned either sequentially or in a random access mode.

*3.3.7 Parity test logic.*—This circuit compares the memory system output of common control unit A with that of unit B. During normal operation the outputs of both units should be identical. If they do not match, an alarm condition exists.

*3.4 DAS position group.*—The function of the operator at the dial assistance switchboard is to provide services such as directory information, intercept service (when use of a recorder announcer is not applicable), conference assistance and recording calls, and signalling assistance.

The number of positions provided depends on traffic requirements. Each position is equipped with eight links which are accessed by the DAS group matrix under control of the DAS group marker. Local DAS trunks have two appearances on the main switch matrix, one for extending the call to the DAS matrix and the operator, and one to allow the operator to extend the call via the switch matrix. (This duplicates the front and rear operations of a manual board.) Tributary trunks have an appearance on the main switch matrix for extending the call from the Switch.

The call distribution portion of the marker contains a position scanner, operated on a sequential basis in order that calls may be evenly distributed to operators.

Figure 7:
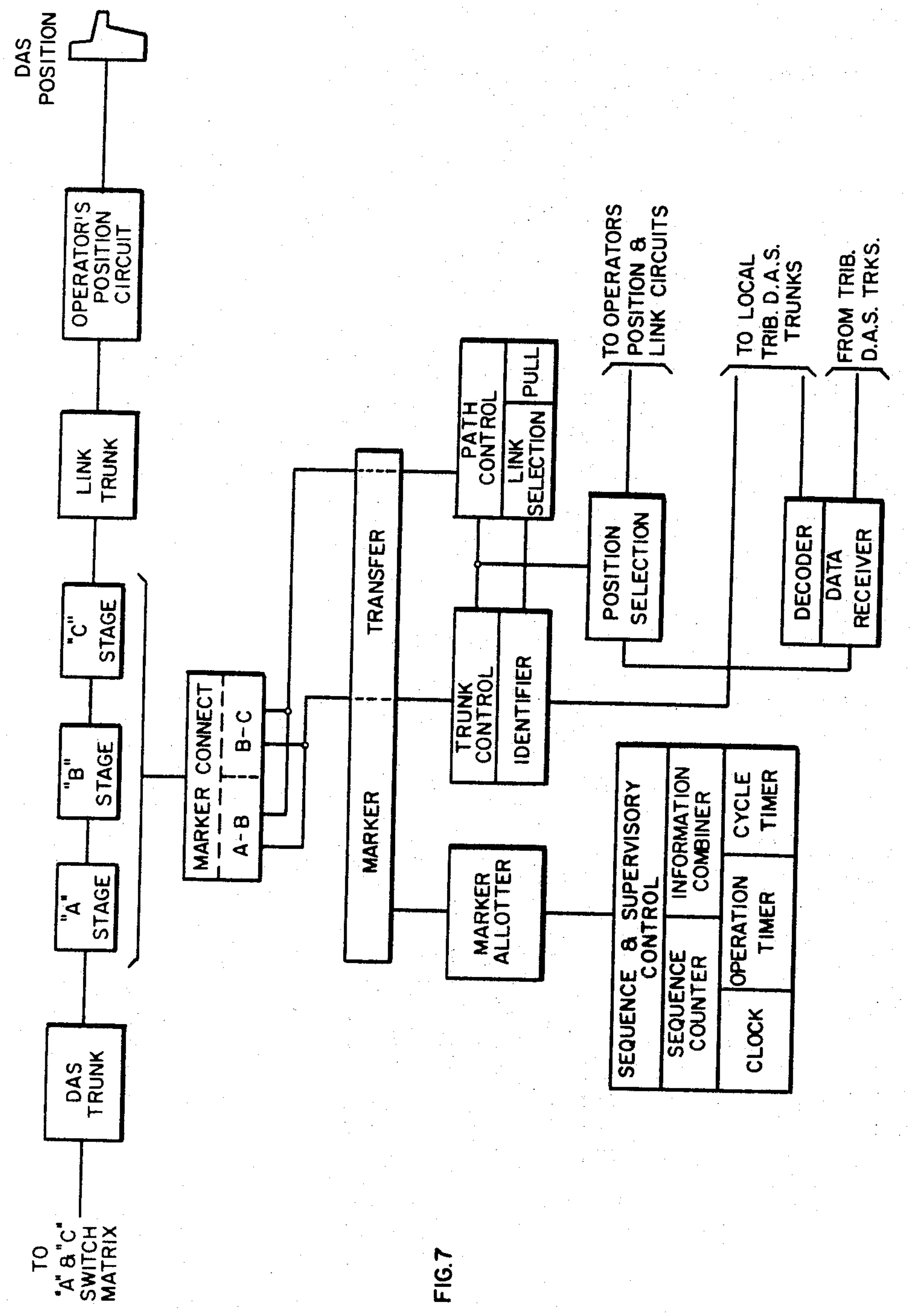
FIG. 7 is a block diagram of the dial assistance switchboard (DAS) matrix and marker group.

*3.4.1 DAS matrix.*—Calls destined for an operator are routed to a DAS trunk, FIG. 7. The trunk signals for an operator through the DAS matrix. This signal is received by the DAS marker which allots the next available position to the call if the type of service check indicates this position can handle it. The call is now switched through the three-stage matrix.

The matrix is arranged to handle both incoming calls to an operator and outgoing calls by an operator. The same DAS trunks are used in both cases.

*3.4.2 DAS marker.*—The function of the DAS marker is to provide the control necessary to interconnect operators' trunks to and from the operator link circuits via an available idle path through the matrix, FIG. 7. The DAS marker is similar in design to the marker of the switch matrix and marker group. The basic functions of the marker are: identification, call distribution on a type basis, path selection, completion of connection. An auxiliary function is that of obtaining the class and priority of a call from a tributary assistance trunk.

*3.5 Conference equipment.*—The interconnection or conferencing of three or more parties where each party must be able to talk to every other party requires special treatment. This is especially true in the case of four-wire transmission. Two four-wire stations are connected over two transmission pairs, one pair for each direction of transmission. To add a third party to the connection, a network must be provided that not only allows transmission both ways between each of the parties, but does not introduce losses or feedback that would tend to degrade transmission.

A six-way, four-wire conference bridge is used to allow up to six conferees at a time to hold conference. It is also possible to interconnect two or more conference bridges to allow additional conferees to be included in a single conference.

There are two types of conference arrangements possible, random conference and preset conference.

Figure 8:
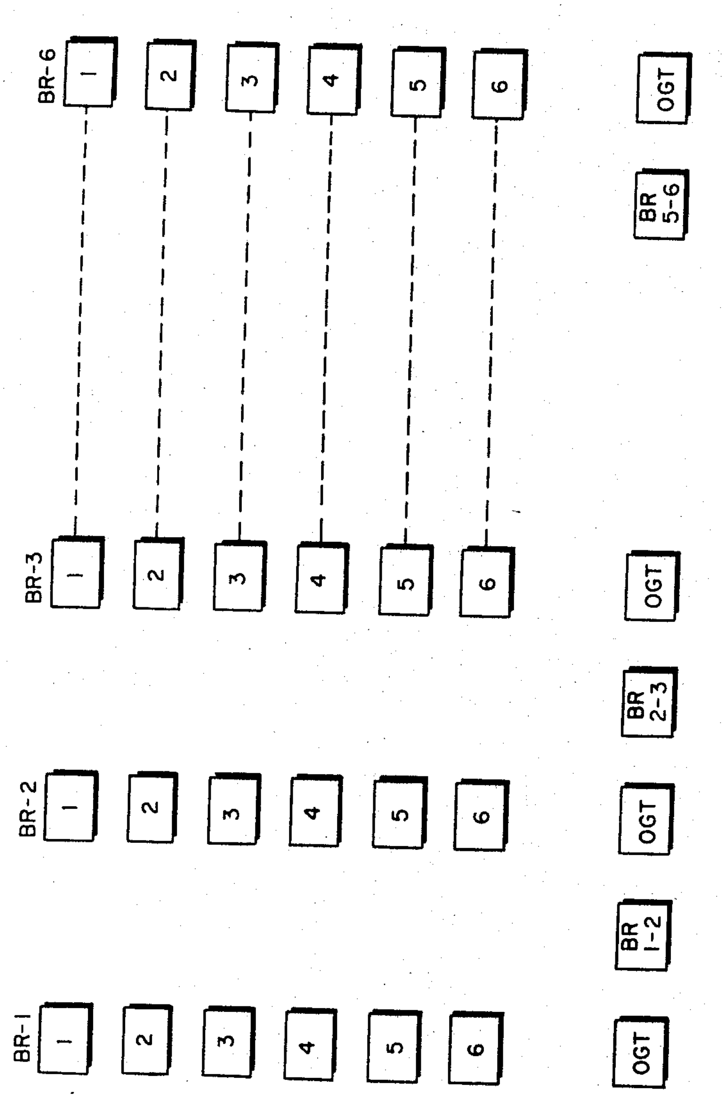
FIG. 8 is a diagram of a key panel.
Figure 9:
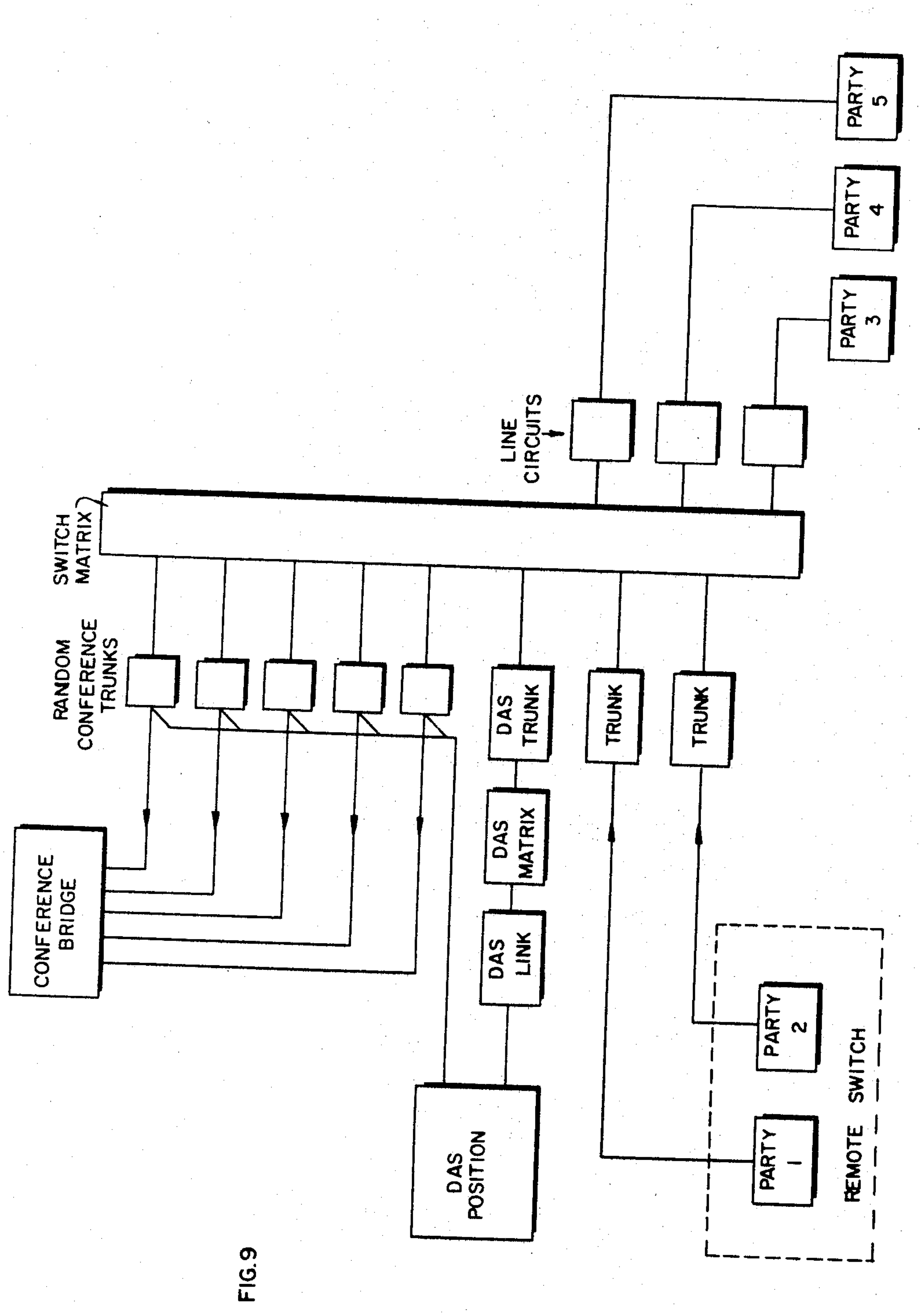
FIG. 9 is a diagram of a random conference arrangement.

*3.5.1 Random conference.*—This arrangement is controlled by the operator at a dial assistance switchboard. On instruction to establish a conference of up to six parties the operator will select an idle bridge. Depressing the associated keys (1 through 6) for the number of participants opens the required number of paths to the bridge, FIG. 8. The lamp associated with each depressed key will flash. Each participant will dial an abbreviated code that automatically brings him into one access of the bridge, FIG. 9. As this occurs the lamp associated with this access glows steadily. As each participant retires from the conference, the associated lamp goes dark.

To set up a conference for more than six parties but not more than 10 (again using the BR–1 keys), the operator would also operate the BR 1-2 key and also the BR–2 keys depending on the number of additional parties. If more than 12 parties were to be added, key BR 2–3 would also be operated.

The above example illustrates using a bridge or bridges in the same office. A conference arrangement employing connected bridging configuration in separate offices is also possible.

*3.5.2 Preset conference.*—A preset conference can be set up at any station equipped with a preset-conference console. The associated circuitry is located in the switch associated with the station. By keying a programmed code a preselected group of stations are signaled.

Figure 10:
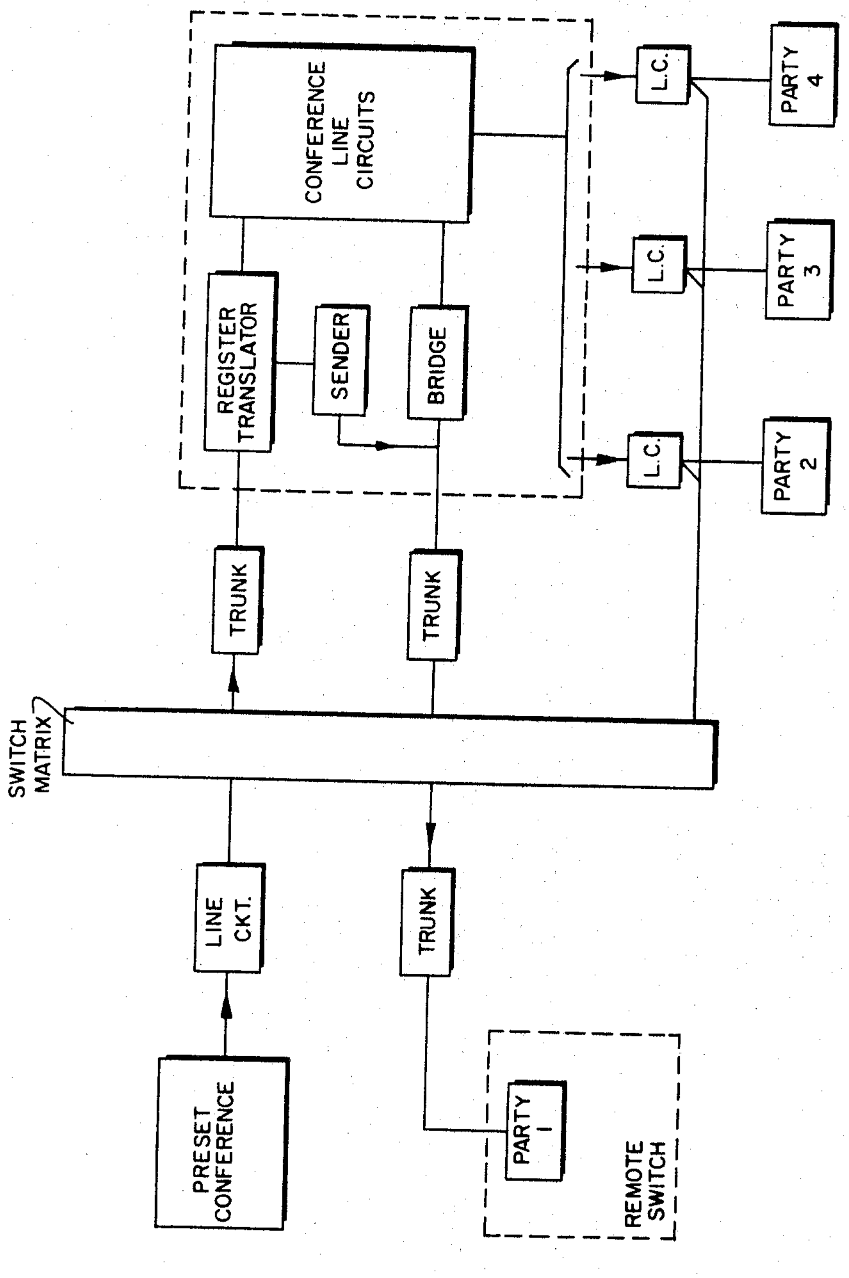
FIG. 10 is a diagram of a preset conference arrangement.

The preset conference is a completely different arrangement from the random conference, and requires the equipment shown in FIG. 10. The main components are the control console, combination switch, and roll call equipment.

The combination switch, consisting of the circuits shown in FIG. 10, is programmed so that when the party at the control console sets up a conference by keying in a preset code, a selected group of stations will be signaled. Usually a three-digit code is used and the pattern of selected stations can be varied by means of different access codes.

Calls to other combination circuits in other Switches will result in connections to four-wire stations in other centers.

A roll call arrangement is used to signal the console that is initiating the conference.

Since a station may be engaged in another call when a conference is initiated the station may either be cut into the conference automatically after a warning tone is placed on the line and a five-second time out interval, or using only the tone without the automatic transfer.

*3.6 Test Group.*

Figure 11:
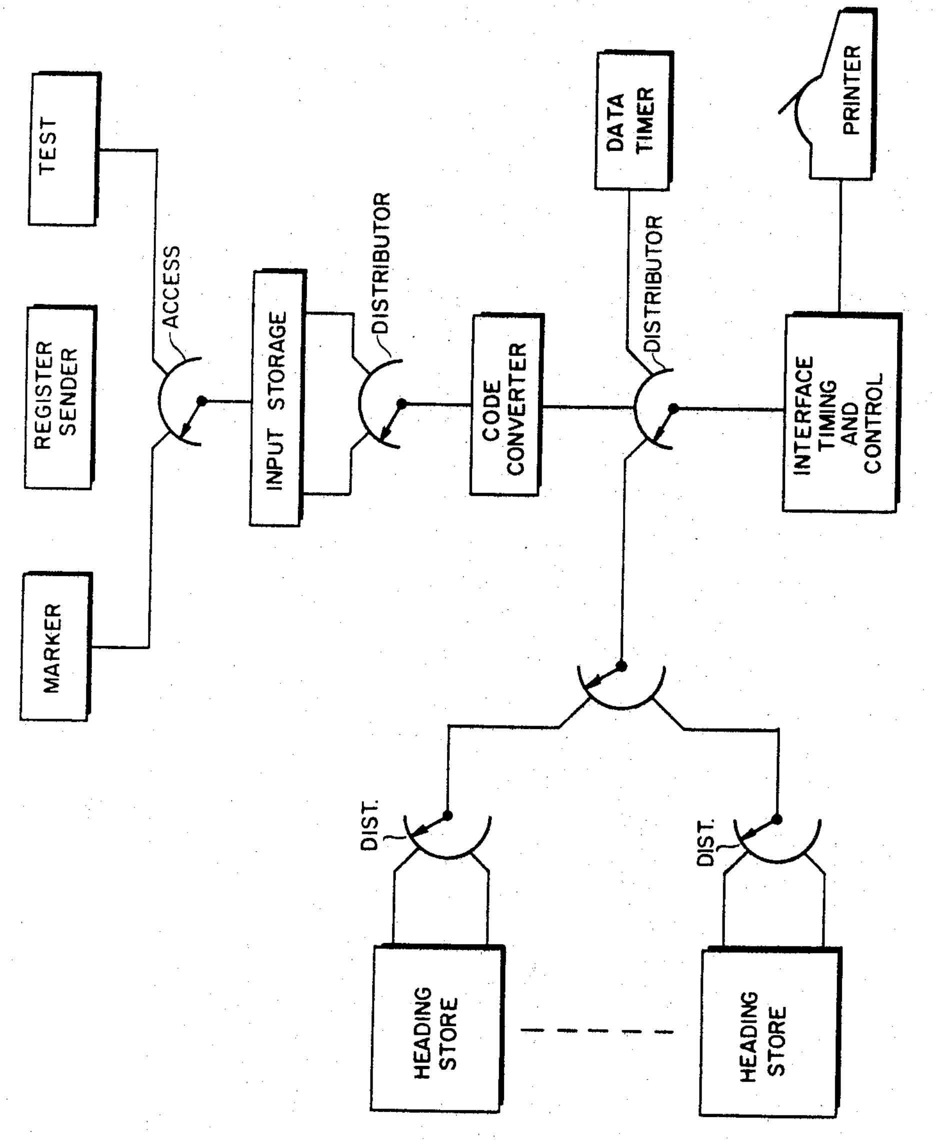
FIG. 11 is a diagram of the trouble analyzer.

*3.6.1 Trouble analyzer.*—The trouble analyzer, FIG. 11 provides the self checking function of the common control equipment. Continuous automatic testing of critical common control subsystems, such as the memory, common logic, trunk scanner, etc., is mandatory because of the serious consequences of undetected malfunctions. The trouble analyzer is basically a third skeleton common control, which provides a "standard" for comparing the outputs of the common control subsystems when the output of the two is not in agreement. If a malfunction is discovered, the trouble recorder is informed via the trouble recorder access circuit.

The trouble recorder provides a printed record of the information available from the equipment having a malfunction. The trouble recorder access circuit provides the circuitry necessary to connect the equipment to be monitored for malfunction to the trouble recorder.

The heading storage provides the printer with the name of the particular piece of malfunctioning equipment.

The storage register connects the leads from the equipment to the trouble recorder, over which the information available from the equipment is passed.

The printer for the trouble recorder is similar to a Teletype Model 28 receive-only printer. The printout will be in code form, which can be easily interpreted by consulting the trouble dictionary.

*3.6.2 Register-sender routiner.*—The register-sender routiner provides for testing of the register-senders. The testing can either be automatic, under the control of the automatic control, or manual, by the maintenance man using the control panel.

The automatic test routine consists of tests performed sequentially on each register.

The control panel permits the maintenance man to select the test conditions and register he wishes to check. The register-sender automatic test checks each register for tone reception, storage of bits in register portion of memory, proper registration of pulsing, proper sender out-pulsing, class-of-service recognition, pre-emption functions, and proper disposition of nonstandard situations. The control panel provides for a manual access of a preselected register, manual choice of test termination, manual selection of input pulsing, repeated test of any register, stop upon test failure, count number of test failures, count number of units tested, and four-wire audio termination.

*3.6.3 Automatic trunk routiner.*—The automatic trunk routiner provides for the automatic routining of intertoll and PBX trunks to insure early discovery of malfunctions in the trunk equipment.

Associated with the routiner is a printer, similar to a Teletype Model 28 printer, which records the number of the trunk failing a test and the nature of the failure. Peg count meters are provided to count the number of trunks tested, the number of circuits passed busy, the number of test failures, and the number of repeat tests completed. Trunks found faulty by the routiner are automatically busied out.

The automatic trunk routiner is placed in operation by operating keys at the control panel. A "preset" selection circuit is provided, which permits the tester to test a specific trunk, or to start a routine with a specific trunk.

While trunks are under test, they will be marked busy to normal traffic. The test call made by the routiner will not score the normal traffic peg-count meter associated with the trunk.

All trunks in the facility are routined sequentially. When the last trunk has been tested, a signal is given indicating that testing is complete. A repeat control key is provided, which when operated, inhibits the stepping mechanism and causes a selected trunk to be routined continously. A "single" repeat testing failure is also provided for recycling a test on a particular trunk.

Lamps provided on the control panel identify the trunk being tested and indicate the progress of routining.

*3.6.4 Toll testboard.*—The toll testboard provides the facilities to test all through trunks in the switching facility. The toll testboard enables the maintenance technician to terminate, test, and patch physical lines. It also enables him to make overall trunk tests such as monitoring, talking, transmission, measuring and signaling, toward the line or carrier facilities. In addition, facilities are provided to make the trunk to be tested busy, and remove it from service.

*3.7 Station apparatus.*—The station apparatus for the Switch is a four-wire subset, similar in design to the Automatic Electric Type 880 speakerphone (U.S. Patent No. 3,136,864 issued June 9, 1964). The subset contains an electronic ringer mounted on a replaceable modular printed wiring card. The subset is equipped with an addressing keyset, instead of a dial, and also a four-button priority keyset.

In all but routine calls, the correct priority button is depressed immediately prior to dialing with the addressing keyset.

If a station is equipped for abbreviated dialing, an extra button is mounted with the addressing keyset, in the lower right hand corner. This button must be depressed before using the keyset.

The "hot line" subset is similar to the normal station apparatus just described, except it does not contain an addressing keyset or priority keyset. As discussed earlier, a "hot line" connection is a permanent connection or is established by lifting the handset. It was also stated that a "hot line" subset cannot be used for establishing any type of call other than a "hot line" connection.

*3.8 Power group.*—The Switch power plant is a 50-volt DC system. A power control board regulates voltage and distributes power through fuses to the various equipment frames. The power plant includes duplicate source supplied for dial tone, busy tone, ringback tone, ringing current and accessory pulses required by the switching equipment.

All power for electronic equipment is derived from the office battery using DC to DC converters. Battery and ground are distributed to each frame of electronic equipment. Generally one or more static converter modules and the required number of voltage-regulator modules are provided per frame of electronic switching equipment.

To aid in fault isolation, alarm-type fuses are provided on a "per regulated voltage basis" for each file of electronic circuit cards. Electronic ground is common to the outputs of all regulator modules in a given frame of equipment.

The positive side of the 50-volt DC supply is grounded in accordance with conventional telephone practice, to minimize the hazard to personnel and equipment caused by an accidental cross with high-voltage lines. A conductor is provided for this purpose. All conductor shields are connected to a grounding conductor at one end only, and are insulated from all equipment supporting frames.

(4) DETAILED DESCRIPTION

*4.1 Trunking, routing, signaling; and line and trunk design.*

Figure 12:
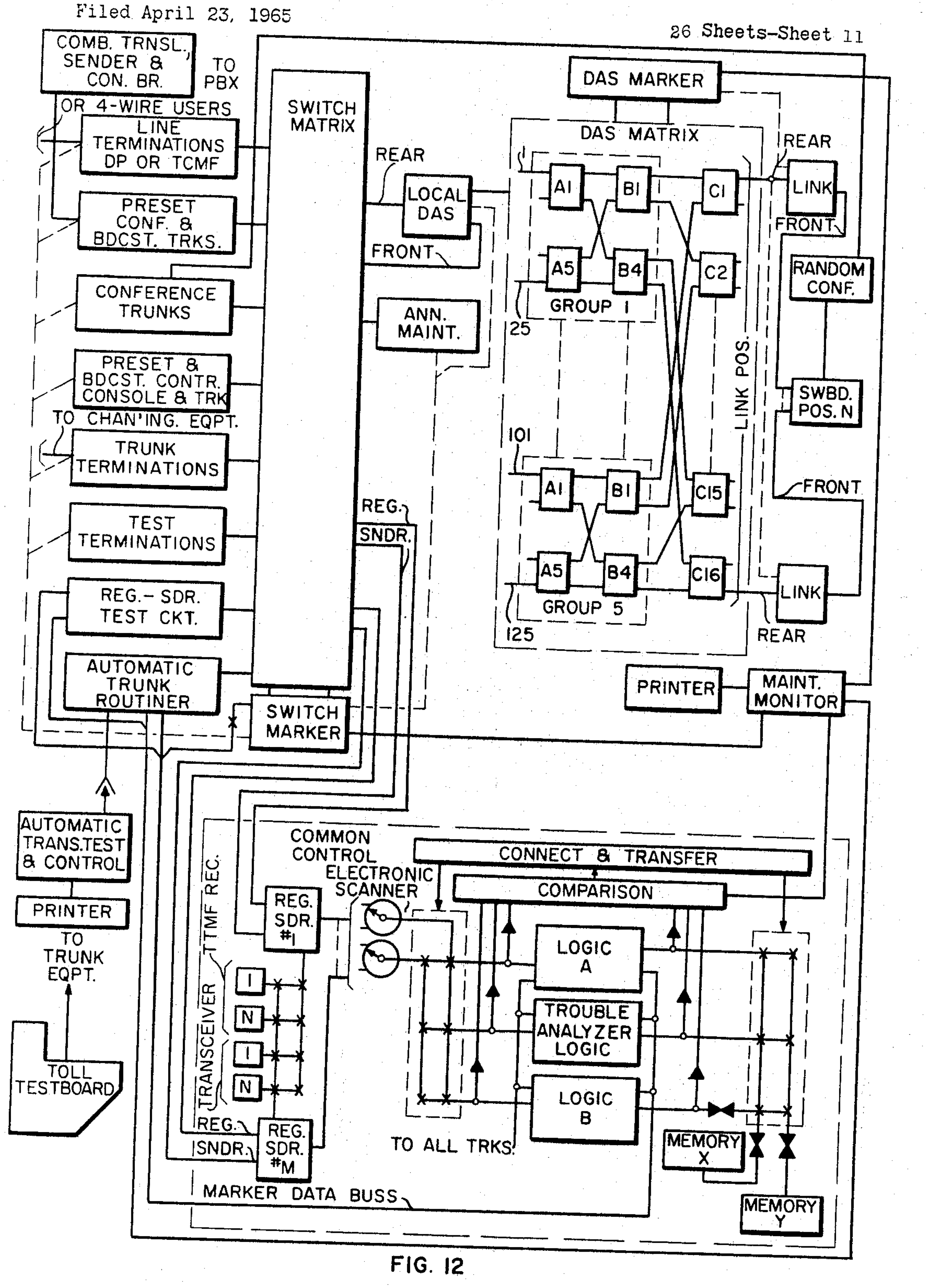
FIG. 12 is a system block diagram.

*4.1.1 Trunking plan.*—The automatic voice network system is a non-blocking system, with regard to intra-office trunking, and this requirement essentially dictates the design of the line and trunk circuits. In common-control offices for commercial service, the originating and terminating junctors that provide battery feed, ringing, supervision, etc., are provided in an amount calculated to provide a specific grade of service; to provide non-blocking operation in such a system the number of junctors would have to match the number of lines terminated on the switch. In this system, the junctors have been combined with the line circuits and PBX trunk circuits. FIGS. 1 and 12 are block diagrams of the Switch. To fulfill the non-blocking requirement, each trunk and each line circuit has an appearance on both the A and C stages of the switch matrix. Connections to the register, sender, DAS trunk, tone trunks, or other trunk circuit are made via the switch matrix.

The DAS trunk has multiple appearances on the switch matrix and the DAS matrix (FIG. 12); allows connection of one subscriber on the "front" of the link and a second subscriber on the "rear."

*4.1.2 Routing and signaling plan.*—The routing plan associated with the system must be highly flexible, not only to provide normal alternate routing but also to fulfill military needs for survivability routing. To meet these requirements, the routing plan for the system is based on originating-office control or end-to-end signaling with spill-forward in certain specific instances. End-to-end signaling, rather than point-to-point signaling, lends itself quite readily to a network which has a limited number of offices of equal rank, with each office being capable of quick reaction to routing changes in the network. The Switch, with its electrically alterable memory, has the capability of incorporating routing or trunking changes very rapidly. Certain offices, however, do not have extensive routing capabilities and are considered tributaries of "spill-forward" offices; they must pass all routing information to an office having routing capabilities.

With originating-office control it is necessary to employ more signals between offices within the network, and to recognize different signals from other networks when they interconnect with this system. Military needs for highly reliable signaling means over various transmission facilities are best met by confirmation signaling. This is therefore made a system requirement. Information exchange within the system consists of two-out-of six (2/6 MF) multifrequency, dual tone multifrequency (DTMF) or dial pulse (DP) signals.

The 2/6 MF is currently used extensively on trunk signaling, and is quite satisfactory as long as voice frequencies do not coincide with these frequencies. The DTMF offers excellent protection against interference from voice simulation, and therefore is used as the signaling means from the four-wire station instruments.

Supervisory signals such as off-hook, on-hook, ringing, etc., are based on the use of standard E and M control leads and multi-frequency tones. For example, trunk seizure from the calling to the called Switch is accomplished by a direct current signal on the E and M leads; after the register is seized, the called switch acknowledges the signal by key pulsing, which utilizes frequencies from the 2/6 MF group. The 2/6 MF tones also indicate line or trunk group conditions at the called Switch.

*4.1.3 Signaling and supervision.*—Most of the facilities used for inter-Switch trunks and subscriber access lines are carrier-derived, and single-frequency (SF) signaling is the approved method of signaling; duplex (DX), simplex (SX), or composite (CX) signaling will be used on all cable circuits. All these methods of signaling provide E and M lead operation; therefore all lines and trunks are designed to meet only E and M signaling. To insure minimum distortion of supervisory signals, the SF used with inter-Switch trunks will be non pulse-correcting.

Supervision within the office is accomplished via an EC (Extra control) lead switched through the matrix along with the transmit and receive pairs; full duplex signaling is provided over the single EC lead. Reed capsule relay devices are used for this function in order to minimize cross-office signaling distortion.

The supervisory signals used throughout the system are shown in FIG. 13.

The tolerances of the timing circuits in the line and trunk circuits permit recognition of signals with up to 35 milliseconds distortion. Assuming a worst-case distortion of 5 milliseconds per office, this margin of safety will provide satisfactory operation with seven offices in tandem, all with distortion in the same direction.

*4.1.4 Transmission.*—The transmission plan for the system is designed to provide a high-quality message channel over global connections more than 12,000 nautical miles in length. Data transmission at speeds up to 2400 bits (binary digits) per second will be handled over the transmission facilities. To enable the overall system to meet the transmission objectives, each Switch in the network must meet the following criteria:

(a) Insertion loss at 1000 cycles will not exceed 0.5 db, including all trunks, cabling and crosspoints.

(b) The longitudinal balance within the VF range will be greater than 40 db.

(c) The envelope-delay difference between any two frequencies between 1000 and 2600 c.p.s. will not exceed 20 microseconds.

(d) Crosstalk coupling loss between any two circuits will be greater than 80 db.

(e) Crosstalk loss between the two directions of a circuit will be greater than 50 db, when measured at equal level points.

(f) Impulse noise generated within the switching center will be numerically greater than −50 dbm, as measured on the General Radio 1556A Impact Noise Analyzer or equivalent.

(g) The absolute delay of a signal in passing through the switching center will not exceed 660 microseconds.

The line and trunk circuits are essentially transparent to transmission. Carrier modems, line amplifiers, fixed pads—all beyond the circuit patch bays—maintain a required transmission switching level of −2 dbm. The transmit and receive pairs are cabled through them to allow connection of tones (such as pre-empt tone) but no retard coils or other devices bridge the pairs. All contacts in the transmission path through these circuits are sealed, precious-metal contacts (reed capsule devices). To meet the noise objectives of the system, a separate conductor is used for signaling, instead of a simplex path over the transmission pairs. Group-shielded cable ("Qualpeth") is used for the transmission leads to the distributing frame. This approach allows the switch readily to meet the above transmission requirements.

The loss-design criteria for intertoll trunks, PBX and subscriber-access lines, and user loops are:

| | Design loss 1000 cycle db |
|---|---|
| Intertoll trunk | 0 |
| PBX access line: | |
| 4-wire main PBX to Switch | 0 |
| 2-wire main PBX to Switch | 4 |
| PBX tie trunk: | |
| 4-wire to 4-wire | 0 |
| 4-wire to 2-wire | 4 |
| 2-wire to 2-wire | 3 |
| User loop: | |
| to 2-wire telephone, 3 db average to 7 db max., contingent on trunk arrangement. | |
| to 4-wire telephone | 6 |
| Subscriber access lines to 2-wire and 4-wire telephone set | 6 |

These criteria for loss design, plus the use of echo suppressors, a 4 db receive pad for the telephone set, a data regenerator, and other transmission components, result in the following loss on overall connections:

| Connection | Loss (db) | |
|---|---|---|
| | Average | Maximum |
| 4-wire/4-wire voice | 12(*16) | |
| Data/secure voice | 12 | |
| 4-wire/2-wire | 13 | 17 |
| 2-wire/4-wire | 13(*17) | 17(*21) |
| 2-wire/2-wire | 14 | 22 |

* An additional 4 db loss is inserted in the 4-wire telephone receiving circuit, but the subscriber is not aware of this since the receiver in the 4-wire set is removed from the station hybrid.

The ability to meet these loss parameters for overall connections is dependent on the transmission criteria of the voice channels, which are nominal 4 kc. bandwidth. However, the matrix is arranged to switch 108 kc. bandwidth circuits. To meet these requirements and to suppress the impulse noise which would impair high-speed data the following arrangements are necessary:

(1) All transmission pairs are individually shielded.

(2) Control leads and transmission paths are run in separate cables.

(3) Decoupling is provided on all circuits that might induce transients into transmission circuits.

(4) The matrix itself is designed to provide 60 db of longitudinal balance.

*4.1.5 Numbering plan.*—The system, as part of a world-wide communication system, requires a unique address for each user or special trunk destination. The numbering is "closed," allowing the digits to be keyed one after the other, without waiting for intermediate dial-tone. The numbering plan provides for a seven-digit subscriber address, consisting of a three-digit switching-center identification code and a four-digit terminal number. A three-digit area code is assigned, and must be prefixed to the seven-digit number, on calls made outside the subscriber's area. These digits are decimal value and consist of the following:

NYX NNX XXXX
N is any of the digits 2 to 9
X is any of the digits 0 to 9
Y is either 0 or 1.

*4.1.6 Priorities.*—To assure that calls from certain telephones will receive more than routine service a system of priorities is incorporated into the system. Some stations, including all dial-pulse (DP) subscribers, are limited to the routine service; each of the other stations is assigned a maximum priority available. In calling from one of these stations, a priority digit, utilizing digit values outside the decimal range may be prefixed to any number. It is used to pre-empt calls of lower priority, and takes the following form:

| Priority digit value: | Rank |
|---|---|
| 0 | Flash Override (FO) |
| 1 | Flash (F) |
| 2 | Immediate (I) |
| 3 | Priority (P) |
| 4 | Routine |

The subscriber may establish routine calls in the usual way; or he may establish calls of higher priority, up to his maximum allowable priority, by prefixing the priority digit to the address.

In addition, a two-digit "route code" may be prefixed to the 7- or 10-digit address to discriminate between data-and-voice-grade calls, and to alert the switching equipment to a call outside the system. Thus the subscriber may key a maximum of 13 digits.

In addition to the general numbering plan certain subscribers may employ "abbreviated dialing" service, or "hot-line" service to a specific telephone. To provide these services, stored addresses are recorded in the memory and associated with the subscriber line identity. For abbreviated dialing, a maximum of 80 destinations are available to a number of four-wire subscribers—simply by keying an abbreviated (two-digit) code, and pressing an "end-of-send" button. The two-digit code, together with the line identity, is translated to a 7- or 10-digit telephone address. The end-of-send button key is available on all DTMF instruments.

Where hot-line service is provided, the subscriber merely goes off-hook to establish connection; a special stored address is activated in the memory, which presents special routing instructions to the prearranged destination for this call.

*4.1.7 Setting up a call.*—Referring to FIG. 14, assume that a subscriber at a station served by Switch #1 initiates a call which is routed via Switch #2 to a station served by Switch #3, when the subscriber station goes off-hook, a "request for service" is initiated to the switch marker. The scanner associated with the switch marker determines the location of the call for service, and the group and line number associated with the calling subscribed. Once this number has been determined, the switch marker requests the association of a register from the common control. If a register is available, the common control indicates its location to the marker, via the data transmission path. The marker then hunts for an idle path from the subscriber (in the primary A stage) to the register (in the final C stage); when the idle path is established, the marker pulls the crosspoints associated with that path, thus connecting the subscriber station to the register. (The register must also know what type of line is connected so that, if required, a DTMF receiver can be associated with the register.) The marker releases from this connection and becomes available for other traffic.

Dial tone is now returned and the calling subscriber proceeds to key the called number. Upon receipt of the necessary digits, the common control determines the translation and routing instructions for this call. Once the routing instructions have been determined, the common control requests the services of the marker (note that this is the second marker operation for this call). When the marker is associated with the common control via the data transmission path, the common control passes information to the marker, including the location of a sender and the identity of an outgoing trunk circuit to Switch #2. The marker now establishes a connection from the sender to the outgoing trunk. When the connection to the trunk circuit has been established, an off-hook indication is transmitted to the distant office via the E and M leads of the trunk circuit. The distant office (Switch #2) assigns an idle register to the trunk circuit and returns a key pulse which indicates that the distant office is now ready to receive the digits.

The originating office now transmits the priority digit, a routing digit, and the first three address digits (each of these digits is confirmed before the next digit is transmitted). The distant office performs a code translation on the three address digits to determine whether more digits are required or whether this is a tandem call and routing to a trunk is necessary. If cut-through to a foreign office were required this would now occur in the distant office, and the originating office would receive a key pulse (KP), indicating that transmission of all digits should be re-initiated. The previous sequence of events occurs at each tandem link, until the terminating office is located.

In this call the terminating office (Switch #3) is reached from Switch #2, and the originating office (Switch #1) is requested to transmit all address digits. Once the sender has completed its function, the marker is called a third time, and is given the following information from the common control: the location number of the calling subscriber; the location number of the register; the location of the sender and the location number of the outgoing trunk. The marker drops the original connections between the calling subscriber and the register, and between the sender and the outgoing trunk; it establishes connection from the calling subscriber direct to the outgoing trunk, and then releases from the connection. (Since the matrix is non-blocking, a path will always be found.)

Cut-through between the calling and called subscribers now occurs, and ringing tone is returned to both parties. When the called party answers, a signal on the E and M leads is transmitted through all Switches associated with this connection, to indicate that both parties are off-hook. During the conversation period, the supervision and priority of the call are stored in the segment of the common control's ferrite core memory that is associated with line and trunk.

When one or both parties go on-hook, the associated line and trunk circuits are automatically released without calling the marker. This is again accomplished through supervision of the E and M leads.

*4.1.8 Priority pre-emption special handling.*—If the subscriber desires to exercise his priority privilege he will key or operate one of his priority keys before the address digits. This priority will now be permanently associated with the connection. The subscriber then proceeds to key the address of the called subscribed. If the subscriber exercises his priority option and an all-trunk-busy (ATB) condition is encountered on the primary (direct) route, the originating office does not attempt to override existing connections until all existing alternate trunk groups have been attempted. Should all routes test busy, the switching machine will return to the primary route and attempt to override existing calls in that group. If no trunks of lower priority are detected in the primary group, the pre-empt process is repeated throughout the alternates.

When a switching center is functioning as a tandem point for calls, pre-emption can occur between the tandem point and the primary route to the destination. If no trunks of lower priority are detected on this primary route the call is returned to the originating switch for further routing.

Once the terminating switch is reached, and if the called line is found busy, the terminating switch will force the release of the existing connection (if of a lower priority) and establish a connection from the calling subscriber to the called line. The subscriber whose connection has been forcibly released will receive a distinctive tone indicating that pre-emption has occurred.

Certain preference is also provided for "hot-line" and special four-wire subscribers in accessing a register. Although the marker is not aware of the priority of the calling subscriber, it does offer an arrangement (a marker preference chain) such that a call for service from this special group is given preference over other groups when registers become idle. Because of this, and the short holding time of the registers, a "hot-line" will always be connected almost immediately to an idle register.

In addition to this special handling of "hot-line" traffic, this system can also provide preference to four-wire subscribers and trunk circuits during overload conditions. PBX subscribers, whose traffic is considered routine, are taken off the network either by pre-emption (if they have completed a call) or by automatic line load control (which prohibits new PBX attempts from entering the network and accessing the registers). This is necessary since the Switch does not know the priority of a four-wire line or trunk circuit until the first digit is received, but it does know that PBX traffic is routine.

There is one other feature incorporated in this system to aid the flow of traffic; this is related to the switch marker, which responds to requests for service both from switch terminations and from the common control. In order to insure that traffic leaves the registers, the switch marker is arranged to alternately serve line and trunk terminations, and calls for service from the common control.

*4.1.9 Lines and trunks.*—Referring to FIGS. 2 and 12, intertoll trunks, PBX trunks, and line circuits are arranged for E and M signaling and four-wire directional transmission. Each circuit is terminated on the switch matrix and is arranged to present information concerning its class, priority, idle or busy status, etc., to the switch marker and common control, to aid in assignment and call processing. Each circuit also switches six wires for transmission and controls between the various circuits and switches.

The instrument associated with a four-wire line circuit is normally equipped with a pushbutton key set to transmit DTMF tones to the switch for addressing. The four-wire line circuit can also be arranged to serve a "hot-line," which requires no addressing since the routing instructions are stored in the memory.

The PBX trunk circuit can be arranged for dial-pulse, DTMF, or manual access to the Switch from the PBX, for dial-pulse or manual access from the Switch to the PBX, for special priority and pre-emption arrangements, and for echo suppressors and idle-line terminations. An additional feature of the PBX circuit is the line load control, which prohibits part or all of the PBX trunks from initiating calls into the Switch under peak load conditions, until traffic has been restored to normal. The line load control can be operated either automatically as a function of traffic, or manually. With automatic operation it is controlled by the number of register-senders which are busy.

The intertoll trunk circuits are used to interconnect to the transmission facilities between switches. These transmission facilities may be HF, VHF, UHF, tropscatter, microwave links, or land lines.

The circuit elements employed in the four-wire line circuits, PBX trunks, and intertoll trunks are electromechanical or electromagnetic. Electromechanical elements (relays) are used for storage of information or "work horse" functions in these circuits. Electromagnetic switching devices with hermetically sealed contacts are used for the talking path because of their excellent transmission characteristics, and for interconnection with electronic circuitry because they operate with the necessary speed (approximately 1 millisecond) for this interconnection. In addition, the extremely long life expectancy of the reed relays makes them ideally suited for applications requiring high repetition rates.

The trunk and line circuits consist of a combination of reel capsule relay devices and electromechanical telephone type twin-contact relays. Because of their operating speed and permanently low-resistance contacts, the reed relays are used when fast-operate and fast-release functions are required (1–3 millisecond operate, 0.5 millisecond release) and for closing the transmission path. The telephone type relays are used for normal "work horse" functions where large numbers of contacts are required, and also for slow-operate and slow-release functions, or where adjustable timing is required. Electronic components are incorporated into the circuits as timing elements.

Each trunk circuit is an individual unit. The relays and electronic components are mounted on a front mounting plate; the reed relays are mounted on a "piggyback" rear plate to permit concentration of the apparatus while shielding them from the magnetic and electrostatic effects of the telephone type relays. All units are mounted in double-sided cabinets with swinging gates to allow access for maintenance purposes.

*(a) Connections to marker and common control*

The line and trunk circuits have many functions, such as CLR holding, priority ring, etc., that are dictated by the address dialed from the station. A common multi-conductor switch terminal control path H between the marker and the line and trunk circuits is used by the marker, under direction of the common control equipment, to load the required call conditions into these circuits.

A group of individual leads between the marker and the line or trunk circuits are used to originate requests for service and to complete calls. Another group of leads, individual to each circuit, are used to indicate busy status to the common control scanner.

Pre-empt of a line or trunk is initiated by the marker, under direction of the common control. The marker generates the precise pre-empt signal shown in the signaling diagram, and feeds this signal, via the switch terminal control path H, to the circuit being pre-empted. The trunk or line circuit repeats the signal in both directions (toward calling and called terminations). At the end of the pre-empt cycle the marker signals the trunk to release the established connection, and proceeds to establish the new connection.

*(b) Auxiliary functions*

To prevent massive seizure of the switch, resulting from failure of the carrier pilot, a "carrier make-busy" function is included in all trunk and line circuits. The circuitry is arranged to operate on pilot failure, and prevent the idle channels from erroneously calling for service. A time delay is introduced into this operation, so that short-term fades will not cause the premature release of established calls.

"Survivability release" is incorporated into all circuits, to prevent either a subscriber failure to release, or an equipment failure, from holding an established connection; (withdrawal of either the calling or the called party will release the connection).

A central "make-busy" panel is provided to allow the primary technical controller (i.e., wire chief) to remove from service any line or trunk in the switching center.

(*c*) *Four-wire line circuit*

The four-wire circuit provides the connecting equipment between the four-wire facility to the station and the Switch. Conventional E and M leads extend from the line circuit to the signaling circuit of the facility. In the case of single-frequency signaling, tones are sent in both directions during the on-hook condition. When a party initiates a call from a station the off-hook removes tones toward the Switch, causing the line circuit to call for service from the marker. On receipt of dial tone (indicating that a receiver is connected) the user signals his requirements by means of "dual calling" DTMF tones that pass directly through the line circuit (which, as previously mentioned, is transparent) into the receiver.

Assuming the call is to another four-wire station, the terminating line circuit will on seizure, extend a ring signal—either routine or priority, depending upon prior conditioning—to the called station, via the line circuit M lead. Simultaneously, the terminating line circuit extends ringback tone to the caller. On answer, the ring signal is cut off, and answer supervision is extended over the EC lead, on a duplex basis, through the switched connection and on to a circuit at the station which supplied transmission battery to the station, passes signals from the station to the Switch, recognizes and interprets on-and-off-hook signals from the Switch (such as priority and pre-empt) and causes them to activate an external audible and visual signal that may be provided. Although the answer condition is extended by the line circuits and conversation may immediately start, the line circuits delay acting upon this signal for a predetermined short interval to insure against the possibility of a false answer condition. After this interval, disconnect by either party is recognized only on a timed basis.

Depending upon the priority of a new call to either station, a call in progress may be pre-empted, breaking the connection and extending a unique pre-empt tone to both stations. When the station being called disconnects, a priority ring signal is immediately forwarded to it; the calling party (the pre-empting party in this case) receives ringback tone from the called line circuit until answer. When a line circuit is engaged in a call in which the distant end or an intermediate trunk is pre-empted, it receives the pre-empt time signal, over the EC lead, and in turn it causes the pre-empt tone to be returned to the associated station until the latter disconnects.

Certain lines will be specified for "hot-line" service, rating the highest priority. On each "hot line" two telephones are always associated with one another, so that when either goes off-hook, it activates a stored address recorded in the memory, which automatically, sets up the connection to its associated "hot-line" phone.

(*d*) *Interoffice trunk*

The two-way interoffice trunk circuit provides the connection to other Switches. On outgoing calls the trunk is first connected to a sender, to allow addressing the distant office. Upon completion of outpulsing, the sender is released and a connection is made to the originating line or trunk. The trunk circuit is arranged to pre-seize the distant office while the marker is completing its cycle, in order to reduce the time interval available for simultaneous seizure by the distant Switch. If a simultaneous seizure should be detected before the marker completes its cycle, the trunk circuit is released and another trunk circuit selected.

On an incoming call, the trunk circuit signals the marker that service is requested; the marker connects it through the matrix to an idle register. Upon receipt of sufficient digits the common control requests the marker to release the register and make the final connection.

The trunk circuit monitors the supervisory signals that are repeated through it during the call. It must recognize called-party answer, disconnected from either end, and a pre-empt signal from the distant office, and it must distinguish re-ring and wink start signals from pre-empt signals.

If unacceptable transmission is encountered, the automatic trunk routiner will activate the "out-of-service" function of the trunk circuit.

(*e*) *PBX trunk circuit*

Access between the system and various assigned PBX's is attained over a two-way PBX trunk circuit. The circuit is very similar to the four-wire line circuit in appearance, functions and operation. PBX's unlike four-wire lines may use dial pulse signalling or "dual-calling" tone; therefore, on an inward call from a PBX a dial pulse (DP) receiver, as well as a "dual-calling" receiver, must be connected until the type of signaling to be used has been determined. When the PBX is arranged for inward dialing, non-priority calls may be extended directly to the desired PBX station. Priority calls may be answered only by the PBX attendant, who is charged with the administration and who may then extend them to the desired parties. The PBX attendant may also pre-empt a call of lesser priority in order to extend a call of higher priority to the system.

Line-load control is provided on a limited basis which permits outward traffic to the PBX but denies inward traffic from the PBX.

The four-wire trunk facilities will normally be connected to the PBX through a four-wire terminating set. Echo suppressors will be provided on these trunks at the Switch end, and will be "enabled" on network calls, but will normally be disabled on intra-office calls. The enabling of echo suppressors is controlled from the PBX trunk circuit, on receipt of a signal over the switch terminal control path from the marker.

*4.1.0 DAS console.*

(*a*) *Physical arrangements*

The DAS console, consisting of key and lamp equipment for positional control of connected DAS trunks, is housed in an attractive modernistic console. All relay and associated gear is mounted externally, along with the relay equipment for the DAS, and trunk relay equipment.

Each position is equipped with eight links. Link key and lamp equipment consists of a TALK-MONITOR lever key, a LINK RELEASE push key, and three associated lamps. Two lamps serve as the rear and front supervisory lamps. The third lamp, glowing steadily indicates a busy link and, flashing, indicates to the operator that a call has been assigned to the position on that link.

Common control key and lamp equipment, which is associated with a particular link by operation of a link TALK key, provides for the following functions: cut-off, ringing, key pulsing (MF), and releasing, on the front or rear connections, the DAS trunk circuit connected to that link. A standard keyset is provided per position; in conjunction with the position SEND REAR and SEND FRONT keys it provides multifrequency key pulsing for priority, and directive for routing to the Switch transceiver when extending or originating calls.

Two trunk TALK keys and associated lamps provide controls for communication between the position and the test board and supervisory turret.

Five class-indicating, and five priority-indicating lamps are provided per position, to indicate to the operator the class and priority of a call which has been received. This information is displayed when the link TALK key is operated at the time the call is received; it is again displayed when re-entering a link.

Five CLASS CONDITIONING keys at each position determine the types of calls a position can accept; each key has a lamp associated with it to indicate when the position is conditioned to answer this class of call. When more than one class of call is permitted to be answered, the order of preference may be adjusted, either at the position, or remotely from the supervisory console.

When any one of the link TALK keys at a position is operated, the CLASS CONDITIONING keys serve to change the class of the connected DAS trunk, in order to route a call to a particular position. For example, if a call is received which subsequently requires a conference set-up, the position is not equipped to set up conferences, the call may be transferred to a position so equipped, by reclassing the call and releasing the link. The DAS marker will then connect the call to the proper position.

A CALL for service key permits an operator to request that a DAS trunk be assigned to an idle link in the position, to originate calls on either the rear or front appearances of the DAS trunk.

"Pre-set" conference calls may be made, from designated stations, by dial operation. In addition, certain positions of the DAS console may be arranged to set up "random" conference calls, of either the "progressive" or the "meet-me" type. CONFERENCE CALL key and lamp equipment appears on the sloping face of the DAS console. It consists of one conference link TALK key and lamp circuit to permit associating the operator's telephone and MF key set with conference control relay equipment for setting up progressive conference calls. Six groups of conference control keys and lamps consisting of six push keys and associated lamps per conference bridge circuit are also equipped, to provide controls for "meet-me" type conference calls. These control keys and lamps permit the following combinations within a single office of the largest size:

(a) Up to six simultaneous conferences, with up to six participants per conference.

(b) Two simultaneous conferences with up to six participants in one conference and up to 22 participants in the second conference.

(c) One conference with up to 26 participants.

(d) Additional combinations become available through interconnection of one or more bridges in other offices.

Included in the face equipment are trunk group busy lamps and a 24-hour clock.

*4.1.11 DAS trunks.*—DAS trunks are essentially trunks accessed from and having access to the Switch, under control of the DAS attendant. They have two appearances on the switch matrix, and one appearance on the DAS matrix, the latter providing the connecting path to the DAS position link circuits. One of the appearances on the switch matrix serves as the termination for calls to the DAS board, and also provides an access to the Switch for delayed calls or operator-originated calls; it corresponds to the rear cord on a cord-type board. The other appearance on the switch matrix provides access to the Switch, for extending calls. This corresponds to the front cord of a cord board.

A three-stage matrix similar to the switch matrix provides interconnection between the DAS trunk and the links of the DAS position. The matrix path connecting a trunk and a link is under control of the DAS marker, which establishes the connection. Position gate control in conjunction with gating in the DAS trunks permits the DAS marker to assign calls in approximately the same order as they are originated.

On a completed connection via a DAS trunk, the transmission path is essentially transparent (incurring no losses), as the transmission pairs are switched, without attachments through the trunk, by reed relay contacts. The operator's telephone circuit is bridged on the connection while a link TALK key or MONITOR key is engaged at which time a maximum bridging loss of .1 db is incurred.

The DAS matrix consists of six conductors. Four are used for transmission, and for deriving two on-off-hook supervisory paths by simplexing. The fifth conductor is used for transfer of supervisory and functional information (excluding on-off-hook supervision and re-ring signals) between the DAS trunk and the associated DAS position. The sixth conductor is used for hold and busy control of the matrix path.

Storage of the class and priority status of a call is provided in the DAS trunk. This information is received from the switch marker in binary code when the connection to the DAS trunk is made, and is stored in the trunk for the duration of the call (or until changed by the DAS attendant to route the call to another position). When the call is answered by the closing of the selected link TALK key, the class and priority status of the call is momentarily forwarded to the position, where it is converted to a lamp display to aid in processing the call. If a connection is reentered to answer a recall, the class and priority visual indication is again displayed to the DAS attendant.

DAS trunks are arranged to permit the attendant to cut off one party and talk independently to the other, to release the Switch connection on either front or rear, and repeat on-off-hook supervision from the Switch to the link. Re-ring signals from the attendant are also repeated to the Switch by the trunk. The on-off hook supervisory signals, as well as re-ring (pulse forward) signals, are accomplished on a differential signaling basis.

On a successfully extended call the DAS matrix may be released, leaving the connection held under control of the trunk. On disconnect or recall, the matrix path is reestablished by the DAS marker, although not necessarily to the position and link that originally set up the call. A steady lighting of both supervisory lamps indicates disconnect, and the attendant operates the link release key to release the connection. A flashing supervisory lamp indicates recall and the attendant reenters the connection to obtain further instructions. When the matrix path is to be retained, releasing of the link TALK key merely removes the attendant's telephone transmission bridge at the trunk, leaving the recall or disconnect supervisory paths intact.

When a DAS trunk is pre-empted, the switch marker releases the matrix connections to the rear and front of the trunk, and re-connects the rear of the DAS trunk to the pre-empting party. It further forwards the pre-empt signals to the original calling and called terminations, which locally give pre-empt tone. Upon re-seizure of the rear portion of the DAS trunk, the attendant is recalled by a flashing supervisory lamp (120 IMP) and the call is extended as requested.

*4.1.12 DAS position control.*—Each DAS position has an associated common position-control circuit, which may be associated with one of the eight link circuits equipped per position, to perform necessary functions in the connected DAS trunks in order to properly process the call. The position circuit is associated with a particular link by the operation of the link TALK key, and guarding is provided to permit only one link to be connected to a position circuit at a time.

On an incoming call, the link selection is performed by the DAS marker, which distributes calls equally among the idle links available.

When a link is associated with the position control circuit a unique path is provided, via a conductor through the DAS matrix, to permit a total of nine functional controls to be performed in the DAS trunk on a time-division basis. These controls include: (a) bridging the attendant's telephone circuit onto the four-wire connection for talking or monitoring; (b) cut-off of the front or rear party to permit the attendant to talk independently with the others; (c) releasing either front or rear connections to the Switch; (d) three class-change controls; and (e) link release control.

Relays under control of the position keyset permit multi-frequency key pulsing to the transceiver that is connected to either the receiving or the transmitting pairs, depending upon whether the call is being extended on the front, or a delayed call is being originated on the rear, of the associated trunk. Switching of the pairs at the DAS trunk to the front or rear connections is under control of the positional SEND FRONT or SEND REAR key, on a time division basis.

Display of the class and priority of a call is controlled by relays in the position control circuit, which respond to momentary time-division signals from the DAS trunk each time the link TALK key is operated. This provides a continuous visual indication of the class and priority of the call on which the position is engaged.

The operator's telephone circuit is designed to permit bridging onto a four-wire connection for monitoring or talking with a bridging loss not to exceed .1 db. It employs two transistorized amplifiers, resistance-coupled to the four-wire transmission leads, and provides cancellation of the signal from the operator's transmitter to receiver. It permits the bridging of the telephone circuit to a four-wire connection without clicks. Coupling between four-wire circuit pairs is negligible (in excess of 50 db). Sidetone level is approximately −25 db.

Three signaling modes are utilized between the position common control and the DAS trunks:

(1) Multi-frequency pulsing is used to provide priority and routing information to the register-sender transceiver in order to process a call.

(2) Polar-duplex relay signaling is employed to control on-off-hook supervision to and from the DAS trunk. Two independent paths through the DAS matrix are derived by simplexing the transmission pairs. This type of signaling is also utilized to signal forward, for re-call of distant operators.

(3) A time-division signaling technique is employed for the remaining requirements. Control contacts are closed when a control function is initiated in the DAS trunk or positions circuit, resulting in operation of corresponding controlled relays in the position circuit of DAS trunk circuit.

A common power supply provides timed battery pulses and corresponding ground pulses of 500-microsecond duration, which reoccur every 10 milliseconds. These time pulses are distributed to a maximum of 20 DAS positions, each position being assigned its own time slot. A common signal lead, one per function, which is multipled to all positions and trunks, permits the transfer of information between a trunk and the associated position, over one conductor, only during the time control power is closed to the position.

*4.1.13 Supervisor's equipment.*—A supervisor's control turret is provided per office, to monitor and control traffic flow to the DAS switchboard positions.

A position monitor circuit is provided which gives a visual indication of the answering status of each position. The class-conditioning status of each position may be changed from the supervisor's turret.

A load-control circuit for each class of service weighs the number of calls waiting in a particular class of service against the number of positions available to answer that class, and provides audible and visual alarms when the degree of unbalance exceeds a predetermined value.

A meter is provided which may be switched to indicate the number of calls waiting in any one of the five classes.

Answer-time-recorder (ATR) facilities arranged for observing on 25 trunks, and capable of being switched to 10 groups of trunks, are equipped. Meters for the ATR and associated switching controls, as well as position peg-count meters, are located in the supervisor's turret.

*4.1.14 Operator training.*—One of the positions of the DAS cordless switchboard is arranged so it may be removed from regular service and utilized for operator training. Its appearance on the DAS matrix and marker are then made busy, and links are switched to an instructor's position. The training circuit permits the instructor to route all types of calls to the student position, to be answered and extended back to the instructor. The instructor may visually monitor all key operations which the student must perform in order to complete the call, and may impose the various audible and visual signals normally encountered on a call. The priority and routing digits of the called number are displayed as these digits are keyed from the student position. Arrangements for permanent cabling or portable patching of the training equipment are provided.

*4.2 Marker and matrix configurations.*—The switch and DAS markers are comprised of groups of circuits required to perform specialized operations and are controlled by wired-program "sequence and supervisory" circuits. These sequence controls monitor the progress of the call through the other circuits and, after each operation, generate commands to these circuits to effect the next operation. As each operation has a preset time limit, the controls immediately detect any failure to complete an operation, and arrange for corrective action. In some cases, pre-programmed steps are taken to circumvent the problem before signalling the maintenance monitor. Upon direction from that circuit, test points related to the sequence state of the marker in which the trouble occurred are switched to the common multiconductor path to the maintenance monitor. Following storage of the fault data in an electronic register, the marker is released.

Markers are always provided in pairs, one of which is on line while the other is on standby. Each marker has a transfer circuit by which it is connected to the outside world. An allotter circuit (common to both markers of a section) periodically transfers the traffic load from one marker to the other (via the transfer circuits) to assure that the marker on standby is in working condition. Thus when the trouble occurs in the on-line marker, and a record has been made, the allotter provides a second attempt to process the call, by causing the standby marker to be placed on line. Should the original marker (after being subsequently returned to service by the periodic transfer) fail to complete its next call, it is locked out by the allotter, and an alarm is activated. If the second marker encounters a trouble condition before the fault has been cleared, the first marker will still be reactivated to attempt to process the call; since many of the failures which could occur in the marker will affect only some of its operations, there is a high probability that the call for service will be satisfactorily processed on this second attempt.

The result of a report to the maintenance monitor is a printout record that can be looked up in a maintenance dictionary to determine which electronic card or cards should be replaced. Transient failures may be isolated by employing the "maintenance and supervisory" circuit that is provided for each marker section and mounted with it. With this circuit and two associated appearances on a test panel, a standby can be put through its paces to test its operation on all types of calls; this is done semi-automatically during momentary light traffic periods in the office—whenever the companion marker (now on line) is free from service requests. By observing the test with an oscilloscope, test personnel will be aided in identifying the transient condition.

The transfer functions of the allotter circuit from this test panel and various internal marker tests may be overridden.

*4.2.1 Switch markers.*—The switch marker handles two basic types of requests for service-calls originating on the switch matrix (local or tandem requests for a register), and connection requests from the Common Control (terminating or outgoing traffic). The marker decides in what order to allot itself to these calls, by applying a programmed hierarchy which is automatically adjusted to extreme traffic conditions should they occur.

FIG. 15 shows a simplified sequence chart for the switch marker. All calls require use of the matrix connection section of the chart, while only originating traffic requires the identity section.

*(a) Calls Originating on Matrix*

Every trunk, line, and register-sender in the office appears on the swich matrix at an inlet to the "A" matrix stage and the corresponding inlet to the "C" matrix stage. Since all circuits are divided into 100 groups "trunk goups") in the office, with 100 circuits ("trunks") maximum per group each circuit may be identified by four decimal digits. Unlike the DAS marker, the identity of a circuit requesting service is established on a by-path switch terminal control path H from these circuits to the marker, but is not related to their physical location on the matrix.

When processing an originating call, the marker, in a two step process identifies by means of an electronic scanner, the trunk group number (group tens and units digits) of a circuit calling for service. The call mark is a negative potential appearing on the TG lead of the trunk. After the trunk group has been identified, the marker applies a positive "blanking" potential to the call mark (TG) leads of all other trunk groups. Thus, when the marker operates its scanner to select the trunk number (trunk tens and units digits), only call marks from circuits in the identified trunk group will be seen by the marker, on the appropriate TK leads. Should there be a hot line requesting service, the marker immediately recognizes the trunk group number, and forces the scanner to set to this group for identification of that line.

After identification is complete the marker sends a call for service mark to the Common Control via the data transmission path that connects these system sections. When an idle register is found by the Common Control, the marker forwards the originating equipment number to that equipment by means of direct-current signalling on the data path. The sending unit makes a bit-for-bit comparison check on the transmitted data and informs the receiving unit when the correct information has been received.

The Common Control returns the originating equipment number to the marker along with the equipment number of the selected register, in order that the marker may operate to select an idle path between the two circuits and "pull" the crosspoint relays to complete the connection through the switch matrix.

Since the marker does not know the actual location of the circuits on the matrix, all operations required to perform the connection are accomplished over a switch terminal control path H, that is common to all circuits appearing on the matrix. The equipment that is required for identity is utilized also to form a "trunk connect" tree to each of the terminating and originating circuits in turn, for connecting these circuits to the terminal control path. In order to communicate with both circuits simultaneously (as in operating the matrix), a subsidiary path is completed to the circuit whose "A" appearance is to be used.

The selection of a path is accomplished by coincidence-scanning for absence of battery on the appropriate hold leads, between the A–BA, BA–BB, BB–BC and BC–C stages, that link one appearance of the terminating equipment to the other appearance of the originating equipment. These hold leads are connected into the marker via the circuits concerned, by utilizing a crosspoint relay pull winding of the A and C stages in question.

Since in the five-stage matrix, a 50-line cabinet (the largest module) terminates 90 BA–BB links, the scanner count is established at 90. To select an idle path between the A appearance of one circuit and the C appearance of the other, the scanner must find an idle A–BA link on the A stage of the first circuit, an idle BA–BB link from the BA stage, an idle C–BC link on the C stage of the second circuit, and an idle BB–BC link from that BC stage to the same BB stage at which the idle BA–BB link appears. Thus for the five-stage matrix, 90 such combinations exist and the first idle combination will be selected. The switch matrix is non-blocking—which means that there must be a path between any two circuits that appear on it. However, link blockage is possible (though improbable) on the first scan, and it is possible that a similar scan of the 90 link combinations from the C appearance of the first circuit to the A appearance of the second may be necessary.

When an idle path has been found, a reed relay tree is operated from the resulting scanner position, to connect the marker to the BB–BC pull lead which uniquely selects the chosen path. After testing to assure than only one pull lead has been closed to the base of the tree, the marker applies ground to the pull lead, and resistance battery to the "A" and "C" stage pull leads (to which it still has access via the trunk control path H) and operates the A, BA, and BB matrix stages in service, as well as the BC and C stages in series to complete the connection. Conventional cut-off reed relays in the "trunk" circuits hold the connection through the hold windings of the matrix and, by means of the negative potential created at the links between the five stages, block further access by the marker to any link in the path.

A check for continuity of the five signalling leads (T, R, T1, R1, EC) through the matrix is then performed as it is in all normal connections, and a wetting current is applied. After informing the Common Control that the connection is complete, the marker enters a "clear-out" phase in order to return to idle and serve other traffic.

*(b) Calls originating at Common Control*

The second type of request for service to the switch marker originates at the Common Control. The connection of sender equipment to an outgoing trunk in an originating office is initiated by the Common Control via the data transmission path, when a call has proceeded to this stage of completion. The equipment numbers of the two circuits in question are sent to the marker, which proceeds, as previously described, to establish a matrix connection. In this case, however, the marker must also test the outgoing trunk for busy-idle condition, since it is necessary to guard the interval of time between successive upgradings by the trunk scanner of the trunk's status. Should the trunk be found busy by the marker, the Common Control is informed via the data transmission path.

The final cross-office connection from incoming trunks or lines to outgoing trunks or lines requires a busy test if a sender had not been employed in this office, and also requires the marker, before making the connection, to remove registers and/or senders which have fulfilled their usefulness. This is accomplished by means of a mark on the trunk-connect highway which causes the trunk circuit to open the hold path and drop the matrix connection.

Should pre-emption of the trunk or line circuit be required, the marker is duly informed, over the data transmission path; it generates a signal to the circuit involved, causes the original connection to be dropped (as above), and then completes the connection requested by the Common Control.

Before completing its task, on calls to the DAS switchboard via a DAS trunk circuit, the marker must "preload" into the trunk circuit (by properly marking the switch terminal control path) the class and priority of the call which has been forwarded to it on the data transmission path.

If a regenerative repeater is required to be inserted into the switch train, the marker is so informed by receiving the equipment number of the circuit, and the necessary connection is completed before the final cross-office connection.

Provision is made for the Common Control to lock out an incoming trunk or line by so instructing the marker, instead of providing a terminating equipment number. After the marker has connected to the circuit in question, a mark on the trunk highway causes the removal of the call-for-service mark until the party goes on-hook.

(*c*) *Office routiner access*

Like the hot lines, the office routiner is assigned a special trunk-group number. Thus, when the marker recognizes a request from this circuit after the normal identification process, it sends to the Common Control a proper indication along with the call-for-service on the data transmission path to allow that equipment to check for the availability of the register (already requested by the office routiner, over a separate by-path).

(*d*) *Trunk routiner access*

The trunk routiner also has an appearance on the switch matrix but requests service from the marker via a lead on a second data path. This path allows the routiner to preload the equipment number of the trunk to be routined into a reed relay register in the marker before requesting service. When the marker finds that it has no higher-preference call waiting, it returns the data path information on a bit-for-bit basis for comparison checking, and performs the connection for the routiner. If, subsequently, the trunk is found to be faulty, the routiner reaccesses the marker and requests that the trunk be taken out of service. The switch terminal control path H is used to make the out-of-service indication, and the circuit goes on "maintenance busy" until returned to service by the maintenance man.

(*e*) *Operation under fault condition*

To provide a second attempt by the marker section, the information from the Common Control is loaded into both markers initially. When a fault is discovered in the on-line marker, and the allotter determines that a transfer is necessary, the companion marker is switched in and told to complete the connection requested in its data register. Should the second marker be unsuccessful, the trouble probably lies externally (in a trunk circuit, for example) and the Common Control is so informed. Since a faulty cross-point might cause both markers to have trouble, a transfer is not always immediately employed; certain "non-transfer" sequence states cause the same marker to remain on-line, and an attempt is made to make the connection in the other direction through the non-blocking matrix before calling in the other marker. Since a trouble record is always made for any trouble, however, more than one record may occur for the same fault condition. This extra information is of great value to the office personnel localization when the fault was not in the common equipment.

(*f*) *Programmed routine*

To aid in assuring that the on-line marker is capable of switching traffic, various routine tests of its circuitry are performed during each marker cycle. Before a path is selected, the reed relay contacts used to connect the required hold leads into the marker are checked for successful operation, momentarily applying a high-resistance battery test potential to the hold leads at the matrix cabinets and running the path scanner to assure that all links appear busy. At the conclusion of the marker cycle, the test potential is re-applied and the scanner run to assure that all contacts have restored. In this manner not only are the contacts themselves checked, but also the combining gates of the scanner itself.

The common switch terminal control path to the trunk circuits is checked in a similar manner before and after use, since each contact connects a battery-connected reed relay to the marker.

In addition, other scanners are operated to assure that the individual flip-flops may be both set and reset when required. By employing these and similar tests, many failures which might occur may be detected before the marker is required to perform the desired function.

Figure 17:
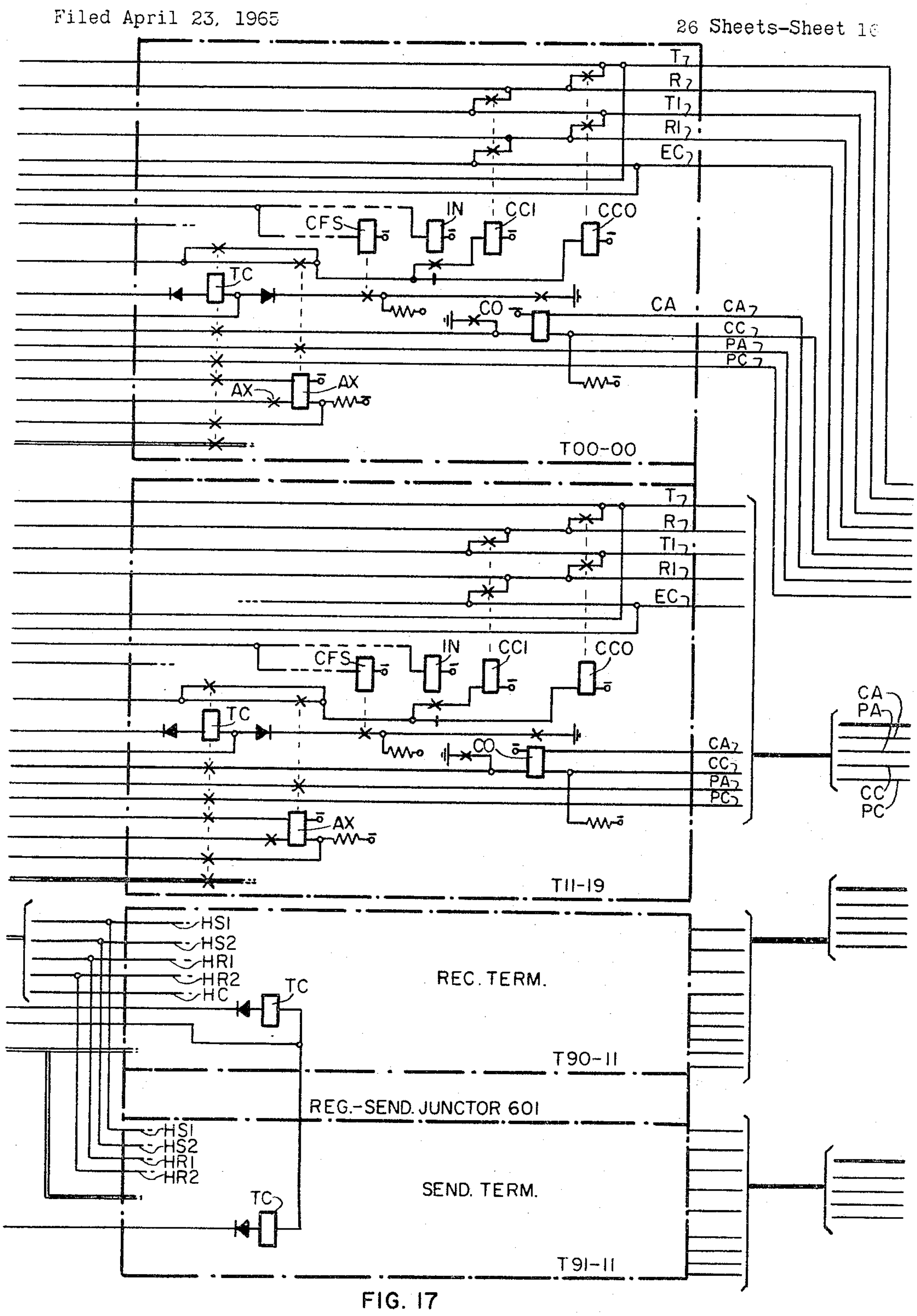
Figure 18:
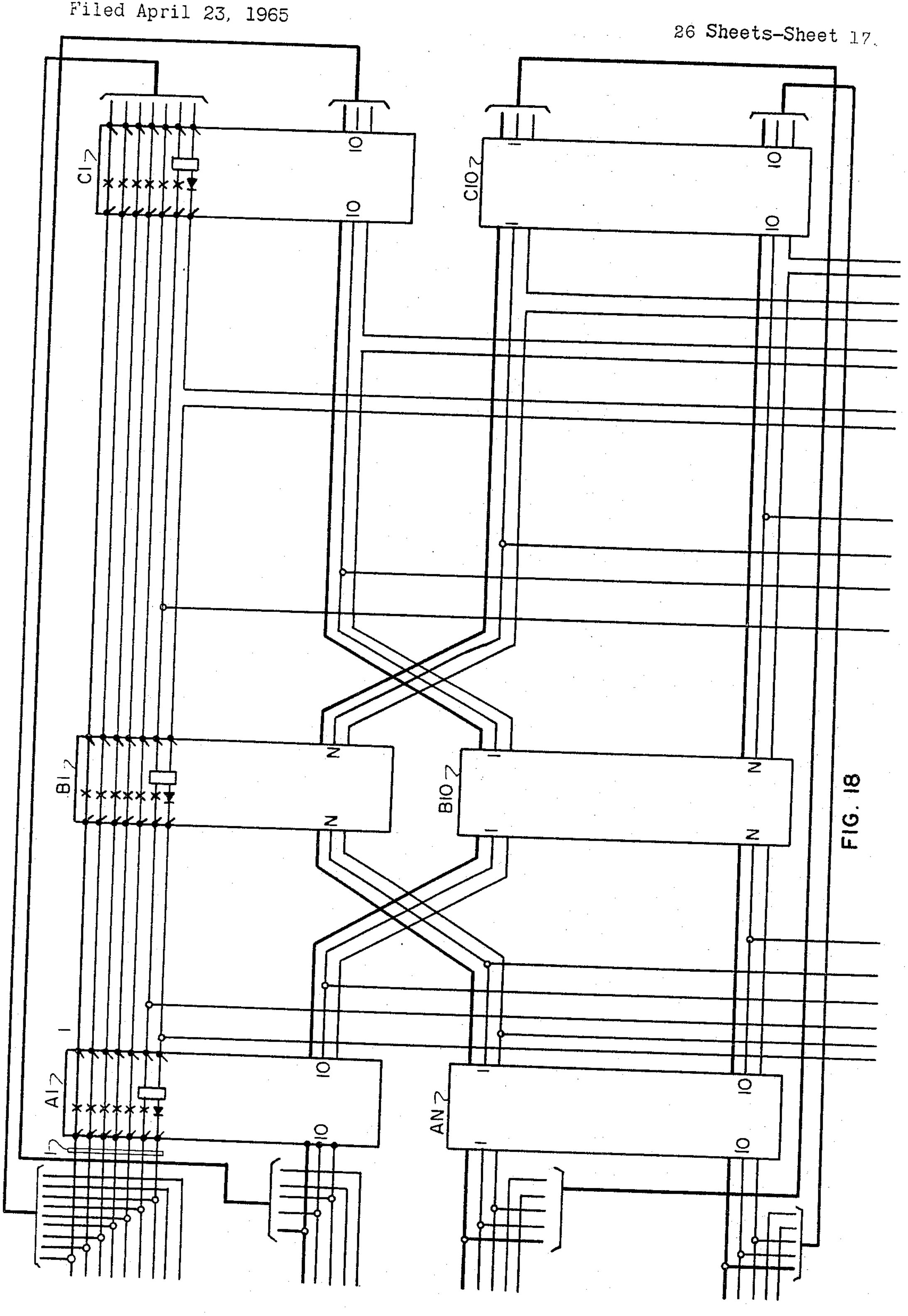

FIGS. 16–22 when arranged as shown in FIG. 30 comprise a diagram of a switch matrix with its terminating units and marker. A three-stage matrix is shown in FIG. 18. This drawing shows how each terminal of the matrix has the two transmission paths and the EC lead connected to both an A appearance and the corresponding C appearance, while the hold lead C and the pull lead P are individual to the A or C appearance, so that for each terminal there are nine leads to the switch matrix. FIG. 17 shows the terminating units. In the numbering designation of these terminating units there are two digits designating a trunk group, followed by two digits designating the trunk number within the group, so that there can be up to 100 groups, and each group can contain up to 100 trunks. This numbering is independent of the physical location on the switch matrix. For example trunk group 00 may be assigned to local lines, and there is shown one terminating unit T00–00 in this group; and group 11 may be assigned to inter switch trunks, and there is shown one terminating unit T11–19 in this group. For the register-sender junctors, each junctor comprises a receiving terminating unit and a sending terminating unit, the receiving terminating unit being in one trunk group and the sending terminating units being in another trunk group, using the same trunk number for the two units in the junctor. For example the register sender-junctor 601 comprises receiving terminal T90–11 and sending terminal T91–11. As shown in FIG. 16 there are line transmission and signaling equipments such as 1601, shown connected between terminating unit T00–00 and the four wire line to a local station; and trunk transmission and signaling equipment such as equipment 1602 shown connected between terminating unit T11–19 and a channel extending to Switch #2 (see FIG. 14). The transmission path of the receiving terminal and sending terminal are connected together in the register-sender junctor 601 and extend to the connect matrix, as shown in FIG. 25, for connection to a DTMF receiver or an MF transceiver. All of the terminating units of the switch matrix are connected in multiple to a switch terminal control path H, also referred to as a "highway." Each terminating unit includes a TC relay for connection of the terminating unit to the control path H, and also an auxiliary AX relay for connection to certain conductors of the control path. Each unit also includes a CO (cutoff) relay, CCI and CCO relays for continuity checks and several other relays for various trunk features. Only a few of these relays are shown in the units in FIG. 17.

Figure 19:
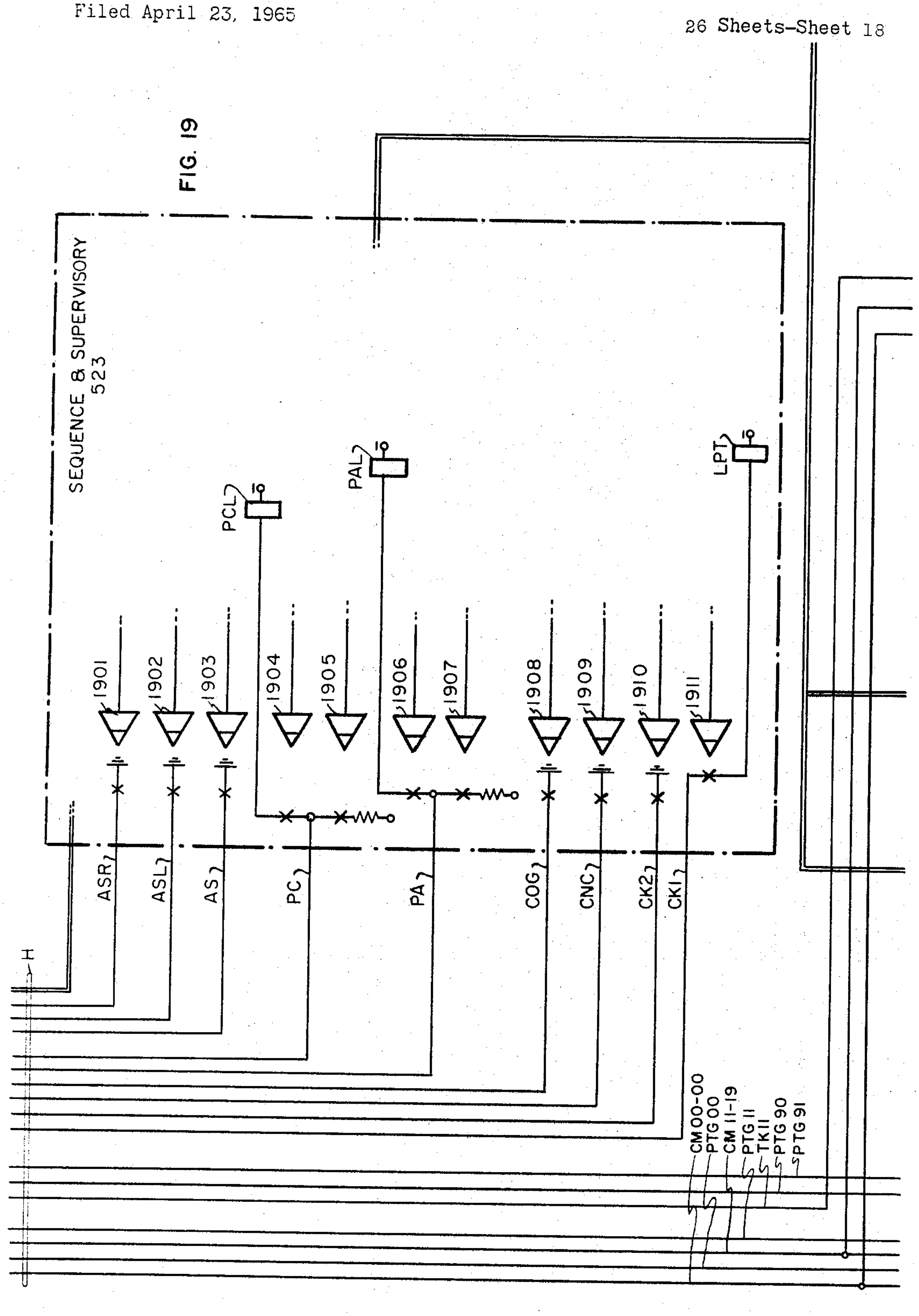

A switch marker is shown in FIG. 5, and details of portions of the marker are shown in FIGS. 19–22. The sequence and supervisory circuit 523 is shown in FIG. 19. This circuit includes a sequence counter and various supervisory information combining functions which are not shown, and some relay drivers 1901–1911 for supplying information via the control path H to the switch terminating unit. There are also some conductors in highway H for receiving information from the terminating units to the sequence circuits which are not shown.

Figure 20:
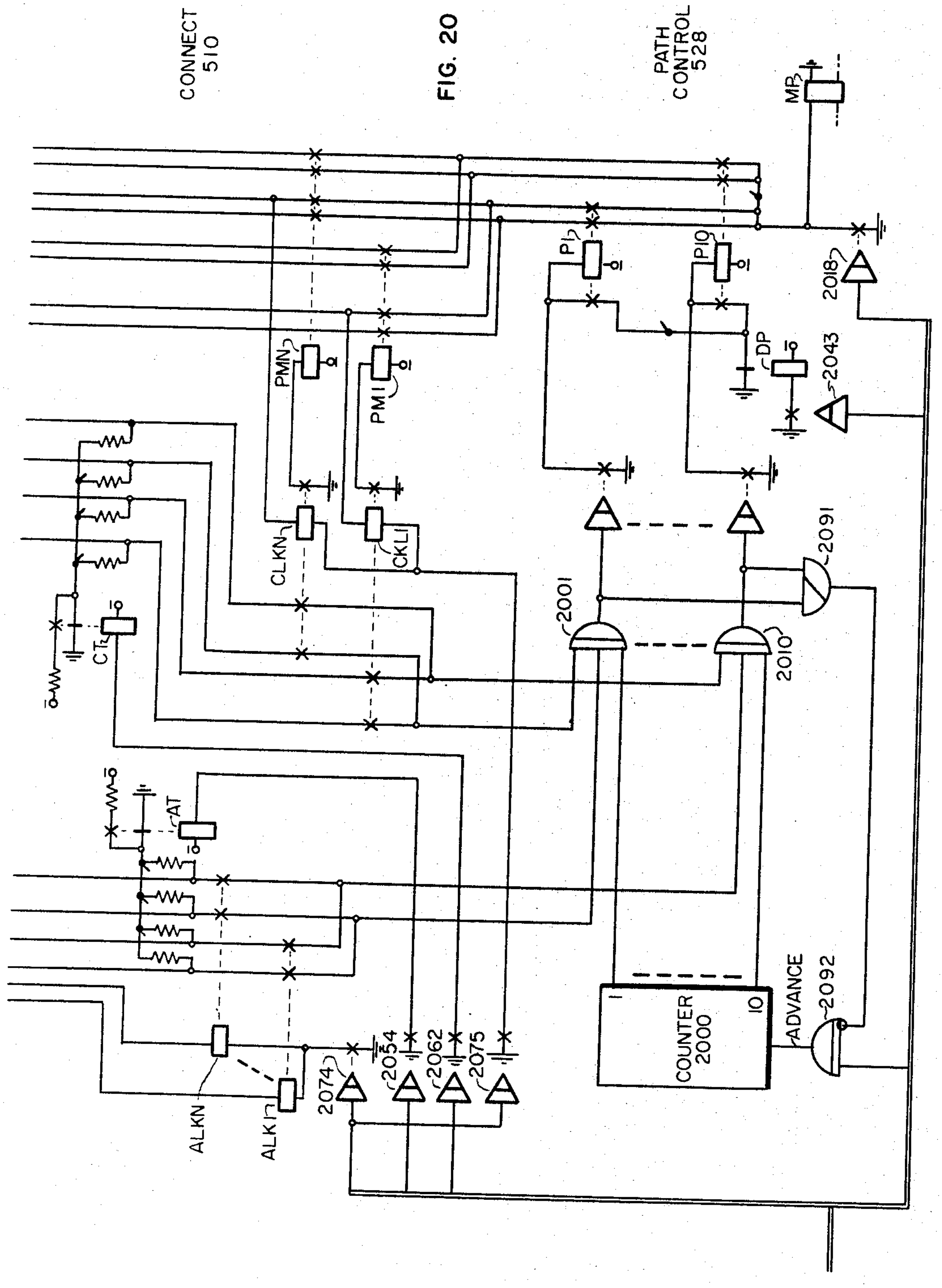
Figure 21:
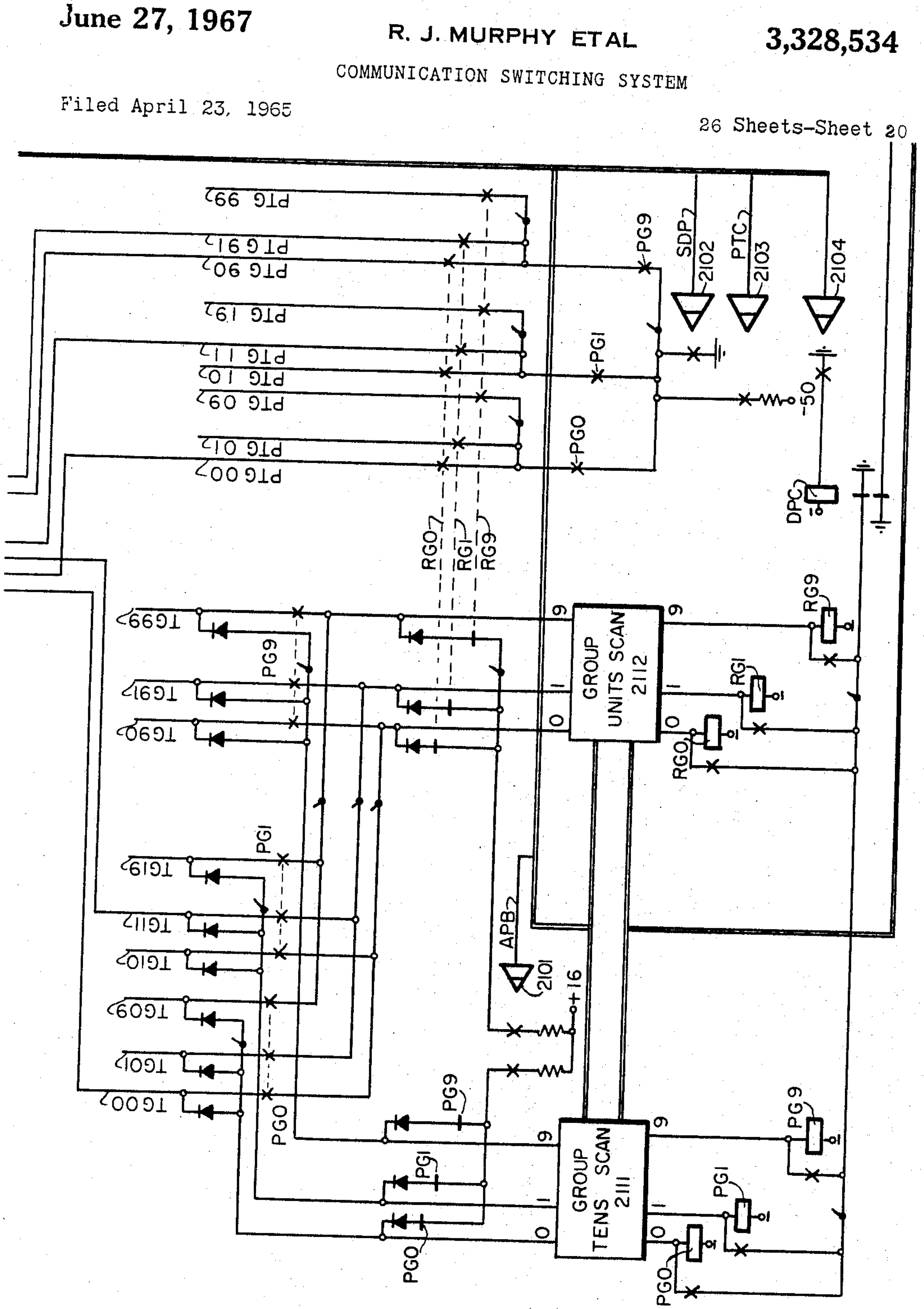
Figure 22:
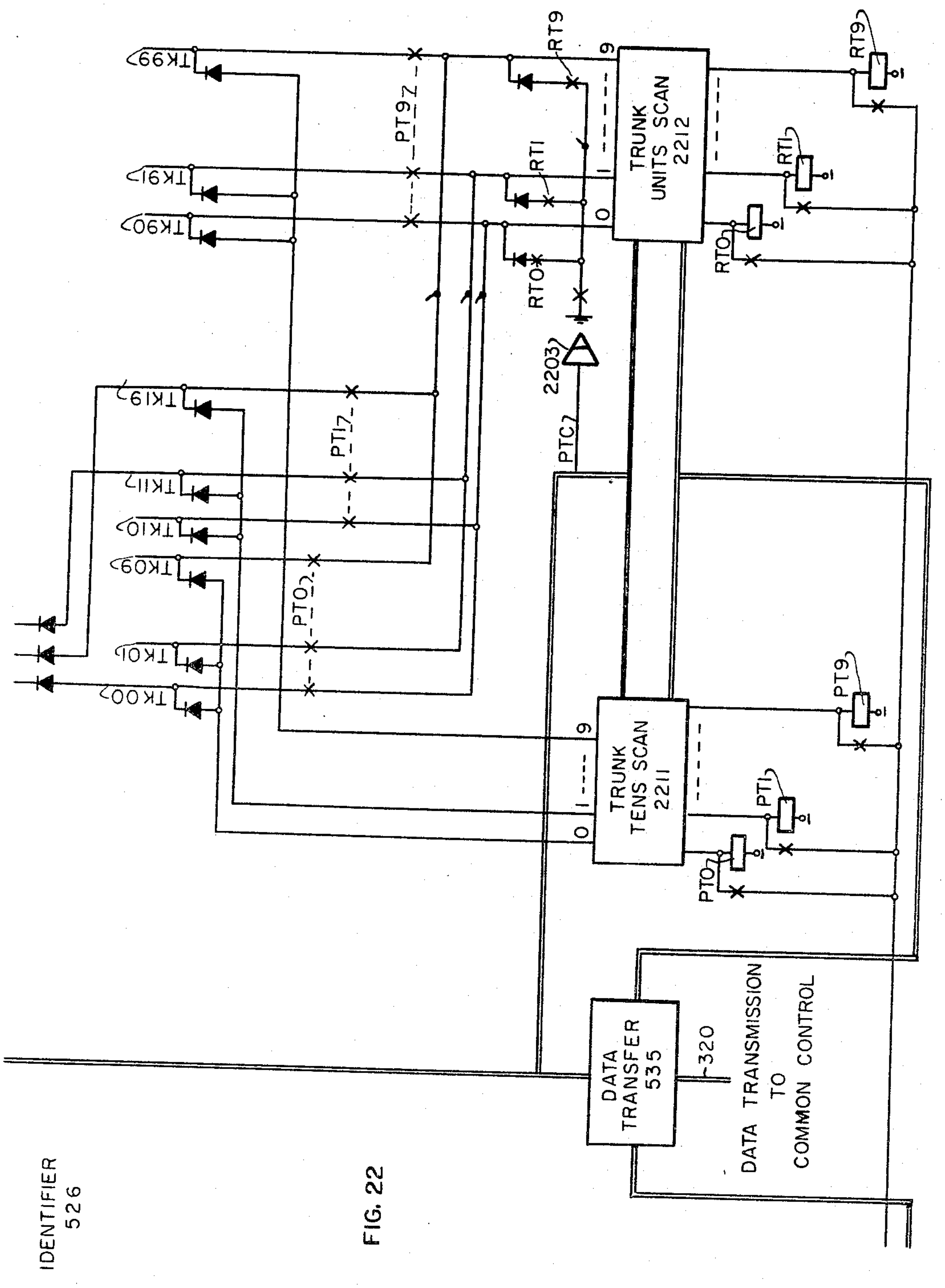

The connect circuits 510 and the path control circuits 528 are shown in FIG. 20. The inlet and outlet identifier 526 is shown in FIGS. 21 and 22. The data transfer circuit 535 is also shown as a block in FIG. 22.

The switch matrix and marker operations occurring in switch #1 for the call illustrated in FIG. 14 will now be described. Assuming that the party at station S701 goes off hook to initiate the call shown in FIG. 14, the signaling unit in equipment 1601 places a potential on the E lead which via circuits not shown in the terminating unit T00–00 operates a CFS (call for service) relay. This places negative potential via a resistor, contacts of the CFS relay, and a diode to the conductor CM00–00 which extends via the control path H to the identifier 526. This initiates the marker cycle shown in FIG. 15. The data transfer unit 535 shown in FIG. 22 includes sixteen originating number flip-flops in groups of four, and each group of four is arranged to function as a counter for the four scanning units 2111, 2112, 2211 and 2212 of the identifier. In state S2 the first of these counters is enabled so that the group tens scan unit 2111 can identify the tens digit of the trunk group number. The negative potential on CM00–00 extends through a diode to lead TG00 and thence through another diode to the 0 input of the scanner 2111. When the counter in the transfer units 535 is at the 0 position it detects the calling potential and stops the counter so that the tens number is now recorded therein. The potential from lead TG00 is also extended through the diode to the 0 input of the group units scan unit 2112. During state S3 the second counter in data transfer unit 535 is enabled and when it reaches the 0 position it detects the calling potential and stops the scan so that the units digit of the trunk group number is now recorded. The relays PG0 and RG0 from the 0 outputs of units 2111 and 2112 respectively have now operated. A relay driver 2101 in response to a signal on lead APB from the sequence circuits is operated to supply +16 volt potential to break contacts of the PG and RG relays. Since relay PG0 is now operated, its break contacts are open and the potential extends only via the break contacts of the other nine relays PG1–PG9 via diodes to 90 of the 100 PG leads, that is those not having the tens digit 0. Also the relay RG0 is operated and its break contacts are therefore opened, so that the potential extends via the contacts only of the other 9 relays RG1–RG9 to the 90 of the 100 TG leads having units digit other than 0. Thus the positive potential is extended to all of the 100 TG leads except the one having tens digit 0 and unit digit 0, that is all except lead TG00. Therefore all terminating units requesting service except those in trunk group TG00 will now be blanked out by the positive 16-volt potential.

Next during state S4 the counter in the data transfer unit 535 for the trunk tens scan is enabled so that the potential on lead CM00–00 extends via a diode to lead TK00 and thence through another diode to the 0 input of the trunk tens scan unit 2211. When the counter advances to the zero position it is stopped and thus the tens digit of the trunk number is recorded, causing operation of the relay PT0. Next during state S5 the counter in data transfer unit 535 for the trunk units number is enabled, and the potential on lead TK00 is now extended through make contacts of relay PT0 to an input of the trunk units scan unit 2212. When the counter advances to the 0 position it detects the calling potential and is stopped so that the trunk units number is now recorded, and output relay RT0 operates.

In state S6 the call for service signal is sent to common control. Next in states S22 and S23 the originating number is transmitted via the data transmission path (also referred to as the data bus) 320 to the common control equipment. In state S24 the register of the data transfer unit is cleared.

The common control equipment now selects an idle register and then during state S7 the originating line number and the register number are received from common control via the data path 320 into data transfer unit 535. The originating number being recorded in the 16 flip-flops for the originating number, and the register number being recorded in another 16 flip-flops for the terminating number. In the normal marker cycle the terminating number is supplied via gates to the four scan units 2111, 2112, 2211 and 2212 to operate one output relay from each. Assuming that the common control has selected register-sender junctor 601, the terminating number is 90–11 so that relays PG9, RG0, PT1 and RT1 are now operated. Also the signal PTC from the sequence circuits is true so that relay drivers 2103 and 2203 are now operated. Negative potential extends via a resistor, contacts of relay driver 2103, contacts of relay PG1, and contacts of relay RG1 to the lead PTG11 to one side of the TC relay of terminal T90–11, and ground potential extends via contacts of relay RT1, a diode, contacts of relay PT1 to lead TK11, and thence via a diode and the control path H to the other side of the TC relay of terminal T90–11 causing it to operate. The sequence circuits next supply signals to operate and lock the AX relay (not shown) of terminal T90–11. The relay DPC is then operated to restore the scanner output relays. The originating number is now supplied via these scan units, to operate relay PG0, RG0, PT0 and RT0. This causes negative potential to be supplied via lead PTG00, and ground potential via lead CM00–00 to operate the TC relay of terminating unit T00–00. The path control circuit 528 of FIG. 20 is then enabled to select a path and establish a connection from the C appearance of calling terminating unit T00–00 to the A appearance of the receiving terminating unit T90–11. The marker is then released, and is available to serve other calls. The party at station S701 then receives dial tone and keys in the called number which is supplied through the matrix to the receiving terminal unit T90–11 and thence by the line to the connect matrix to the DTMF receiver (FIG. 14). After the common control has determined the route and selected an outgoing trunk, such as that associated with terminating unit T11–19, it again seizes the switch marker and via the data transmission path 320 supplies the sender number 91–11 and the outgoing trunk number 11–19 to the data transfer unit 535. A connection is then established in the same manner as for the connection to the receiving terminal, this time the connection extending from the sending terminal T91–11 via the switch matrix to the terminating unit T11–19.

After the common control has determined that the connection in Switch #1 should be switched through, the common control again sizes the switch marker. The connections from the calling line to the receiving terminal, and the connection from the sending terminal to the outgoing trunk are released, and then the originating line number and the outgoing trunk number are supplied via the data transmission path 320 to the data transfer unit 535. The outgoing trunk number is first supplied to the scan units to operate relays TG1, RG1, PT1 and RT9. The signal PTC then becomes true to operate the relay drivers 2103 and 2203 so that the potentials are extended via the control path H to operate the relay TC of terminating unit T11–19. Then relay driver 1903 is operated to extend ground potential via its contacts and lead AS to operate relay AX. Ground potential via contacts of relay driver 1902 and lead ASL extends via the control path H and contacts of relay AX to lock it. Relay DPC is then operated to release the output relays of the scan units, thereby releasing the TC relay of unit T11–19. The originating number is supplied to the scan units thereto to operate relays PG0, RG0, PT0, and RT0 so that the TC relay of terminating unit T00–00 is operated. The sequence circuits now supply negative potential via lead PA and contacts of relay AX of terminating unit T11–19 and thence to the A appearance on the matrix, via a diode and operate winding of a crosspoint relay, and then via a conductor into the marker to operate relay ALK1 via ground at contacts of relay driver 2074. Also negative potential extends from the sequence and supervisory circuits to lead PC, via the control path H and contacts of the TC relay of terminating unit T00–00 to the C appearance on the switch matrix, then via the operate winding and diode of a crosspoint relay, and a conductor into the marker to operate the relay CLK1 to ground via contacts of relay driver 2075. The relay PM1 operates via ground through contacts of relay CLK1. Testing paths from the C leads now extend from the AB links of the matrix A1 via contacts of relay ALK1 to a scanner, and from the BC links of matrix C1 via the contacts of relay CLK1 to the scanner. After checking the continuity through link testing resistors from contacts of relays AT and CT, the counter 2000 is enabled from the sequence circuit via gate 2092 to scan the paths. Upon finding coincidence of an idle AB link, an idle BC link, and the step of counter 2000, a signal from one of the ten AND gates 2001 to 2010 will become true, supplying a signal via gate 2091 to inhibit gate 2092 and thereby stop the counter 2000. Assuming that the path selected is the one corresponding to gate 2001, a relay driver supplies ground potential to operate the relay P1. During state S18 a relay driver 2018 is operated to supply ground potential via contacts of relay T1 and contacts of relay PM1 to the pull conductors of the selected path. This potential extends in one direction through the B and A stages to the PA lead via the outgoing trunk terminating unit T11–19 and contacts of the AX relay therein to negative potential in the sequence and supervisory circuits 523 to operate those two stages. The pull potential in the other direction extends via a crosspoint in the C stage to the PC lead in the calling line terminating unit T00–00 and thence via contacts of the relay TC therein over the common path H to the sequence and supervisory circuits to operate the crosspoint in the C stage. The cut-off relays in the two terminating units will then operate via the path over the C leads through the three stages of the matrix and the marker is released.

*4.2.2 DAS Marker.*—In order to make every operator accessible to operator-directed calls, while at the same time not requiring the specialized processing for all calls that would be provided by the switch marker, the DAS section is employed. Its function is to extend a call from a DAS trunk circuit to an operator via the DAS matrix. In addition the normal marker functions of inlet identification, pathfinding, and connection to an outlet, it is necessary to provide a gate control for the inlets, a method of classifying the service-requesting inlets prior to identification, and a means of equitably distributing the traffic to the proper outlets. All calls to operators, of any type (assistance, information, etc.) come via DAS trunk circuits, all of which are similar. When a call is extended to the trunk by the switch marker, it receives ring-back tone from the trunk. At the same time the trunk, since it appears as an inlet to the DAS matrix, is requesting service from the DAS marker.

(*a*) *Gate control*

While the marker is processing calls, no service requests are recognized. When the marker is again idle all requests that have not been handled are admitted to the gate to be processed by the marker in a predetermined order. The result approximates a "first come, first served" operation (FIG. 23).

(*b*) *Identification* (*FIGS. 23 and 24*)

The inlet that is requesting service is identified by taking advantage of the crosspoint diodes in the "P" lead of the matrix. Requests for service (negative potential) applied the DAS corresponding trunk circuit to the P lead with an inlet are concentrated via the crosspoint diodes and can be detected at any matrix outlet. By electronically scanning the inlet P leads of any stage (which correspond to the outlets of separate previous stages), the requests can be progressively isolated into smaller groups and finally to the particular inlet to be served. The information obtained from the identification cycle is used to establish a reed relay "tree" so that the marker can operate a connect reed relay in the identified trunk. This reed relay connects the trunk to a common path between the marker and all DAS trunk circuits.

When the switch marker extended the call to the trunk it also stored in the trunk information defining the priority of the call and the type of operator for which it is intended. Since it is desired that the marker process calls primarily on the basis of priority and also in some order based on operator type, it is necessary to make this distinction prior to the identification cycle, which constitues a large part of the total marker cycle time.

As its first task, the marker generates blanking ground, on a group of leads multiplied to all trunks, in 25 sequential patterns (5 Priorities×5 Operator types). Each active trunk responds—by connecting the blanking ground to its "P" lead—to all patterns except the one corresponding to the priority/operator-type information that was stored in it. The ground inhibits the call-for-service potential, so the trunk is not identified until the marker is ready to process the priority/operator-type combination of the call in that trunk.

(*c*) *Outlet and path selection*

After an inlet is identified, an outlet must be selected. Although any outlet can be reached away from any inlet, several factors have a bearing on the choice of an outlet. The outlet itself is terminated in a link circuit, which is associated with a position circuit manned by an operator.

Obvously, the availability of the position affects the availability of the link circuits connected to it; thus, the first step in outlet selection is to pick an idle position, manned by the type of operator needed for the call being processed. In addition, each operator may choose to serve different types of calls (with a maximum of three choices) as traffic increases.

The marker assigns calls to each position on the basis of its first choice, if calls of that class are awaiting service. After service is attempted for all calls in the gate, any calls remaining unserved will be assigned according to the position's second choice, and then the third choice. As in identification, a blanking ground is used to modify a potential that indicates the busy or idle condition of the position. The busy-idle leads of all positions are scanned to select an idle position of the proper type that has at least one idle link circuit associated with it.

The busy-idle indication of each link circuit of the selected position is coincidence-gated with the unique path condition indication associated with that link circuit, and all combinations are scanned to pick an idle link circuit that can be reached over an idle path. If no such combination can be found, another position is selected and the process repeated. A reed relay in the selected link circuit connects it to a common path between the marker and all link circuits.

Since the trunk-and-link-connect reed relays provide access to the end-points of a unique path through the matrix, all the affected crosspoints may be operated or "pulled" in series by the marker to complete the connection.

(*d*) *Operator-originated calls*

The DAS marker is also arranged to monitor operators' position for outgoing service requests, and connect each such position to an idle DAS trunk. Although no action is taken on outgoing calls until all incoming calls have been disposed of in some manner, the position initiating a call is immediately marked busy, to prevent access by incoming calls.

When the marker is ready to process an outgoing call, all idle DAS trunks are marked as "requesting service" and only the positions initiating a call are marked idle. The marker identifies an idle trunk, as described before, since the trunk appears to be requesting service. When a trunk is found, the marker connects to an idle link circuit of any of the positions originating a call, since they are the only ones that appear to be idle. Thus, all the operations are the same for incoming as for outgoing calls. If no path can be found, another idle trunk is selected and a connection is again attempted. This process is repeated until all positions requesting service have been assigned to idle DAS trunks.

*4.3 Common Control.*—The Common Control provides the Switches with the capabilities for registering, translating, and sending telephone addressing information. Acting upon registered information, this unit also directs the switch marker to establish the appropriate cross-matrix connections. In addition, it provides storage facilities for real-time monitoring and for the continually "up-dated" record of each line and trunk in the Switch. The Common Control is composed of four sub-systems, designated the register-sender, translator, route-and-trunk-selector, and memory sub-systems.

The register-sender sub-system is a time-shared unit that will process simultaneously as many calls as necessary to support the traffic offered. The translator sub-system performs all translations required by the Switch. The route-and-trunk selector sub-system controls all alternate routing, as well as idle and pre-emptive seizure of desired lines or trunks. The memory sub-system is shared by the other three; it is sequentially accessed by the register-sender, and is either sequentially or randomly accessed by the translator or the route-and-trunk selector.

The Common Control is implemented with electronic as well as electromagnetic circuitry. The electronic circuits are designed on a "building block" basis, using transistor-resistor logic ("nor" gates) for the basic logic elements, and transistor flip-flops for temporary storage. The electromagnetic circuitry employs reed relays, with dry-reed switches, primarily of connect functions and as an isolation interface between the electronic portion of the Common Control and the outside plant.

*4.3.1 Common Control System Configuration.*—FIGURE 25 is a simplified block diagram of the Common Control. It shows the relationship between the various sub-systems that make up the Common Control, as well as their relationship to the other units of the Switch.

(*a*) *Register-sender sub-system*

The register-sender control logic is a common-logic unit that is alloted, on a time-slot basis, to process as many calls as necessary to achieve a good grade of service. This unit has available a pool of dual-tone multi-frequency (DTMF) receivers, as well as a pool of multi-frequency (MF 2/6) transceivers; any receiver or transceiver can be associated with any of the register-sender junctors. These junctors are the space-division portion of each of the register-senders, and act as the sending and receiving interface. Also associated with the common logic is a switch marker buffer, which is the communication device between the switch marker and the register-senders. These circuits, along with the assigner circuit, make use of the memory sub-system to allow time sharing of the control logic.

(*b*) *The register-sender junctor*

The register-sender junctor provides the interface between space-divided electrochemical line or trunk circuits and time-divided electronic equipment.

It acts as an inlet to the common logic for registering the incoming address information from lines or trunks, and as an outlet from the common logic for sending the address information to the outlying switches. The basic functions of the junctor are to convert supervisory signals incoming from the lines or trunks into time-divided signals compatible with the electronic common logic, and to convert signals outgoing, from the common logic into signals compatible with the line or trunk equipment; it also provides dial tone to the originating subscriber.

(*c*) *The switch marker buffer*

The switch marker buffer provides the means for receiving the originating equipment-number identity from the switch marker, and for forwarding the appropriate equipment numbers to the switch marker, to establish cross-matrix connections. The switch marker buffer is a two-way communication device; it operates on a "hold-till-finished" basis. It can be seized from either the switch marker or the common logic, but priority is given to the switch marker, so that originating traffic will be handled first. The switch marker buffer also has the function, upon a request of the switch marker, of assigning an idle register to originating traffic.

(*d*) *Assiqner and connect matrix*

The assigner provides the selection control to establish a connection from any junctor to an idle receiver or transceiver; whether a 2/6 MF transceiver or a DTMF receiver is connected, is a function of service treatment translation. The connect matrix provides the connecting path.

(*e*) *The DTMF receiver*

The DTMF receiver provides the system with the capability of receiving information on a dual tone, multi-frequency basis. It receives the audio-frequency signals in a high-and-low-tone set that is coded in a two-out-of-eight code converts these into the D.C. logic signals and presents them for storage in the momory. Table 1 indicates the frequency combinations and their digital interpretation. The receiver will accept tone pairs falling within ±1.5 percent of the nominal frequency and having a minimum duration of 40 milliseconds at the maximum rate of 12 pulses per second. The receiver is capable of receiving the tones over a voltage range of +5 to −22.5 db per frequency, and with a difference in amplitude between the pair tones not exceeding 4 db.

TABLE 1.—DTMF SIGNAL ASSIGNMENT

| Digit: | Tone pair (c.p.s.) |
|---|---|
| 1 | 697+1209 |
| 2 | 697+1336 |
| 3 | 697+1477 |
| 4 | 770+1209 |
| 5 | 770+1336 |
| 6 | 770+1477 |
| 7 | 852+1209 |
| 8 | 852+1336 |
| 9 | 852+1477 |
| 0 | 941+1336 |
| Priority digits: | |
| FO | 697+1633 |
| O | 770+1633 |
| I | 852+1633 |
| P | 941+1633 |
| AR(End of signaling) | 941+1477 |

(*f*) *The MF 2/6 transceiver*

The MF 2/6 transceiver provides the system with the capability for reception and transmission of information on a multi-frequency basis. It can operate in either a confirmation or a non-confirmation mode. Table 2 represents the frequency combination assignment that is used. The transmitted signal tone power is −6±1 dbm at the 0 level for each frequency. The non-confirmation pulsing speed is a nominal 7 pulses per second. The key pulse (KP) for alerting the signal receiver is 100±15 milliseconds in duration; the digit pulses are 70±20 milliseconds. The transceiver, when working as a non-confirmation receiver, will respond to a key pulse of not less than 55 milliseconds duration, and to other pulses of not less than 27 milliseconds.

TABLE 2.—MF 2/6 SIGNAL ASSIGNMENT

| Address digits: | Tone pair (c.p.s.) |
|---|---|
| 1 | 700+900 |
| 2 | 700+1100 |
| 3 | 900+1100 |
| 4 | 700+1300 |
| 5 | 900+1300 |
| 6 | 1100+1300 |
| 7 | 700+1500 |
| 8 | 900+1500 |
| 9 | 1100+1500 |
| 0 | 1300+1500 |

TABLE 2.—Continued

| | |
|---|---|
| Control digits: | |
| KP | 1100+1700 |
| ST | 1500+1700 |
| ID | 1300+1700 |
| LB | 700+1700 |
| TB | 900+1700 |

The spacing interval between pulses of normal length will be 70±20 milliseconds. For receiver operation, a check is made for the reception of two and only two frequencies; the receiver will not accept any other tone combination as valid. The receiver portion of the transceiver will respond to frequencies varying not more than ±1.5 percent from their nominal value.

(*g*) *Time-shared-common logic*

Time-shared-common logic provides the call-processing electronic logic that allows sequential control of all calls in process. It includes timing logic as well as information transfer and organizing logic; arrangement of data for storage in the appropriate call stores, as well as updating logic. All receiving and sending control is done through this unit; appropriate transfer gating is provided for transfer of address digits to and from the transceivers, receivers, and junctors. Such call variables as the number of digits outpulsed, type of outpulsing (DTMF, 2/6 MF, DP, etc.), digit-prefixing, and code conversion, are controlled on a per call basis by the common logic. This circuit is shared by each of the register-senders in turn, on a time-slot basis; during the time a register-sender does not have a real-time access, all information on the status of the calls is stored in the individual register-sender call stores in the memory system.

(*h*) *Register-sender memory*

To provide these call stores, each register-sender has an eight-word section of memory permanently associated with it (see FIG. 26). When the time-slot of the register-sender in control is other than its own, then the "last-look" status is in storage in these words.

The first word is the register-processing control word; it contains information as to call progress, pool assignment, and translator access controls. The second word is the sending control word; such information as digit being sent, mode of sending, how many digits are to be sent, what type of start signal indicator is to be given, etc., is contained in it. The third and fourth words contain the storage for the incoming address information; ten-digit directory numbers plus a route code and a precedence digit may be stored. The fifth word contains originating-equipment identification, as well as the originating service treatment markings that are obtained as a result of service treatment translation. The sixth word contains the terminating equipment identification that was obtained as a result of translation. The seventh word contains route-selection information to be used when reroute translation is required. The eighth word contains miscellaneous control information.

4.3.2 *Translator Sub-System.*—The translator sub-system provides the Common Control with the ability to perform the translation of up to and including six-digit codes, as well as of directory numbers, and to provide special features including a service treatment (class-mark) look-up on a per line basis, both pool and per subscriber abbreviated dialing, hot-line service ("no-digit calling"); service zone restriction, and special network handling.

The translator is composed of two functional circuit groups. One is the translator transfer buffer. This unit is the communication register for passing data and control information between the register-senders, the translator, and the route-and-trunk selectors; it also contains calls in process control logic that modifies the call-status indicators. The other functional circuit group is the translator control logic; it is by the way of this circuit group that the appropriate portions of memory are accessed under the various translation modes.

Several different memory sections are used to implement the various functions of the translator (see FIG. 27).

(*a*) *The translation instruction section*

The translation instruction section is composed of memory words, each of which is permanently stored and includes the "start-point-address" for a particular type of translation. Under certain conditions the word will also contain route-sequencing instructions directly; as an example, the request for service treatment look-up translation will cause the start-point address of the service treatment section to be accessed in order to start the search for the appropriate service treatment.

(*b*) *The service treatment section*

The service treatment section contains several words of service treatment information for each subscriber connected to the Switch, as well as both originating and terminating service treatment information on a trunk-group basis. The following service treatments have been provided for in the translator sub-system:

(1) Receiving mode—Indicates the type of signaling (dial pulse, DTMF, or 2/6 MF) to be expected on this line or trunk.

(2) Maximum world precedence—Indicates the maximum precedence level that may be received over the incoming line or trunk when a call is placed to another station which is part of the switching system.

(3) Route treatment—When placing a call a subscriber may dial a two-digit route code (1X), in which the 1 indicates to the associated register that the next digit (X) is a route treatment digit and not part of an area or switch code. The route treatment digit indicates which of the networks (DDD, FTS, etc.) and facilities (data, voice, etc.) the line or trunk is permitted to dial.

(4) Community - of - interest identity—This service treatment associates the incoming line or trunk with one of the special networks that are provided for in the system.

(5) Maximum community - of - interest precedence—Allows subscribers on a special network to establish high-precedence calls to other subscribers within the same network. The maximum precedence for a given subscriber is normally higher than his community maximum.

(6) Abbreviated dialing—Indicates whether or not the subscriber has abbreviated-dialing capability. It also defines the specific abbreviated-dialing table that is to apply when two-digit codes are received.

(7) Service zone identity—Gives an identifier to each line or trunk group so that dialing restrictions may be imposed on the subscribers. This treatment, when used in conjunction with the information stored in the service zone restriction section, allows comprehensive area and/or switch code dialing restrictions to be imposed on a selective basis.

(8) Echo Suppressors—Used to advise that the line or trunk has echo suppressors associated with it.

(9) Peg-count—Allows selective peg-count on a per line as well as on a trunk-group basis.

(10) Off-Hook—This service treatment identifies the line as a "hot-line" subscriber, who will use a stored directory number for routing.

(*c*) *The code translation section*

The code translation section of the memory provides the Switch with its code and directory-number translation ability. From one to six digits may be translated and each code may be given a unique translation (although the translation section is organized to also allow common translation of a code group). With each code there are stored control instructions that allow preliminary three-digit translations to occur. These instructions may include the number of digits (7 or 10) to be expected on a call; identification of any special network the code is a part of, and what service zone the code is a member of, as well as an identifying mark that tells whether the code is local or foreign area. Code conversion digits are also provided, and sender instructions are provided on a per code basis, when needed. Associated with each group is a route control word that provides the translated routing information.

*(d) The abbreviated dialing and off-hook service section*

The abbreviated dialing and off-hook service section of the translator memory contains the translation tables for these features. Subscribers who have had service treatment identification with one of the abbreviated dialing tables can access it by dialing two-digit codes. The per subscriber table is accessed by two-digit dialing, in conjunction with a service-treatment mark that causes the particular table associated with the line identification to be accessed, allowing conversion of the dialed two-digit number into any unique seven- or ten-digit directory number. The off-hook service allows certain subscribers who have been service-treatment marked, to access a table wherein a full seven- or ten-digit is stored for each line so marked. Any time the subscriber comes off-hook, this directory number is used for routing, thus providing "hot-line" service.

*(e) The service zone restriction section*

The service zone restriction section is accessed whenever the subscriber dials a code that is an allowed destination for only a portion of the subscribers. Each subscriber in the Switch has a service-zone indication (SZI), and this section of the memory provides a table of the allowed SZI's for each of the codes to be rechecked.

*4.3.3 Route-And-Trunk Selector Sub-System.*—This sub-system provides the Common Control with a highly sophisticated capability for alternate routing and line or trunk selection. It is composed of two functional circuit groups: the trunk scanner—which continually monitors the busy-idle status of all lines and trunks associated with the Switch—and the route-and-trunk selection controls.

The route-and-trunk selector utilizes several memory sections to accomplish its job (see FIG. 28). Upon selection of a particular route-control word in the code-translation section, an analysis is made of the routing-control information this word contains; then, as a result of this analysis, the route-selection sequence takes place. In order to achieve complete flexibility as to the route and trunk group alternate routing sequence, as well as to the trunk group assignment, several tabular sections are provided.

*(a) The route-sequence selection section*

The route-sequence selection section is a table of two-digit route-sequence numbers, each of which may have a sub-table of six two-digit route numbers.

*(b) The route-number selection section.*

The route-number selection section is a table of two-digit route-number numbers, each with an associated sub-table of as many as three two-digit trunk-group numbers. The routing control word associated with the code translation performed contains a two-digit code. In conjunction with a control mark that identifies the code as either a route-sequence, route-number, or trunk group code, this two-digit code will cause the appropriate section to be accessed.

As an example: if the route-control word contains a route-sequence code, then the first section to be accessed will be the route-sequence section. Coincidence will be found between the route-sequence obtained from the route-control word and the route-sequence code in the table. After coincidence, the first route number stored in the sub-table will be obtained, and will in turn, be used to access the route-number section. After coincidence is found with the route-number, then the first trunk-group number stored in its sub-table is used to access the trunk-group-address index section.

*(c) The trunk-group-address index section.*

The trunk-group-address index section contains a table of all the trunk-group codes in use in the Switch. With each of these codes is stored the start-word memory address for its trunk-and-line status sub-section. This address index section is provided so that the scanning of the memory will be limited, with a resulting saving in the call-processing time.

*(d) The trunk-and-line-status section*

The trunk-and-line-status section is made up of sub-sections, each of which has a real-time image of the status of each trunk or line in a trunk group. Each of these sub-sections has a start word that contains group-type and group-status markings that indicate whether the group is a PBX trunk group or an inter-switch group, whether the trunks are one-way or two-way, etc. Following the start word is a series of bit groups, each of which gives the real-time status of a line or trunk in the group.

Any line or trunk may assume one of many states—e.g., it may be busy at some precedence level other than routine, or at a routine level, or it may be maintenance busy, or it may be idle, etc. If the route-and-trunk-selector control finds an available idle trunk, it proceeds to busy out the trunk busy-idle memory indicator. If it does not find an idle trunk, and the call in process is a precedence call, then after having made the appropriate "friendly" search for an idle trunk, it will make a pre-emptive, or "unfriendly," search. The pre-emptive search will be made only after all available routes, trunk groups, and trunks have been scanned on a "friendly" basis.

Each time the scan of a trunk group reaches the end-of-group indication, the route-and-trunk-selector control will cause the appropriate route-sequence or route-number sections to be re-accessed, to select the next trunk group to be searched.

The trunk-scanner circuit continually tests all trunks in the switch; if it finds that a trunk has become idle, then the corresponding bit-group in the memory is given an idle indication. In this way the route-and-trunk selector is always informed as to the real-time status of all lines or trunks.

*4.3.4 Memory Sub-System.*—This system is a word oriented, coincident current memory that is made up of the following functional circuits: the read-and-write control, the ferrite core array, the readout buffer, the write transfer, and the address generator. The memory is sequentially accessed by the register-sender; it can also be either sequentially or randomly accessed by the translator and the route selector. The ferrite core array is modular; each module consists of 1152 words, and each word consists of 44 bits. A maximum of six modules can be supplied, as needed.

The read-and-write control provides current pulses needed in transferring information to and from the ferrite core array.

The ferrite core array provides temporary storage for the register-sender sub-system, and semipermanent storage for the translator and the route selector. Each register is assigned eight words of memory; thus, for a switch with 24 registers, the register-sender sub-system would need 192 words. The size of the memory section assigned to the translator and route selector is dependent upon the number of unique codes to be translated and the number of routes and trunks to be provided.

The read-out buffer provides a temporary storage for information which is read from the ferrite core array.

The write transfer logic allows the information from either the register-sender sub-system, the translator, or the route selector to be transferred to the memory sub-system.

The address generator provides memory access pulses and control pulses for the system.

*4.3.5 Numbering plan.*—The numbering plan used is compatible with commercial practice and yet satisfies the special needs for the overseas system. The telephone address consists of a priority digit, a two-digit route code, a three-digit number plan area (NPA) code, a three-digit switching center code, and a four-digit line number.

(*a*) *Priority digit*

The priority digit is used to indicate the level of priority of the call in process, and whether or not another call may be pre-empted if all routes out of the switching center are found busy—or, on a locally terminating call, if the local line may be seized on a pre-empt basis. If a pre-empt search is allowed, the call with the lowest priority rank encountered by the route selector in its "friendly" search will be pre-empted. The following priority levels are provided for (each level has the right to pre-empt lines or trunks that are in use at any of the succeeding levels):

| Rank: | Priority digit value |
|---|---|
| Flash Override (FO) | 0 |
| Flash (F) | 1 |
| Immediate (I) | 2 |
| Priority (P) | 3 |
| Routine | 4 |

(*b*) *Route code*

A two-digit route code provides the Switch with route treatment beyond the scope of a group of ten geographic address digits. It also enables the Switch to discriminate between voice- and data-grade calls, and between dial service and "off-hook" (abbreviated dialing and "hot-line") calls.

(*c*) *Numbering plan area code*

The three-digit NPA code directs a call to the proper major geographic area. It is required only on calls destined to points outside the originating area.

(*d*) *Switching center code*

The three-digit switching center code directs a call to the switching center serving the called subscriber.

(*e*) *Line number*

The four-digit line number identifies the specific line location or other termination in the called switching center. Since the switching equipment can translate a maximum of six digits, only the first three of the four line number digits can be translated to determine the terminal number of a subscriber on the switching center. Thus, one switching center code could be associated with a maximum of one thousand line locations. When the called party is located within a PBX, the restriction no longer applies, since routing is based on the high order digit positions, and since the terminal line numbers may be delivered to the PBX for selection of a specific subscriber.

*4.3.6 Originating-Switch Control.*—Originating-switch control, in conjunction with end-to-end register signaling allows a comprehensive routing plan to be used that requires little if any code conversion. A "spill" feature is provided that increases the alternate route facilities available to the switching center (e.g., isolated switching centers may transfer control of routing to adjacent centers to take advantage of their routing abilities).

The switching center in which a call orginates controls the routing. To illustrate this method, refer to FIG. 14. The four-wire user located in Switch #1 initiates a call to the four-wire user located in Switch #3. Upon pick-up of the telephone by the calling party, a register link, 1, is established. The calling party enters a seven-digit directory number into the common logic (Common Control) of Switch #1 via a DTMF receiver. After all digits have been dialed and the translation performed to select an idle inter-switch trunk to Switch #2, a link 2, is established in Switch #1 from the register to the selected inter-switch trunk. At this time 2/6 MF transceiver (MFT) is also attached, and is placed in the receive mode.

The seizure of the inter-switch trunk leads to the assignment of an idle register in Switch #2, and a link 3 is established to this register; at the same time, an MFT in Switch #2 is assigned, and goes into the send mode. The MFT in Switch #2 sends a start digit (KP) to the MFT in Switch #1. After this digit is sent and confirmed, the Switch #2 MFT reverts to the receive mode; the Switch #1 MFT goes into the send mode, sends sufficient digits to tandem route through Switch #2, and then goes into the receive mode. Switch #2 performs a code translation and selects an idle inter-switch trunk to Switch #3. A link 4 is established from the inter-switch trunk from Switch #1 to the inter-switch trunk to Switch #3, and the register link in office #2 is dropped, returning the register and MFT to idle.

Extending of the connection through to the inter-switch trunk to Switch #3 leads to the assignment of an idle register in Switch #3; a link 5 is then established to this register, and an idle MFT is assigned to it. This MFT sends a start digit (KP) to the MFT in Switch #1, causing the register in Switch #1 to again send the digits from the beginning.

After enough digits have been sent to Switch #3, to indicate that the call is to be completed in this Switch, the MFT in Switch #1 reverts to the receive mode. The digits received by Switch #3 allow a code translation to be performed; this translation indicates a local switch termination and causes the MFT associated with the register in Switch #3 to request the remaining digits from Switch #1. The MFT in Switch #1 sends these digits, and reverts to the receive mode. A seven-digit directory-number translation is performed in Switch #3 and if the local line is idle the MFT in Switch #3 goes into the send mode and sends a switch-through (ST) signal to the register in Switch #1. The link 6 between the calling line and the inter-switch trunk is connected, and the register and MFT in switch #1 are returned to idle. The register in Switch #3 then causes the link 7 between the inter-switch trunk from office #2 to be established to the called line, and the register and MFT units in Switch #3 to be returned to idle.

This routing procedure makes use of the "originating-switch control" technique to provide a comprehensive routing ability. Extensive use is made of the ability of the originating switching center to reroute if congestion is found at any of the tandem switches used in the link being established (see FIG. 29). By restricting the tandem switches to primary route selection, and by not allowing them to use alternate routes when handling tandem traffic, "ring-around-the-rosy" conditions are avoided. When the originating switching center has little direct route trunking, a special "spill" feature may be used to transfer originating-switch control to an adjacent Switch. All trunking may be used for alternate routing in the originating Switch.

*4.3.7 Register-Address Signaling.*—The register-address signaling methods allowed for in the register-sender are as follows:

(*a*) *Dial pulse* (*DP*)

Dial pulsing will be confined to the two-wire user lines via connecting PBX's and to the four-wire attendant positions for such PBX's. Typical dials and dial-pulse repeating units have nominal performance criteria values of 9.5–10.5 p.p.s. and 59.5–67.5 percent break, respectively.

(*b*) *Dual-tone multifrequency* (*DTMF*)

Four-wire subscribers directly attached to the switching center, as well as certain PBX attendant positions, will use DTMF instruments.

(*c*) *2.6 MF multifrequency non-confirmation*

Entry into the overseas system from the continental United States system will be by 2/6 MF pulsing. All Switches will have the ability to both receive and send 2/5 MF pulses.

(*d*) *Multifrequency configuration* (*2/6 MF Conf.*)

All trunks between overseas switching centers will employ confirmation signaling back to the outpulsing sender. This is done in such a manner as to verify that each digit received is the same as that sent by the outpulsing sender (see FIG. 13). When 2/6 MF confirmation signaling is used, use is made of the ability to return control information to the outpulsing sender. The following symbols represent tone pairs that have special meaning to the outpulsing sender when received from the terminating end:

KP—Start sending address information from the beginning.

ST—Switch-through originating center.

ID—Send the next address digit.

LD—Terminating line is busy.

TB—Primary route trunk group busy encountered—originating switching center reroute requested.

What is claimed is:

1. A communication switching system comprising:

a switching network having two sides, a plurality of terminating units connected to said network, each terminating unit having an appearance on both sides of the network, a marker apparatus for controlling the establishment of connections between any two of said terminating units via said network, a plurality of lines connected to individual ones of certain of said terminating units, a plurality of register means associated with individual ones of other of said terminating units, a plurality of sender means associated with individual ones of still others of said terminating units, common translating means;

means responsive to a calling line service request signal from a first of said lines to identify the calling-line terminating unit and means including the marker apparatus to cause a connection to be established through said network between the terminating unit of the calling line and the terminating unit of one of said register means;

means to receive call signals designating the called line directory number as transmitted over said first line via said register terminating unit, and means to translate under the control of said translating means at least a part of said directory information into corresponding equipment location information which includes the identity of a second one of said line terminating units;

means to supply the identity of said second-line unit and of a sender terminating unit to the marker apparatus to cause a connection to be established in said network between the second-line terminating unit and the sender terminating unit, part of said equipment location information being supplied to the sender means and transmitted therefrom via the network connection to the second-line terminating unit;

means effective after the completion of said sending operation to supply the identity of said first-line unit and said second-line unit to the marker apparatus to establish a new connection in said network between said first-line terminating unit and said second line-terminating unit;

wherein said marker apparatus to establish any of said connections includes means to search for an available path between a first side appearance of one terminating unit and a second side appearance of another terminating unit, and means operated incident to unavailability of such path to establish a connection over a path extending between the second side appearance of said one terminating unit and a first side appearance of said other terminating unit.

2. A communication switching system according to claim 1, wherein said network is a non-blocking network having a primary stage, a tertiary stage, and secondary switching means interconnecting the primary and tertiary stages, each terminating unit having one appearance at the primary stage and another appearance at the tertiary stage, the network being so constructed and arranged that there is always a path available in one direction or the other through the network between any two of said terminating units.

3. A communication switching system according to claim 1, wherein said marker apparatus is released after its use in establishing each of said connections during said call for use for other calls.

4. A communication switching system according to claim 1, including means to release said connections to the register terminating unit and to the sender terminating unit.

5. A communication switching system according to claim 1, wherein there is provided common logic circuits for processing information, a memory having a plurality of storage elements arranged into areas, each said register means comprising a memory area individual thereto, said logic circuits having access to and from the memory.

6. A communication switching system according to claim 5, wherein said call directive signals from said lines are received in the form of any one of a plurality of types of call directive signaling means, a plurality of types of call directive receiving means corresponding to said types of signaling means, a second switching network and a controller for controlling the establishment of a connection between a register means terminating unit and a call directive receiving means.

7. A communication switching system according to claim 6, wherein there is provided data transmission means between said marker apparatus and said register means for supplying the calling-line terminating unit identity to the common logic circuits, and for supplying the identities of the two terminating units for each of said network connections from the register means to said marker apparatus.

8. A communication switching system according to claim 7, wherein said common logic circuits are operated in response to receipt of said calling line identity to control said controller to associate a call directive receiver from said plurality of receivers that corresponds to the type of call directive signals of said identified line.

9. A communication switching system according to claim 8, wherein said sender means includes a plurality of at least one type of call directive transmitting means, and said common logic circuits are operated in response to receipt of the called terminating unit identity to control said controller to associate a call directive transmitting means of said plurality of call directive transmitting means that corresponds to the capabilities of the line terminating equipment connected to said called terminating unit.

10. A communication switching system comprising a switching network having two sides, marker apparatus for controlling the establishment of connections through said network, a plurality of lines connected to said network, a plurality of register-sender junctors, each junctor having two connections to said network, wherein each of said lines and each of the connections of each junctor has an appearance on both sides of said network;

common control apparatus including storage means and translating means, a data transmission path interconnecting said marker apparatus and said common control apparatus;

means in said marker apparatus responsive to a calling line service request signal from one of said lines to identify the calling line, means to supply said calling line identity via said data transmission path to said common control apparatus, means in the common control apparatus to select an idle register-sender junctor, means to supply the identity of the calling line and of the selected register-sender junctor via said data transmission path to the marker apparatus to cause a connection to be established through said network between said calling line and one of the network connections of the register-sender junctor;

means to receive call signals designating the called line directory number as transmitted over said calling line via said network connection and said register-sender junctor to said storage means, and means to translate under the control of said translating means at least a portion of said directory information into corresponding equipment location information which includes the identity of a second one of said lines;

means to supply the identity of said register-sender junctor and said second line from said common control apparatus via said data transmission path to the marker apparatus to cause a second connection to be established in said network from the other network connection of the register-sender junctor to said second line, part of said equipment location information being supplied from the common control apparatus via said register-sender junctor and said second network connection to the second line;

means effective after the completion of said sending operation to supply the identity of said calling line and said second line from the common control apparatus via the data transmission path to the marker apparatus to cause a third connection to be established in said network between said calling line and said second line;

wherein said marker apparatus in establishing any of said connections includes means to search for an available path between a first side appearance of one line or junctor connection and a second side appearance of another line or junctor connection, and means incident to unavailability of such a path to establish a connection over a path extending between the second side appearance of said one line or junctor connection and the first side appearance of said other line or junctor connection.

11. A communication switching system according to claim 10, wherein said storage means is provided by a memory having a plurality of storage elements with an individual group of elements provided for each of a plurality of registers individually associated with the register-sender junctors, and wherein said common control apparatus further includes common logic circuits;

a time division multiplex arrangement providing cyclically recurring enabling pulses in time slots individually associated with the registers, the enabling pulses being supplied to the common logic circuits, the junctors, and the data transmission path, and also to the memory to provide access to and from the memory via the common logic circuits for each register during its time slot.

12. A communication switching system according to claim 11, wherein there is provided a plurality of call-signal receivers and a plurality of call-signal generators, a connect matrix for connecting one of said receivers to the said used junctor in the first said network connection for receiving said calling-line call signals, said connect matrix also for connecting one of said call-signal generators via said connect matrix to said junctor used in said second network connection for said sending of call signals, means for supplying said recurring enabling pulses to said call-signal receiver and to said call-signal generator during the time slot of the register corresponding to the register-sender junctor to which they are connected, to supply the information to and from the memory via the common logic circuits.

13. A communication switching system according to claim 12, wherein said register-sender junctors include detectors for dial-impulse type call signals and generators of dial-impulse type call signals, means for supplying the recurring enabling pulses to control the dial impulse detectors and generators in the register-sender junctors in the time slots of the corresponding registers to provide for the transfer of received call-signal information between the dial impulse detector and the memory via the common logic circuits, and the supply of information from the memory via the common logic circuits to the dial impulse call-signal generator for the sending of outgoing call signals via said second network connection.

14. A communication switching system comprising a switching network, marker apparatus for controlling the establishment of connections through said network, a plurality of lines connected to said network, a plurality of junctors connected to said network, a plurality of call-signal detectors and a plurality of call-signal generators, connect means for connecting any one of said detectors or any one of said generators to any one of said junctors;

means responsive to a calling line service request signal from one of said lines to identify the calling line and means including the marker apparatus to cause a connection to be established through said network between said calling line to one of said junctors and from the junctor via said connect means to one of said call-signal detectors;

means to receive call signals designating the called line directory number as transmitted over said calling line via said network, said junctor and said connect means to said call-signal detector, and means to register the detected call signal information;

means to determine the identity of a second one of said lines from said registered call signal information, and means to cause the marker apparatus to establish a connection from said second line through said network to one of said junctors, and means to connect the last said junctor via said connect means to one of said call-signal generators, for sending call signals in accordance with information derived from said registered call-signal information;

means effective after the completion of said sending operation to supply the identity of said calling line and said second line to the marker apparatus to cause a third connection to be established through said network between said calling line and said second line, the said first and second network connections being released.

15. A communication switching system according to claim 14, wherein at least some of said call-signal generators are combined with call-signal detectors to form transceivers, the second said connection being extended via said connect means to one of said transceivers;

said second line being connected at another location in said system through another switching network to a junctor connected thereto and thence through connect means to a transceiver, and means for providing two way signaling between the two transceivers over the established connections.

No references cited.

KATHLEEN H. CLAFFY, *Primary Examiner.*

WILLIAM C. COOPER, *Examiner.*